United States Patent
Beadle et al.

(10) Patent No.: US 12,447,260 B2
(45) Date of Patent: Oct. 21, 2025

(54) NEGATIVE PRESSURE WOUND TREATMENT APPARATUSES AND METHODS WITH INTEGRATED ELECTRONICS

(71) Applicant: Smith & Nephew PLC, Watford (GB)

(72) Inventors: Victoria Beadle, Hull (GB); Mark Hesketh, Royston (GB); William Kelbie, Iverness (GB); Damyn Musgrave, Cottenham (GB); Joseph William Robinson, Papworth Everard (GB); Daniel Steward, Hull (GB)

(73) Assignee: Smith & Nephew PLC, Watford (GB)

( * ) Notice: Subject to any disclaimer, the term of this patent is extended or adjusted under 35 U.S.C. 154(b) by 486 days.

(21) Appl. No.: 16/338,386

(22) PCT Filed: Sep. 29, 2017

(86) PCT No.: PCT/EP2017/074755
§ 371 (c)(1),
(2) Date: Mar. 29, 2019

(87) PCT Pub. No.: WO2018/060412
PCT Pub. Date: Apr. 5, 2018

(65) Prior Publication Data
US 2019/0282737 A1    Sep. 19, 2019

Related U.S. Application Data

(60) Provisional application No. 62/402,146, filed on Sep. 30, 2016, provisional application No. 62/402,298, (Continued)

(51) Int. Cl.
*A61M 1/00*    (2006.01)
*A61F 13/05*   (2024.01)
*A61F 13/84*   (2006.01)

(52) U.S. Cl.
CPC ............ *A61M 1/962* (2021.05); *A61F 13/05* (2024.01); *A61M 1/964* (2021.05);
(Continued)

(58) Field of Classification Search
CPC ...... A61M 1/962; A61M 1/964; A61M 1/784; A61M 2205/50; A61M 2205/583;
(Continued)

(56) References Cited

U.S. PATENT DOCUMENTS

| 3,874,387 A | 4/1975 | Barbieri |
| 4,224,941 A | 9/1980 | Stivala |

(Continued)

FOREIGN PATENT DOCUMENTS

| CN | 201664463 U | 12/2010 |
| DE | 19844355 A1 | 4/2000 |

(Continued)

OTHER PUBLICATIONS

International Search Report and Written Opinion, re PCT Application No. PCT/EP2017/074755, mailed Jan. 2, 2018.
(Continued)

*Primary Examiner* — Andrew J Mensh
*Assistant Examiner* — Nhu Q. Tran
(74) *Attorney, Agent, or Firm* — Knobbe, Martens, Olson & Bear, LLP

(57) ABSTRACT

Disclosed embodiments relate to apparatuses and methods for wound treatment. In some embodiments, a wound dressing apparatus can comprise a wound contact layer, a first area and a second area over the wound contact layer, and a cover layer configured to cover the wound contact layer, the first area, and the second area. The first area can comprise a spacer layer and an absorbent layer over the spacer layer.

(Continued)

The second area can comprise an electronics cassette or cradle comprising a negative pressure source and/or electronic components.

12 Claims, 54 Drawing Sheets

Related U.S. Application Data filed on Sep. 30, 2016, provisional application No. 62/402,382, filed on Sep. 30, 2016.

(52) U.S. Cl.
CPC ............... *A61F 2013/8482* (2013.01); *A61F 2013/8494* (2013.01); *A61M 1/784* (2021.05); *A61M 2205/50* (2013.01); *A61M 2205/583* (2013.01); *A61M 2205/587* (2013.01); *A61M 2205/7518* (2013.01)

(58) Field of Classification Search
CPC ..... A61M 2205/587; A61M 2205/7518; A61F 13/00068; A61F 13/0216; A61F 2013/8482; A61F 2013/8494
See application file for complete search history.

(56) References Cited

U.S. PATENT DOCUMENTS

| | | |
|---|---|---|
| 4,398,910 A | 8/1983 | Blake et al. |
| 4,534,356 A | 8/1985 | Papadakis |
| 4,569,674 A | 2/1986 | Phillips et al. |
| 4,624,656 A | 11/1986 | Clark et al. |
| 4,681,562 A | 7/1987 | Beck et al. |
| 4,767,943 A | 8/1988 | Adler et al. |
| 4,979,944 A | 12/1990 | Luzsicza |
| 5,055,195 A | 10/1991 | Trasch et al. |
| 5,055,198 A | 10/1991 | Shettigar |
| 5,056,510 A | 10/1991 | Gilman |
| 5,152,757 A | 10/1992 | Eriksson |
| 5,181,905 A | 1/1993 | Flam |
| 5,266,928 A | 11/1993 | Johnson |
| D357,743 S | 4/1995 | Bilitz et al. |
| 5,527,293 A | 6/1996 | Zamierowski |
| 5,549,584 A | 8/1996 | Gross |
| 5,636,643 A | 6/1997 | Argenta et al. |
| 5,643,189 A | 7/1997 | Masini |
| 5,779,657 A | 7/1998 | Daneshvar |
| 5,833,646 A | 11/1998 | Masini |
| 5,902,256 A | 5/1999 | Benaron |
| 5,964,723 A | 10/1999 | Augustine |
| 6,071,267 A | 6/2000 | Zamierowski |
| 6,142,982 A | 11/2000 | Hunt et al. |
| 6,168,800 B1 | 1/2001 | Dobos et al. |
| 6,183,438 B1 | 2/2001 | Berguer |
| 6,225,523 B1 | 5/2001 | Masini |
| 6,261,276 B1 | 7/2001 | Reitsma |
| 6,261,283 B1 | 7/2001 | Morgan et al. |
| 6,377,848 B1 | 4/2002 | Garde et al. |
| 6,398,767 B1 | 6/2002 | Fleischmann |
| 6,458,109 B1 | 10/2002 | Henley et al. |
| 6,471,982 B1 | 10/2002 | Lydon et al. |
| 6,599,262 B1 | 7/2003 | Masini |
| 6,607,495 B1 | 8/2003 | Skalak et al. |
| 6,685,681 B2 | 2/2004 | Lockwood et al. |
| 6,787,682 B2 | 9/2004 | Gilman |
| 6,794,554 B2 | 9/2004 | Sessions et al. |
| 6,800,074 B2 | 10/2004 | Henley et al. |
| 6,855,135 B2 | 2/2005 | Lockwood et al. |
| 6,942,633 B2 | 9/2005 | Odland |
| 6,951,553 B2 | 10/2005 | Bubb et al. |
| 6,979,324 B2 | 12/2005 | Bybordi et al. |
| 7,004,915 B2 | 2/2006 | Boynton et al. |
| 7,022,113 B2 | 4/2006 | Lockwood et al. |
| 7,067,709 B2 | 6/2006 | Murata et al. |
| 7,070,584 B2 | 7/2006 | Johnson et al. |
| 7,087,806 B2 | 8/2006 | Scheinberg et al. |
| 7,108,683 B2 | 9/2006 | Zamierowski |
| 7,338,482 B2 | 3/2008 | Lockwood et al. |
| 7,361,184 B2 | 4/2008 | Joshi |
| 7,524,315 B2 | 4/2009 | Blott et al. |
| 7,553,306 B1 | 6/2009 | Hunt et al. |
| 7,569,742 B2 | 8/2009 | Haggstrom et al. |
| 7,611,500 B1 | 11/2009 | Lina et al. |
| 7,615,036 B2 | 11/2009 | Joshi et al. |
| D605,775 S | 12/2009 | Koch et al. |
| D608,007 S | 1/2010 | Arbesman et al. |
| 7,645,253 B2 | 1/2010 | Gura et al. |
| 7,687,678 B2 | 3/2010 | Jacobs |
| 7,699,823 B2 | 4/2010 | Haggstrom et al. |
| 7,776,028 B2 | 8/2010 | Miller et al. |
| 7,779,625 B2 | 8/2010 | Joshi et al. |
| D625,422 S | 10/2010 | Arbesman et al. |
| 7,815,616 B2 | 10/2010 | Boehringer et al. |
| 7,837,673 B2 | 11/2010 | Vogel |
| 7,846,141 B2 | 12/2010 | Weston |
| 7,896,864 B2 | 3/2011 | Lockwood et al. |
| 7,922,676 B2 | 4/2011 | Daskal et al. |
| 7,922,703 B2 | 4/2011 | Riesinger |
| 7,942,866 B2 | 5/2011 | Radl et al. |
| 7,959,624 B2 | 6/2011 | Riesinger |
| 7,976,519 B2 | 7/2011 | Bubb et al. |
| 8,007,257 B2 | 8/2011 | Heaton et al. |
| 8,007,481 B2 | 8/2011 | Schuessler et al. |
| 8,062,272 B2 | 11/2011 | Weston |
| 8,080,702 B2 | 12/2011 | Blott et al. |
| 8,092,441 B2 | 1/2012 | Sugito |
| 8,158,844 B2 | 4/2012 | Mcneil |
| 8,167,869 B2 | 5/2012 | Wudyka |
| 8,212,100 B2 | 7/2012 | Moore |
| 8,215,929 B2 | 7/2012 | Shen et al. |
| 8,323,264 B2 | 12/2012 | Weston et al. |
| 8,371,829 B2 | 2/2013 | Jaeb et al. |
| 8,372,049 B2 | 2/2013 | Jaeb et al. |
| 8,372,050 B2 | 2/2013 | Jaeb et al. |
| 8,404,921 B2 | 3/2013 | Lee et al. |
| 8,409,160 B2 | 4/2013 | Locke et al. |
| 8,414,519 B2 | 4/2013 | Hudspeth et al. |
| 8,419,696 B2 | 4/2013 | Wilkes |
| 8,425,478 B2 | 4/2013 | Olson |
| 8,439,894 B1 * | 5/2013 | Miller ............... A61M 1/985 604/319 |
| 8,449,508 B2 | 5/2013 | Coulthard et al. |
| 8,500,776 B2 | 8/2013 | Ebner |
| 8,529,548 B2 | 9/2013 | Blott et al. |
| 8,545,466 B2 | 10/2013 | Andresen et al. |
| 8,579,872 B2 | 11/2013 | Coulthard et al. |
| 8,603,074 B2 | 12/2013 | Kagan |
| 8,604,265 B2 | 12/2013 | Locke et al. |
| 8,641,691 B2 | 2/2014 | Fink et al. |
| 8,641,693 B2 | 2/2014 | Locke et al. |
| 8,702,665 B2 | 4/2014 | Locke et al. |
| 8,764,732 B2 | 7/2014 | Hartwell |
| 8,795,257 B2 | 8/2014 | Coulthard et al. |
| 8,808,274 B2 | 8/2014 | Hartwell |
| 8,814,842 B2 | 8/2014 | Coulthard et al. |
| 8,821,458 B2 | 9/2014 | Locke et al. |
| 8,870,837 B2 | 10/2014 | Locke et al. |
| 8,961,496 B2 | 2/2015 | Locke et al. |
| 8,974,429 B2 | 3/2015 | Gordon et al. |
| 9,061,095 B2 | 6/2015 | Adie et al. |
| 9,084,845 B2 | 7/2015 | Adie et al. |
| 9,089,630 B2 | 7/2015 | Perkins et al. |
| 9,198,802 B2 | 12/2015 | Robinson et al. |
| 9,259,558 B2 | 2/2016 | Tsai |
| 9,265,665 B2 | 2/2016 | Robinson et al. |
| 9,283,118 B2 | 3/2016 | Locke et al. |
| 9,393,354 B2 | 7/2016 | Freedman et al. |
| 9,414,968 B2 | 8/2016 | Heagle |
| 9,421,133 B2 | 8/2016 | Hu et al. |
| 9,427,505 B2 | 8/2016 | Askem et al. |
| 9,452,088 B2 | 9/2016 | Shulman et al. |
| 9,560,975 B2 | 2/2017 | Mei et al. |

(56) References Cited

U.S. PATENT DOCUMENTS

| | | | |
|---|---|---|---|
| D787,690 S | 5/2017 | Mackay et al. | |
| 9,737,649 B2 | 8/2017 | Begin et al. | |
| 9,770,368 B2 | 9/2017 | Robinson et al. | |
| 9,814,811 B2 | 11/2017 | Aalders et al. | |
| 9,907,703 B2 | 3/2018 | Allen et al. | |
| 9,925,092 B2 | 3/2018 | Luckemeyer et al. | |
| RE46,778 E | 4/2018 | Peron | |
| 9,956,120 B2 | 5/2018 | Locke | |
| 10,004,914 B2 | 6/2018 | Nettesheim et al. | |
| 10,016,544 B2 | 7/2018 | Coulthard et al. | |
| 10,046,095 B1 | 8/2018 | Middaugh et al. | |
| 10,086,117 B2 | 10/2018 | Locke et al. | |
| 2003/0183659 A1 | 10/2003 | Van Zeeland et al. | |
| 2003/0212357 A1 | 11/2003 | Pace | |
| 2004/0076662 A1 | 4/2004 | Riesinger | |
| 2004/0087884 A1 | 5/2004 | Haddock et al. | |
| 2004/0167482 A1 | 8/2004 | Watson | |
| 2005/0012616 A1 | 1/2005 | Forster et al. | |
| 2005/0045461 A1 | 3/2005 | Sweetland et al. | |
| 2005/0065471 A1 | 3/2005 | Kuntz | |
| 2005/0119737 A1 | 6/2005 | Bene et al. | |
| 2005/0137539 A1 | 6/2005 | Biggie et al. | |
| 2006/0029650 A1 | 2/2006 | Coffey | |
| 2006/0086598 A1 | 4/2006 | Sneek et al. | |
| 2006/0107642 A1 | 5/2006 | Smith et al. | |
| 2006/0259102 A1 | 11/2006 | Slatkine | |
| 2007/0055209 A1 | 3/2007 | Patel et al. | |
| 2007/0128055 A1 | 6/2007 | Lee | |
| 2007/0179460 A1 | 8/2007 | Adahan | |
| 2007/0225663 A1 | 9/2007 | Watt et al. | |
| 2007/0255187 A1 | 11/2007 | Branch | |
| 2008/0021356 A1 | 1/2008 | Castello Escude et al. | |
| 2008/0051716 A1 | 2/2008 | Stutz | |
| 2009/0012484 A1 | 1/2009 | Nielsen et al. | |
| 2009/0048556 A1 | 2/2009 | Durand | |
| 2010/0022990 A1 | 1/2010 | Karpowicz et al. | |
| 2010/0100160 A1 | 4/2010 | Edman et al. | |
| 2010/0137775 A1 | 6/2010 | Hu et al. | |
| 2010/0160881 A1 | 6/2010 | Lin et al. | |
| 2010/0207768 A1* | 8/2010 | Pidgeon | A61M 1/784 340/573.1 |
| 2010/0280469 A1 | 11/2010 | Hall et al. | |
| 2010/0292632 A1 | 11/2010 | Mulvihill et al. | |
| 2010/0305490 A1* | 12/2010 | Coulthard | A61M 1/962 604/313 |
| 2011/0092927 A1 | 4/2011 | Wilkes et al. | |
| 2011/0112492 A1 | 5/2011 | Bharti et al. | |
| 2011/0224631 A1 | 9/2011 | Simmons et al. | |
| 2011/0292623 A1 | 12/2011 | Stanley | |
| 2011/0305736 A1 | 12/2011 | Wieland et al. | |
| 2012/0051018 A1* | 3/2012 | Ollgaard | B05D 5/083 361/781 |
| 2012/0059294 A1 | 3/2012 | Schubert et al. | |
| 2012/0109034 A1 | 5/2012 | Locke et al. | |
| 2012/0325215 A1* | 12/2012 | Levenick | A61M 16/08 128/205.23 |
| 2013/0110058 A1* | 5/2013 | Adie | A61M 1/80 604/319 |
| 2013/0215638 A1 | 8/2013 | Dabov et al. | |
| 2013/0317406 A1 | 11/2013 | Locke et al. | |
| 2014/0100536 A1 | 4/2014 | Angel | |
| 2014/0343518 A1 | 11/2014 | Riesinger | |
| 2015/0057625 A1 | 2/2015 | Coulthard | |
| 2015/0065965 A1 | 3/2015 | Haggstrom et al. | |
| 2015/0174304 A1* | 6/2015 | Askem | A61F 13/00042 604/319 |
| 2015/0182677 A1* | 7/2015 | Collinson | A61F 13/00042 604/319 |
| 2015/0202354 A1 | 7/2015 | Wall | |
| 2015/0216733 A1* | 8/2015 | Allen | A61F 13/15203 604/319 |
| 2016/0015873 A1 | 1/2016 | Robinson et al. | |
| 2016/0166438 A1 | 6/2016 | Rovaniemi | |
| 2016/0199546 A1 | 7/2016 | Chao | |
| 2016/0242964 A1 | 8/2016 | Rapp et al. | |
| 2016/0270967 A1 | 9/2016 | Hartwell | |
| 2016/0271305 A1 | 9/2016 | Kurihara et al. | |
| 2016/0361473 A1 | 12/2016 | Robinson et al. | |
| 2017/0112974 A1 | 4/2017 | Fujisaki | |
| 2017/0112975 A1 | 4/2017 | Fujisaki | |
| 2017/0127525 A1 | 5/2017 | Schonholz | |
| 2017/0232189 A1 | 8/2017 | Qin et al. | |
| 2017/0296714 A1 | 10/2017 | Locke et al. | |
| 2017/0319761 A1 | 11/2017 | Locke et al. | |
| 2017/0326277 A1 | 11/2017 | Huang | |
| 2017/0368239 A1 | 12/2017 | Askem et al. | |
| 2018/0008760 A1 | 1/2018 | Zilbershlag et al. | |
| 2018/0021178 A1 | 1/2018 | Locke et al. | |
| 2018/0028728 A1 | 2/2018 | Aarestad et al. | |
| 2018/0104393 A1 | 4/2018 | Wu et al. | |
| 2018/0200414 A1 | 7/2018 | Askem et al. | |
| 2018/0272052 A1 | 9/2018 | Locke et al. | |
| 2018/0318137 A1 | 11/2018 | Donda et al. | |
| 2018/0318165 A1 | 11/2018 | Donda et al. | |
| 2018/0353771 A1 | 12/2018 | Kim et al. | |
| 2019/0021911 A1 | 1/2019 | Askem et al. | |
| 2019/0125943 A1 | 5/2019 | Askem et al. | |
| 2019/0142644 A1 | 5/2019 | Askem et al. | |
| 2019/0143007 A1 | 5/2019 | Askem et al. | |
| 2019/0192350 A1 | 6/2019 | Gowans et al. | |
| 2019/0298580 A1 | 10/2019 | Hall et al. | |
| 2021/0001022 A1 | 1/2021 | Lin | |

FOREIGN PATENT DOCUMENTS

| | | |
|---|---|---|
| EP | 0512543 A2 | 11/1992 |
| EP | 1411874 A1 | 4/2004 |
| EP | 1455701 B1 | 3/2006 |
| EP | 1807032 A1 | 7/2007 |
| EP | 1476217 B1 | 3/2008 |
| EP | 1976477 A2 | 10/2008 |
| EP | 1507498 B1 | 7/2009 |
| EP | 1791579 B1 | 7/2009 |
| EP | 2109472 A1 | 10/2009 |
| EP | 1947987 B1 | 5/2010 |
| EP | 1358456 B1 | 7/2010 |
| EP | 2214728 A2 | 8/2010 |
| EP | 2279016 A1 | 2/2011 |
| EP | 2326295 A1 | 6/2011 |
| EP | 2340064 A1 | 7/2011 |
| EP | 2346468 A2 | 7/2011 |
| EP | 2349155 A2 | 8/2011 |
| EP | 2205190 B1 | 9/2011 |
| EP | 2370116 A2 | 10/2011 |
| EP | 2531761 A1 | 12/2012 |
| EP | 2231088 B1 | 1/2013 |
| EP | 2015655 B1 | 3/2013 |
| EP | 2285323 B1 | 3/2013 |
| EP | 2563421 A1 | 3/2013 |
| EP | 2049055 B1 | 4/2013 |
| EP | 2340066 B1 | 4/2013 |
| EP | 2440260 B1 | 5/2013 |
| EP | 2340062 B1 | 6/2013 |
| EP | 2603699 A1 | 6/2013 |
| EP | 1893145 B1 | 7/2013 |
| EP | 2370142 B1 | 7/2013 |
| EP | 2279017 B1 | 8/2013 |
| EP | 2370117 B1 | 8/2013 |
| EP | 2258443 B1 | 9/2013 |
| EP | 2263742 B1 | 9/2013 |
| EP | 2659915 A1 | 11/2013 |
| EP | 1848390 B1 | 12/2013 |
| EP | 1875081 B1 | 12/2013 |
| EP | 2271381 B1 | 12/2013 |
| EP | 2160166 B1 | 1/2014 |
| EP | 1565219 B1 | 2/2014 |
| EP | 2305325 B1 | 4/2014 |
| EP | 2323712 B1 | 4/2014 |
| EP | 2451498 B1 | 4/2014 |
| EP | 2051675 B1 | 6/2014 |
| EP | 1485613 B1 | 7/2014 |
| EP | 1545644 B1 | 8/2014 |
| EP | 2349154 B1 | 8/2014 |

(56) References Cited

FOREIGN PATENT DOCUMENTS

| | | |
|---|---|---|
| EP | 2146759 B1 | 9/2014 |
| EP | 2416816 B1 | 10/2014 |
| EP | 2468323 B1 | 10/2014 |
| EP | 2658493 B1 | 10/2014 |
| EP | 1850818 B1 | 12/2014 |
| EP | 2268348 B1 | 12/2014 |
| EP | 2561128 B1 | 1/2015 |
| EP | 2829287 A1 | 1/2015 |
| EP | 2683285 B1 | 2/2015 |
| EP | 2470136 B1 | 3/2015 |
| EP | 2503974 B1 | 5/2015 |
| EP | 2249894 B1 | 8/2015 |
| EP | 2802366 B1 | 8/2015 |
| EP | 2438302 B1 | 9/2015 |
| EP | 2346545 B1 | 10/2015 |
| EP | 2438301 B1 | 10/2015 |
| EP | 2802304 B1 | 12/2015 |
| EP | 2852421 B1 | 1/2016 |
| EP | 2410962 B1 | 3/2016 |
| EP | 2640436 B1 | 3/2016 |
| EP | 2855937 B1 | 5/2016 |
| EP | 2433594 B1 | 6/2016 |
| EP | 2919730 B1 | 6/2016 |
| EP | 2861869 B1 | 7/2016 |
| EP | 2945584 B1 | 7/2016 |
| EP | 2293749 B1 | 8/2016 |
| EP | 2305327 B1 | 10/2016 |
| EP | 2467086 B1 | 10/2016 |
| EP | 2470135 B1 | 10/2016 |
| EP | 2767305 B1 | 10/2016 |
| EP | 2282788 B1 | 12/2016 |
| EP | 2462956 B2 | 3/2017 |
| EP | 3139878 A1 | 3/2017 |
| EP | 2249761 B1 | 4/2017 |
| EP | 1587502 B1 | 5/2017 |
| EP | 1587554 B1 | 5/2017 |
| EP | 2731563 B1 | 5/2017 |
| EP | 2968871 B1 | 7/2017 |
| EP | 2632613 B1 | 8/2017 |
| EP | 2888478 B1 | 8/2017 |
| EP | 2937107 B1 | 8/2017 |
| EP | 2967627 B1 | 8/2017 |
| EP | 3062751 B1 | 8/2017 |
| EP | 3139879 B1 | 8/2017 |
| EP | 2359784 B1 | 9/2017 |
| EP | 3151795 B1 | 9/2017 |
| EP | 2367518 B1 | 10/2017 |
| EP | 2675493 B1 | 10/2017 |
| EP | 3068455 B1 | 10/2017 |
| EP | 2558046 B2 | 11/2017 |
| EP | 2736548 B1 | 11/2017 |
| EP | 3052158 B1 | 11/2017 |
| EP | 2593058 B1 | 3/2018 |
| EP | 3139880 B1 | 3/2018 |
| EP | 1496822 B1 | 8/2018 |
| EP | 2879633 B1 | 8/2018 |
| EP | 2227203 B1 | 9/2018 |
| EP | 2696826 B1 | 9/2018 |
| EP | 3106186 B1 | 9/2018 |
| EP | 3162330 B1 | 9/2018 |
| EP | 3169382 B1 | 9/2018 |
| EP | 3203953 B1 | 9/2018 |
| EP | 2941280 B1 | 10/2018 |
| EP | 3244852 B1 | 10/2018 |
| EP | 3062753 B1 | 11/2018 |
| EP | 3120879 B1 | 12/2018 |
| EP | 3191149 B1 | 1/2019 |
| EP | 2370130 B1 | 3/2019 |
| EP | 3053609 B1 | 3/2019 |
| EP | 3180048 B1 | 3/2019 |
| EP | 3143974 B1 | 4/2019 |
| EP | 2285432 B2 | 6/2019 |
| EP | 3050545 B1 | 7/2019 |
| EP | 3319656 B1 | 8/2019 |
| EP | 2355762 B1 | 9/2019 |
| EP | 2822613 B1 | 9/2019 |
| EP | 2863855 B1 | 9/2019 |
| EP | 2482912 B1 | 10/2019 |
| EP | 3038667 B1 | 10/2019 |
| EP | 3129095 B1 | 10/2019 |
| EP | 3191150 B1 | 10/2019 |
| EP | 3280466 B1 | 10/2019 |
| EP | 2244756 B1 | 12/2019 |
| EP | 2968702 B1 | 12/2019 |
| FR | 2939320 A1 | 6/2010 |
| GB | 2511523 A | 9/2014 |
| RU | 131622 U1 | 8/2013 |
| WO | WO-2009098696 A2 | 8/2009 |
| WO | WO-2009120951 A2 | 10/2009 |
| WO | WO-2011135285 A1 | 11/2011 |
| WO | WO-2011144888 A1 | 11/2011 |
| WO | WO 2013/136181 | 9/2013 |
| WO | WO-2014099709 A1 | 6/2014 |
| WO | WO-2015116823 A1 | 8/2015 |
| WO | WO-2016103035 A2 * | 6/2016 ....... A61F 13/00068 |
| WO | WO-2016126560 A1 | 8/2016 |
| WO | WO 2016/174048 | 11/2016 |
| WO | WO-2017079174 A1 | 5/2017 |
| WO | WO 2017/186771 | 11/2017 |
| WO | WO-2017196888 A1 | 11/2017 |
| WO | WO-2018056060 A1 | 3/2018 |
| WO | WO 2018/060412 | 4/2018 |
| WO | WO 2018/060417 | 4/2018 |
| WO | WO-2018115461 A1 | 6/2018 |
| WO | WO-2018156730 A1 | 8/2018 |
| WO | WO-2018158250 A1 | 9/2018 |
| WO | WO-2018162613 A1 | 9/2018 |
| WO | WO-2018164803 A1 | 9/2018 |
| WO | WO-2018185138 A1 | 10/2018 |
| WO | WO-2018192978 A1 | 10/2018 |
| WO | WO-2018206420 A1 | 11/2018 |
| WO | WO-2019053101 A1 | 3/2019 |
| WO | WO-2019053106 A1 | 3/2019 |

OTHER PUBLICATIONS

International Preliminary Report on Patentability for Application No. PCT/EP2017/074755, mailed on Apr. 11, 2019, 10 pages.
International Preliminary Report on Patentability for Application No. PCT/EP2017/074764, mailed on Apr. 11, 2019, 9 pages.
International Search Report and Written Opinion for Application No. PCT/EP2017/074764, mailed on Jan. 2, 2018, 12 pages.

* cited by examiner

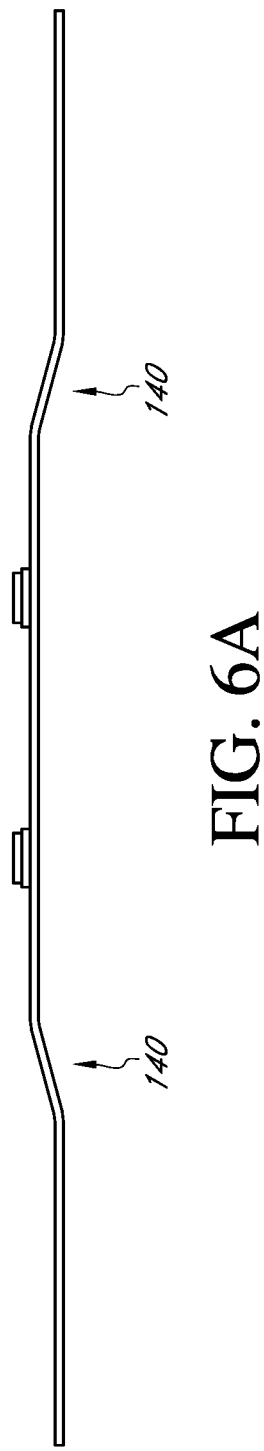
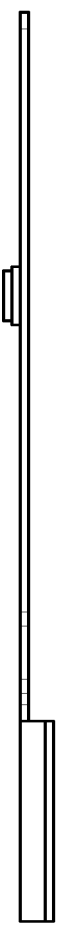
FIG. 6A
FIG. 6B

NEGATIVE PRESSURE WOUND TREATMENT APPARATUSES AND METHODS WITH INTEGRATED ELECTRONICS

CROSS-REFERENCE TO RELATED APPLICATIONS

This application is a U.S. national stage application of International Patent Application No. PCT/EP2017/074755, filed Sep. 29, 2017, which claims priority to U.S. Provisional Patent Application No. 62/402,146, filed on Sep. 30, 2016, U.S. Provisional Patent Application No. 62/402,298, filed Sep. 30, 2016, and U.S. Provisional Patent Application No. 62/402,382, filed on Sep. 30, 2016. All of these applications are hereby incorporated by reference in their entireties and made part of this disclosure.

BACKGROUND

Technical Field

Embodiments described herein relate to apparatuses, systems, and methods the treatment of wounds, for example using dressings in combination with negative pressure wound therapy.

Description of the Related Art

The treatment of open or chronic wounds that are too large to spontaneously close or otherwise fail to heal by means of applying negative pressure to the site of the wound is well known in the art. Negative pressure wound therapy (NPWT) systems currently known in the art commonly involve placing a cover that is impermeable or semi-permeable to fluids over the wound, using various means to seal the cover to the tissue of the patient surrounding the wound, and connecting a source of negative pressure (such as a vacuum pump) to the cover in a manner so that negative pressure is created and maintained under the cover. It is believed that such negative pressures promote wound healing by facilitating the formation of granulation tissue at the wound site and assisting the body's normal inflammatory process while simultaneously removing excess fluid, which may contain adverse cytokines and/or bacteria. However, further improvements in NPWT are needed to fully realize the benefits of treatment.

Many different types of wound dressings are known for aiding in NPWT systems. These different types of wound dressings include many different types of materials and layers, for example, gauze, pads, foam pads or multi-layer wound dressings. One example of a multi-layer wound dressing is the PICO dressing, available from Smith & Nephew, which includes a superabsorbent layer beneath a backing layer to provide a canister-less system for treating a wound with NPWT. The wound dressing may be sealed to a suction port providing connection to a length of tubing, which may be used to pump fluid out of the dressing and/or to transmit negative pressure from a pump to the wound dressing.

Prior art dressings for use in negative pressure such as those described above have included a negative pressure source located in a remote location from the wound dressing. Negative pressure sources located remote from the wound dressing have to be held by or attached to the user or other pump support mechanism. Additionally, a tubing or connector is required to connect the remote negative pressure source to the wound dressing. The remote pump and tubing can be cumbersome and difficult to hide in or attach to patient clothing. Depending on the location of the wound dressing, it can be difficult to comfortably and conveniently position the remote pump and tubing. When used, wound exudate may soak into the dressing, and the moisture from the wound has made it difficult to incorporate electronic components into the dressing.

SUMMARY

Embodiments of the present disclosure relate to apparatuses and methods for wound treatment. Some of the wound treatment apparatuses described herein comprise a negative pressure source or a pump system for providing negative pressure to a wound. Wound treatment apparatuses may also comprise wound dressings that may be used in combination with the negative pressure sources and pump assemblies described herein. In some embodiments, a negative pressure source is incorporated into a wound dressing apparatus so that the wound dressing and the negative pressure source are part of an integral or integrated wound dressing structure that applies the wound dressing and the negative pressure source simultaneously to a patient's wound. The negative pressure source and/or electronic components may be positioned between a wound contact layer and a cover layer of the wound dressing. An electronics assembly can be incorporated into the absorbent material of the dressing and maintain conformability of the dressing. These and other embodiments as described herein are directed to overcoming particular challenges involved with incorporating a negative pressure source and/or electronic components into a wound dressing.

According to one embodiment, a wound dressing apparatus can comprise a wound contact layer configured to be positioned in contact with a wound, a first area over the wound contact layer can comprise a spacer layer and an absorbent layer over the spacer layer, a second area over the wound contact layer can comprise an electronics cassette, the electronics cassette can comprise a negative pressure source and/or electronic components surrounded by a casing, wherein the first area is positioned adjacent to the second area, wherein the casing is configured to surround the negative pressure source and/or electronic components and to allow fluid communication between the first area and second area, and a cover layer configured to cover and form a seal over the wound contact layer, the first area, and the second area.

The wound dressing apparatus of the preceding paragraph or in other embodiments can include one or more of the following features. The electronic components can comprise one or more of a power source, a flexible circuit board, a sensor, a switch, and/or a light or LED indicator. The wound dressing apparatus can further comprise a negative pressure source inlet protection mechanism and a negative pressure source outlet or exhaust. The negative pressure source outlet or exhaust can comprise an antibacterial membrane and/or a non-return valve. The cover layer can comprise an aperture over the outlet or exhaust. The negative pressure source inlet protection mechanism can comprise a hydrophobic material configured to prevent fluid from entering the negative pressure source. The electronics cassette can comprise one or more slits, grooves or recesses in the casing, wherein the slits, grooves or recesses are configured to provide one or more hinge points in the casing and increase flexibility of the electronics cassette. The spacer layer can extend within both the first area and the second area and the electronics cassette is provided over the spacer layer. The negative pressure source and/or electronic components can be encapsulated in a hydrophobic coating.

According to another embodiment, a wound dressing apparatus can comprise a wound contact layer configured to be positioned in contact with a wound, a first area over the wound contact layer can comprise a spacer layer and an absorbent layer over the spacer layer, a second area over the wound contact layer comprising an electronics unit, the electronics unit comprising a negative pressure source and/or electronic components, wherein the first area is positioned adjacent to the second area, wherein the second area can comprise a cradle configured to allow fluid communication between the first area and second area, wherein the cradle can comprise recesses configured to receive a portion of the electronics unit, and a cover layer configured to cover and form a seal over the wound contact layer, the first area, and the second area.

The wound dressing apparatus of the preceding paragraph or in other embodiments can include one or more of the following features. The cradle can comprise a hydrophilic material. The wound dressing apparatus wherein at least a portion of the second area can overlap a portion of the first area. The cradle can comprise a recess configured to receive a portion of the absorbent layer. The electronic components can comprise one or more of a power source, a flexible circuit board, a sensor, a switch, and/or a light or LED indicator. The wound dressing apparatus can further comprise a negative pressure source inlet protection mechanism and a negative pressure source outlet or exhaust. The negative pressure source outlet or exhaust can comprise an antibacterial membrane and/or a non-return valve. The cover layer can comprise an aperture over the outlet or exhaust. The negative pressure source inlet protection mechanism can comprise a hydrophobic material configured to prevent fluid from entering the negative pressure source. The negative pressure source and/or electronic components can be encapsulated in a hydrophobic coating.

According to another embodiment, a wound dressing apparatus can comprise a wound contact layer comprising a proximal wound-facing face and a distal face, wherein the wound-facing face is configured to be positioned in contact with a wound, a spacer layer comprising a proximal wound-facing face and a distal face, the spacer layer positioned over the distal face of the wound contact layer, a first area over the spacer layer comprising an absorbent layer, a second area over the spacer layer comprising an electronics unit, the electronics unit comprising a negative pressure source and/or electronic components, wherein the first area is positioned adjacent to the second area, wherein the second area over the spacer layer comprises a cradle configured to allow fluid communication between the first area and second area, wherein the cradle comprises recesses configured to receive the electronics unit, and a cover layer configured to cover and form a seal over the wound contact layer, the spacer layer, the first area, and the second area.

The wound dressing apparatus of the preceding paragraph or in other embodiments can include one or more of the following features. The cradle can comprise a hydrophilic material. The electronic components can comprise one or more of a power source, a flexible circuit board, a sensor, a switch, and/or a light or LED indicator. The wound dressing apparatus can further comprise a negative pressure source inlet protection mechanism and a negative pressure source outlet or exhaust. The negative pressure source outlet or exhaust can comprise an antibacterial membrane and/or a non-return valve. The cover layer can comprise an aperture over the outlet or exhaust. The negative pressure source inlet protection mechanism can comprise a hydrophobic material configured to prevent fluid from entering the negative pressure source.

According to another embodiment, a wound dressing apparatus can comprise a wound contact layer comprising a proximal wound-facing face and a distal face, wherein the proximal wound-facing face is configured to be positioned in contact with a wound, a spacer layer comprising a proximal wound-facing face and a distal face, the spacer layer positioned over the distal face of the wound contact layer, an absorbent layer comprising a proximal wound-facing face and a distal face, the absorbent layer positioned on the distal face of the spacer layer, an electronics unit comprising a negative pressure source and/or electronic components, a cradle positioned on the distal face of the absorbent layer and configured to allow fluid communication between the absorbent layer and the electronics unit, wherein the cradle comprises recesses configured to receive the electronics unit, and a cover layer configured to cover and form a seal over the wound contact layer, the spacer layer, the absorbent layer, the cradle and electronics unit.

The wound dressing apparatus of the preceding paragraph or in other embodiments can include one or more of the following features. The cradle can comprise a hydrophilic material. The electronic components can comprise one or more of a power source, a flexible circuit board, a sensor, a switch, and/or a light or LED indicator. The wound dressing apparatus can further comprise a negative pressure source inlet protection mechanism and a negative pressure source outlet or exhaust. The negative pressure source outlet or exhaust can comprise an antibacterial membrane and/or a non-return valve. The cover layer can comprise an aperture over the outlet or exhaust. The negative pressure source inlet protection mechanism can comprise a hydrophobic material configured to prevent fluid from entering the negative pressure source.

According to another embodiment, a wound dressing apparatus can comprise a wound contact layer comprising a proximal wound-facing face and a distal face, wherein the wound-facing face is configured to be positioned in contact with a wound, a first area over the distal face of the wound contact layer comprising a spacer layer, and an absorbent layer over the spacer layer, a second area over the distal face of the wound contact layer comprising an electronics unit, the electronics unit comprising a negative pressure source and/or electronic components, wherein the first area is positioned adjacent to the second area, wherein the second area comprises a cradle positioned directly on the wound contact layer, wherein the cradle is configured to allow fluid communication between the first area and second area, and wherein the cradle comprises recesses configured to receive the electronics unit, and a cover layer configured to cover and form a seal over the wound contact layer, the first area, and the second area.

The wound dressing apparatus of the preceding paragraph or in other embodiments can include one or more of the following features. The cradle can comprise a hydrophilic material. The electronic components can comprise one or more of a power source, a flexible circuit board, a sensor, a switch, and/or a light or LED indicator. The wound dressing apparatus can further comprise a negative pressure source inlet protection mechanism and a negative pressure source outlet or exhaust. The negative pressure source outlet or exhaust can comprise an antibacterial membrane and/or a non-return valve. The cover layer can comprise an aperture over the outlet or exhaust. The negative pressure source inlet protection mechanism can comprise a hydrophobic material configured to prevent fluid from entering the negative pressure source.

Any of the features, components, or details of any of the arrangements or embodiments disclosed in this application, including without limitation any of the pump embodiments and any of the negative pressure wound therapy embodiments disclosed below, are interchangeably combinable with any other features, components, or details of any of the arrangements or embodiments disclosed herein to form new arrangements and embodiments.

BRIEF DESCRIPTION OF THE DRAWINGS

FIGS. 6A-6E illustrate an embodiment of the flexible circuit board for use in the electronics cassette;

DETAILED DESCRIPTION

Figure 1A:
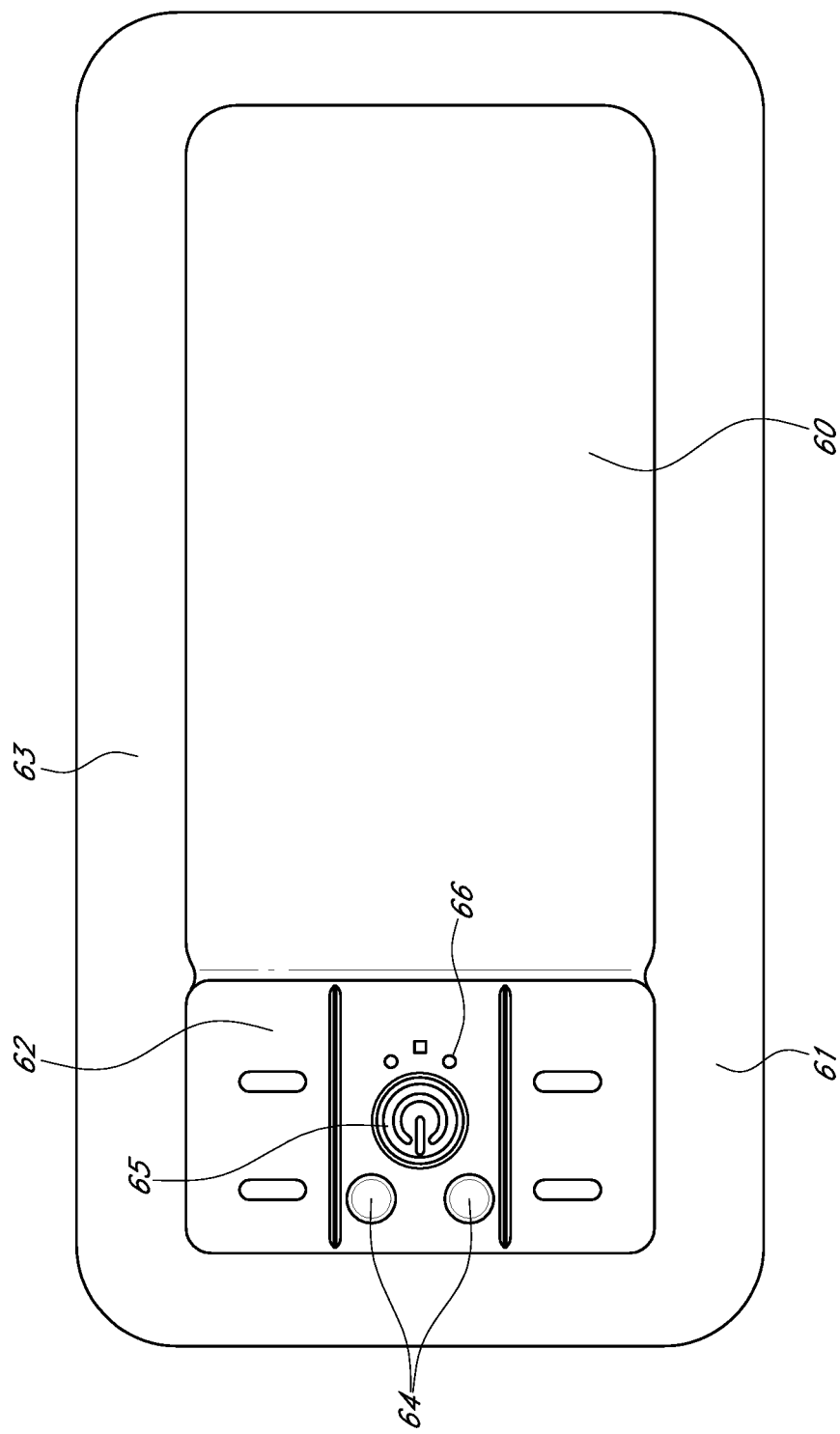
FIGS. 1A-1B illustrates a wound dressing apparatus incorporating the pump and/or other electronic components within the wound dressing and offset from the absorbent layer.

Embodiments disclosed herein relate to apparatuses and methods of treating a wound with reduced pressure, including a source of negative pressure and wound dressing components and apparatuses. The apparatuses and components comprising the wound overlay and packing materials, if any, are sometimes collectively referred to herein as dressings.

It will be appreciated that throughout this specification reference is made to a wound. It is to be understood that the term wound is to be broadly construed and encompasses open and closed wounds in which skin is torn, cut or punctured or where trauma causes a contusion, or any other superficial or other conditions or imperfections on the skin of a patient or otherwise that benefit from reduced pressure treatment. A wound is thus broadly defined as any damaged region of tissue where fluid may or may not be produced. Examples of such wounds include, but are not limited to, abdominal wounds or other large or incisional wounds, either as a result of surgery, trauma, sterniotomies, fasciotomies, or other conditions, dehisced wounds, acute wounds, chronic wounds, subacute and dehisced wounds, traumatic wounds, flaps and skin grafts, lacerations, abrasions, contusions, burns, diabetic ulcers, pressure ulcers, stoma, surgical wounds, trauma and venous ulcers or the like.

It will be understood that embodiments of the present disclosure are generally applicable to use in topical negative pressure ("TNP") therapy systems. Briefly, negative pressure wound therapy assists in the closure and healing of many forms of "hard to heal" wounds by reducing tissue oedema; encouraging blood flow and granular tissue formation; removing excess exudate and may reduce bacterial load (and thus infection risk). In addition, the therapy allows for less disturbance of a wound leading to more rapid healing. TNP therapy systems may also assist on the healing of surgically closed wounds by removing fluid and by helping to stabilize the tissue in the apposed position of closure. A further beneficial use of TNP therapy can be found in grafts and flaps where removal of excess fluid is important and close proximity of the graft to tissue is required in order to ensure tissue viability.

As is used herein, reduced or negative pressure levels, such as −X mmHg, represent pressure levels relative to normal ambient atmospheric pressure, which can correspond to 760 mmHg (or 1 atm, 29.93 inHg, 101.325 kPa, 14.696 psi, etc.). Accordingly, a negative pressure value of −X mmHg reflects absolute pressure that is X mmHg below 760 mmHg or, in other words, an absolute pressure of (760-X) mmHg. In addition, negative pressure that is "less" or "smaller" than X mmHg corresponds to pressure that is closer to atmospheric pressure (e.g., −40 mmHg is less than −60 mmHg). Negative pressure that is "more" or "greater" than −X mmHg corresponds to pressure that is further from atmospheric pressure (e.g., −80 mmHg is more than −60 mmHg). In some embodiments, local ambient atmospheric pressure is used as a reference point, and such local atmospheric pressure may not necessarily be, for example, 760 mmHg.

The negative pressure range for some embodiments of the present disclosure can be approximately −80 mmHg, or between about −20 mmHg and −200 mmHg Note that these pressures are relative to normal ambient atmospheric pressure, which can be 760 mmHg Thus, −200 mmHg would be about 560 mmHg in practical terms. In some embodiments, the pressure range can be between about −40 mmHg and −150 mmHg. Alternatively a pressure range of up to −75 mmHg, up to −80 mmHg or over −80 mmHg can be used. Also in other embodiments a pressure range of below −75 mmHg can be used. Alternatively, a pressure range of over approximately −100 mmHg, or even −150 mmHg, can be supplied by the negative pressure apparatus.

In some embodiments of wound closure devices described herein, increased wound contraction can lead to increased tissue expansion in the surrounding wound tissue. This effect may be increased by varying the force applied to the tissue, for example by varying the negative pressure applied to the wound over time, possibly in conjunction with increased tensile forces applied to the wound via embodiments of the wound closure devices. In some embodiments, negative pressure may be varied over time for example using a sinusoidal wave, square wave, and/or in synchronization with one or more patient physiological indices (e.g., heartbeat). Examples of such applications where additional disclosure relating to the preceding may be found include U.S. Pat. No. 8,235,955, titled "Wound treatment apparatus and method," issued on Aug. 7, 2012; and U.S. Pat. No. 7,753,894, titled "Wound cleansing apparatus with stress," issued Jul. 13, 2010. The disclosures of both of these patents are hereby incorporated by reference in their entirety.

International Application PCT/GB2012/000587, titled "WOUND DRESSING AND METHOD OF TREATMENT" and filed on Jul. 12, 2012, and published as WO 2013/007973 A2 on Jan. 17, 2013, is an application, hereby incorporated and considered to be part of this specification, that is directed to embodiments, methods of manufacture, and wound dressing components and wound treatment apparatuses that may be used in combination or in addition to the embodiments described herein. Additionally, embodiments of the wound dressings, wound treatment apparatuses and methods described herein may also be used in combination or in addition to those described in U.S. Provisional Application No. 61/650,904, filed May 23, 2012, titled "APPARATUSES AND METHODS FOR NEGATIVE PRESSURE WOUND THERAPY," International Application No. PCT/IB2013/001469, filed May 22, 2013, titled "APPARATUSES AND METHODS FOR NEGATIVE PRESSURE WOUND THERAPY," and published as WO 2013/175306 on Nov. 28, 2013, U.S. patent application Ser. No. 14/418,874, filed Jan. 30, 2015, published as U.S. Publication No. 2015/0216733, published Aug. 6, 2015, titled "WOUND DRESSING AND METHOD OF TREATMENT," U.S. patent application Ser. No. 14/418,908, filed Jan. 30, 2015, published as U.S. Publication No. 2015/0190286, published Jul. 9, 2015, titled "WOUND DRESSING AND METHOD OF TREATMENT," U.S. patent application Ser. No. 14/658,068, filed Mar. 13, 2015, U.S. Application No. 2015/0182677, published Jul. 2, 2015, titled "WOUND DRESSING AND METHOD OF TREATMENT," the disclosures of which are hereby incorporated by reference in their entireties. Embodiments of the wound dressings, wound treatment apparatuses and methods described herein may also be used in combination or in addition to those described in U.S. patent application Ser. No. 13/092,042, filed Apr. 21, 2011, published as US2011/0282309, titled "WOUND DRESSING AND METHOD OF USE," and which is hereby incorporated by reference in its entirety, including further details relating to embodiments of wound dressings, the wound dressing components and principles, and the materials used for the wound dressings.

Embodiments of the wound dressings, wound treatment apparatuses and methods described herein relating to wound dressings with electronics incorporated into the dressing may also be used in combination or in addition to those described in International Application No. PCT/EP2017/055225, filed Mar. 6, 2017, titled "WOUND TREATMENT APPARATUSES AND METHODS WITH NEGATIVE PRESSURE SOURCE INTEGRATED INTO WOUND DRESSING," and which is hereby incorporated by reference in its entirety herein, including further details relating to embodiments of wound dressings, the wound dressing components and principles, and the materials used for the wound dressings.

Figure 1B:
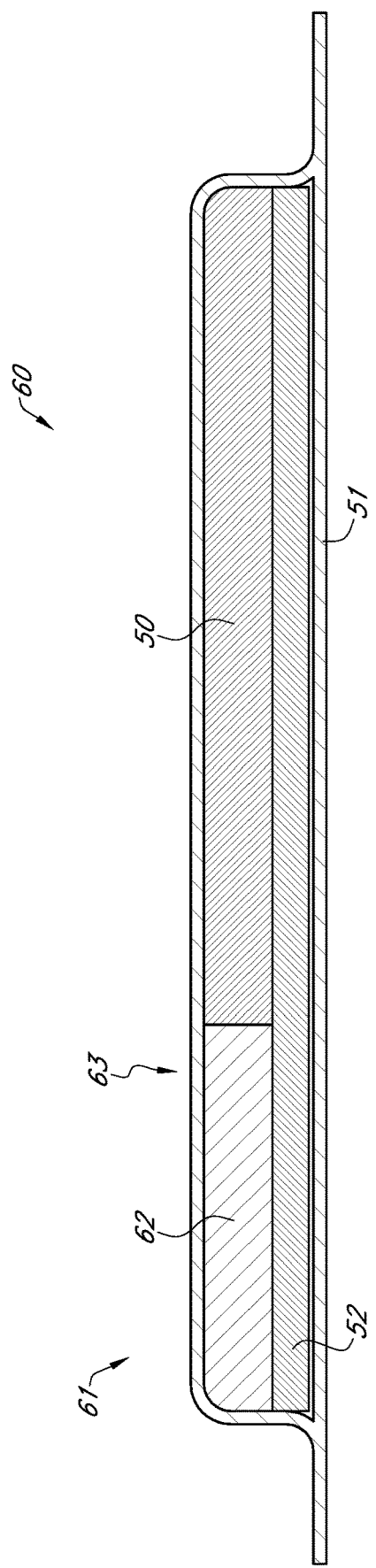

In some embodiments, a source of negative pressure (such as a pump) and some or all other components of the TNP system, such as power source(s), sensor(s), connector(s), user interface component(s) (such as button(s), switch(es), speaker(s), screen(s), etc.) and the like, can be integral with the wound dressing. The wound dressing can include various material layers described here and described in further detail in International Application No. PCT/EP2017/055225. The material layers can include a wound contact layer, one or more absorbent layers, one or more spacer layers, and a backing layer or cover layer covering the one or more absorbent and spacer layers. The wound dressing can be placed over a wound and sealed to the wound with the pump and/or other electronic components contained under the cover layer within the wound dressing. In some embodiments, the dressing can be provided as a single article with all wound dressing elements (including the pump) pre-attached and integrated into a single unit. In some embodiments, a periphery of the wound contact layer can be attached to the periphery of the cover layer enclosing all wound dressing elements as illustrated in FIG. 1A-1B. Details of the various components of the wound dressing are described in more detail in International Application No. PCT/EP2017/055225. Specifically, FIGS. 13 and 14 of International Application No. PCT/EP2017/055225 describe the dressing layers and components associated with an offset pump adjacent to an absorbent area. Such embodiments and description provide details for the materials and alternative embodiment described herein with reference to FIGS. 1A and 1B.

Figure 13:
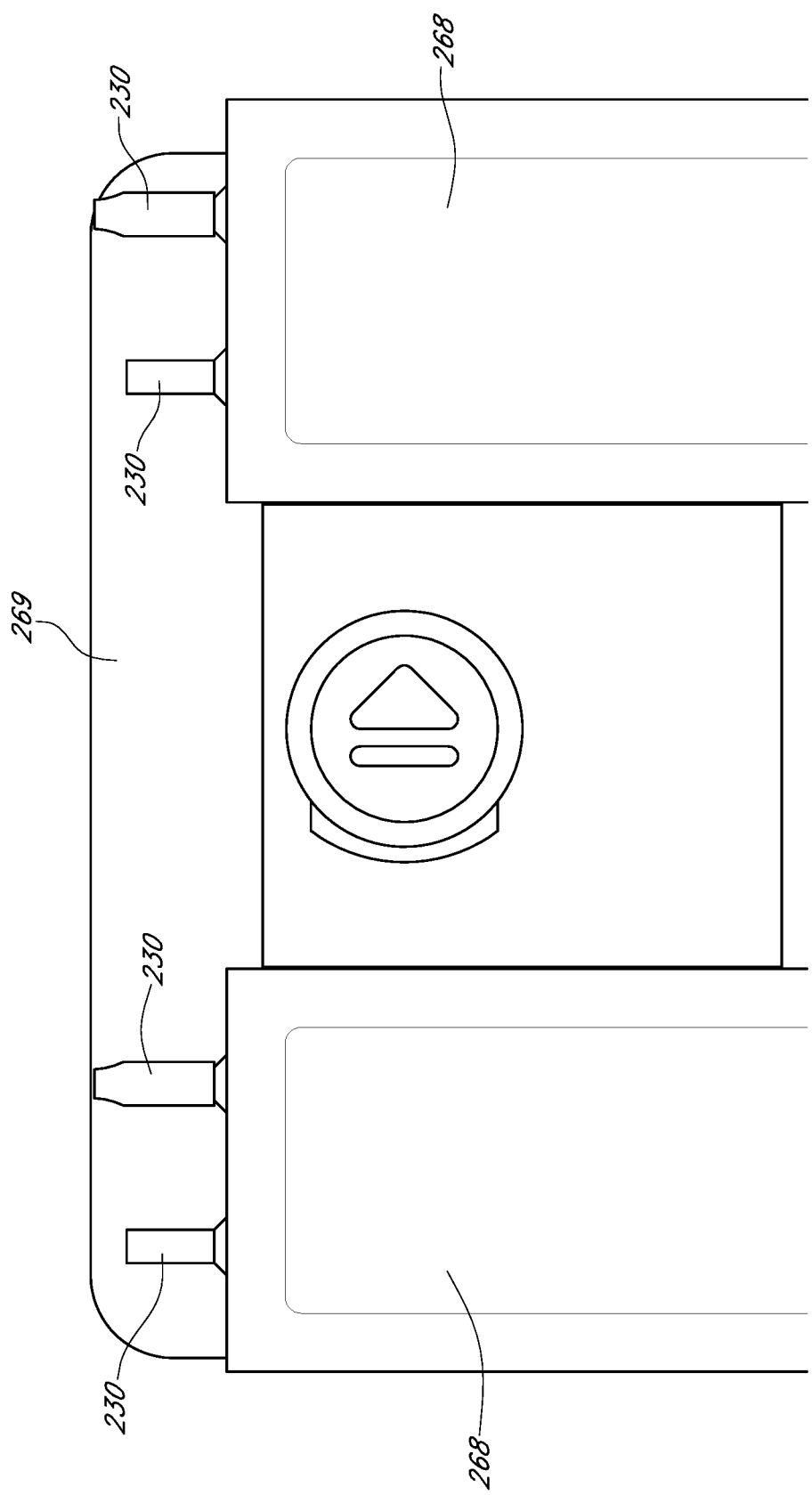

In some embodiments, the pump and/or other electronic components can be configured to be positioned adjacent to or next to the absorbent and/or transmission layers so that the pump and/or other electronic components are still part of a single apparatus to be applied to a patient. However, in some embodiments, the pump and/or other electronics are positioned away from the wound site. FIG. 13 of International Application No. PCT/EP2017/055225 illustrates a wound dressing with the pump and/or other electronics positioned away from the wound site. The wound dressing can include an electronics area 1361 and an absorbent area 1360. The absorbent area 1360 can include an absorbent material 1312 and can be positioned over the wound site. The electronics area 1361 can be positioned away from the wound site, such as by being located off to the side from the absorbent area 1360. The electronics area 1361 can be positioned adjacent to and in fluid communication with the absorbent area 1360. The dressing can comprise a wound contact layer (not shown), a spacer layer (not shown), an absorbent layer 1312, a moisture vapor permeable film or cover layer 1313 positioned above the contact layer, spacer layer, absorbent layer, or other layers of the dressing. The wound dressing layers of the electronics area and the absorbent layer can be covered by one continuous cover layer 1313.

Figure 14:
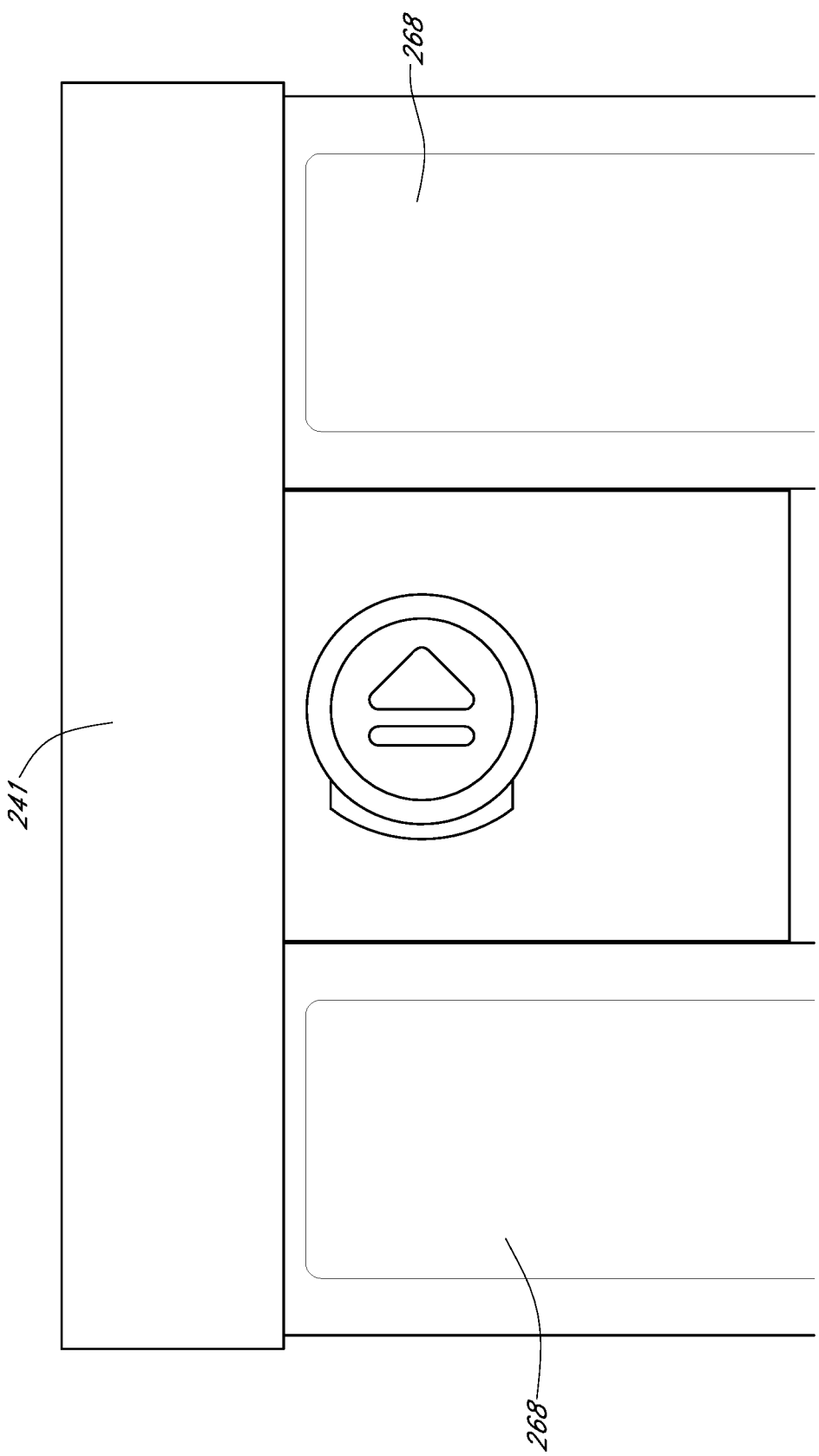

FIG. 14 of International Application No. PCT/EP2017/055225 illustrates an embodiment of a wound dressing with the pump and electronic components offset from the absorbent area of the dressing positioned over the wound. The wound dressing can comprise a wound contact layer 1310 and a moisture vapor permeable film or cover layer 1313 that enclose an absorbent area 1360 and an electronics area 1361. The cover layer 1313 can seal to the wound contact layer 1310 at a perimeter. The dressing can comprise an upper spacer layer or first spacer layer 1317 above the layers of the absorbent area. The spacer material or upper spacer layer 1317 can enable an air pathway between the two areas of the dressing.

As described with reference to FIG. 14 of International Application No. PCT/EP2017/055225, the absorbent area 1360 of the dressing can comprise a second spacer layer 1311 or lower spacer layer and an absorbent layer 1322 positioned above the wound contact layer 1310. The second spacer layer 1311 can allow for an open air path over the wound site. The absorbent layer 1322 can comprise a super absorber positioned in the absorbent area 1360 of the dressing. The absorbent layer 1322 can retain wound fluid within thereby preventing fluid passage of wound exudates into the electronics area 1361 of the dressing. The wound fluids can flow through the wound contact layer 1310, to the lower spacer layer 1311, and into the absorbent layer 1322. The wound fluids are then spread throughout the absorbent layer 1322 and retained in the absorbent layer 1322 as shown by the directional arrows for wound fluids in FIG. 14 of International Application No. PCT/EP2017/055225.

As described with reference to FIG. 14 of International Application No. PCT/EP2017/055225, in some embodiments, the electronics area 1361 of the dressing can comprise a plurality of layers of spacer material 1351 and electronic components 1350 embedded within the plurality of layers of spacer material 1351. The layers of spacer material can have recesses or cut outs to embed the electronic components within whilst providing structure to prevent collapse. The electronic components 1350 can include a pump, power source, controller, and/or an electronics package. A partition 1362 can be positioned between the absorbent area 1360 and the electronics area 1361. The partition 1362 can separate the absorbent layer 1322 and lower air flow spacer layer 1311 from the electronic housing segment of the dressing in the electronic area. The partition 1362 can prevent wound fluid from entering the electronic housing section of the dressing. In some embodiments, the partition can be a non-porous dam or other structure. The non-porous dam 1362 can comprise a cyanoacrylate adhesive bead or a strip of silicone. The air pathway through the dressing is shown in FIG. 14 of International Application No. PCT/EP2017/055225 by directional arrows. The air flows through the wound contact layer 1310, the lower spacer layer 1311, and the absorbent layer 1322 and into the first spacer layer 1317. The air can travel horizontally through the first spacer layer 1317 over and around the partition 1362 into the electronics area of the dressing.

A pump exhaust 1370 can be provided to exhaust air from the pump to the outside of the dressing. The pump exhaust can be in communication with the electronics area 1361 and the outside of the dressing. In some embodiments, the pump exhaust 1370 can be a flexible fluidic connector that comprises a 3D material that allows for pressure to be applied without collapse of the exhaust port. Examples of an application where additional disclosure relating to the 3D material can be found include US Publication No. 2015/0141941, titled "Apparatuses and Methods for Negative Pressure Wound Therapy" published on May 21, 2015. The disclosure of this patent application is hereby incorporated by reference in its entirety.

As used herein the upper layer, top layer, or layer above refers to a layer furthest from the surface of the skin or wound while the dressing is in use and positioned over the wound. Accordingly, the lower surface, lower layer, bottom layer, or layer below refers to the layer that is closest to the surface of the skin or wound while the dressing is in use and positioned over the wound. Additionally, the layers can have a proximal wound-facing face referring to a side or face of the layer closest to the skin or wound and a distal face referring to a side or face of the layer furthest from the skin or wound.

FIGS. 1A-1B illustrates a wound dressing apparatus incorporating the pump and/or other electronic components within the wound dressing and offset from the absorbent layer. FIGS. 1A-1B illustrates an embodiment of the absorbent area 60 and electronics area 61 of a wound dressing with integrated pump and/or electronics. The absorbent area can be similar to the absorbent area described with reference to FIGS. 13 and 14 of International Application No. PCT/EP2017/055225. In some embodiments, as shown in FIG. 1B, the absorbent area 60 comprises a spacer layer 52 positioned above the wound contact layer 51. An absorbent layer 50 can be provided above the spacer layer 52. In some embodiments, the electronics area 61 can include an electronics unit (not shown) and the electronics unit can be surrounded by a casing 73 (shown in FIGS. 2B-2C) forming an electronics cassette 62 or electronics cradle as described herein. In some embodiments, as described in more detail herein, the electronics unit can be provided in the electronics area without a casing. In some embodiments, the electronics cassette 62 and/or electronics unit is provided directly over the wound contact layer. In other embodiments, the electronics cassette 62 and/or electronics unit can be placed above a layer of wicking material, absorbent material, or spacer material that sits above the wound contact layer 51 of the dressing. For example, as shown in FIG. 1B, the cassette 62 and/or electronics unit may be positioned over the spacer layer 52. In some embodiments, the spacer layer 52 can be a single layer of material extending below the electronics cassette 62 and/or electronics unit and the absorbent material 50. Thus, in some embodiments, the spacer layer 52 extends continuously through the absorbent area 60 and the electronics area 61. In alternative embodiments, the spacer layer below the electronics cassette 62 and/or electronics unit can be a different spacer layer than the spacer layer below the absorbent material 50. The spacer layer 52, absorbent material 50, and electronics cassette and/or electronics unit can be covered with a cover layer 63 that seals to a perimeter of the wound contact layer 51 as shown in FIGS. 1A-1B.

The electronics area 61 can include an electronics cassette 62 and/or electronics unit positioned below the cover layer 63 of the dressing. In some embodiments, the electronics unit can be surrounded by a material to enclose or encapsulate a negative pressure source and electronics components by surrounding the electronics. In some embodiments, this material can be a casing. In some embodiments, the electronics unit can be encapsulated or surrounded by a protective coating, for example, a hydrophobic coating as described herein. The electronics unit can be in contact with the dressing layers in the absorbent area 60 and covered by the cover layer 63. As used herein, the electronics unit or cassette 62 includes a lower or wound facing surface that is closest to the wound (not shown in FIG. 1A) and an opposite, upper surface, furthest from the wound when the wound dressing is placed over a wound.

FIG. 1B illustrates a cross sectional view of the wound dressing embodiments with an off-set integrated pump and electronics. In some embodiments, the wound dressing includes a wound contact layer 51 and a spacer layer 52. Above the spacer layer 52, the wound dressing includes an electronics cassette 62 or electronics unit 62 within the electronics area 61 adjacent to or next to the absorbent material 50 within the absorbent area 60. A top film or cover layer 63 can be applied or laminated over the top surface of the electronics cassette 62 or electronics unit 62 and the absorbent layer 50. The cover layer 63 can be sealed to the wound contact layer 51 at a perimeter of the dressing.

Electronics Unit

Figure 2:
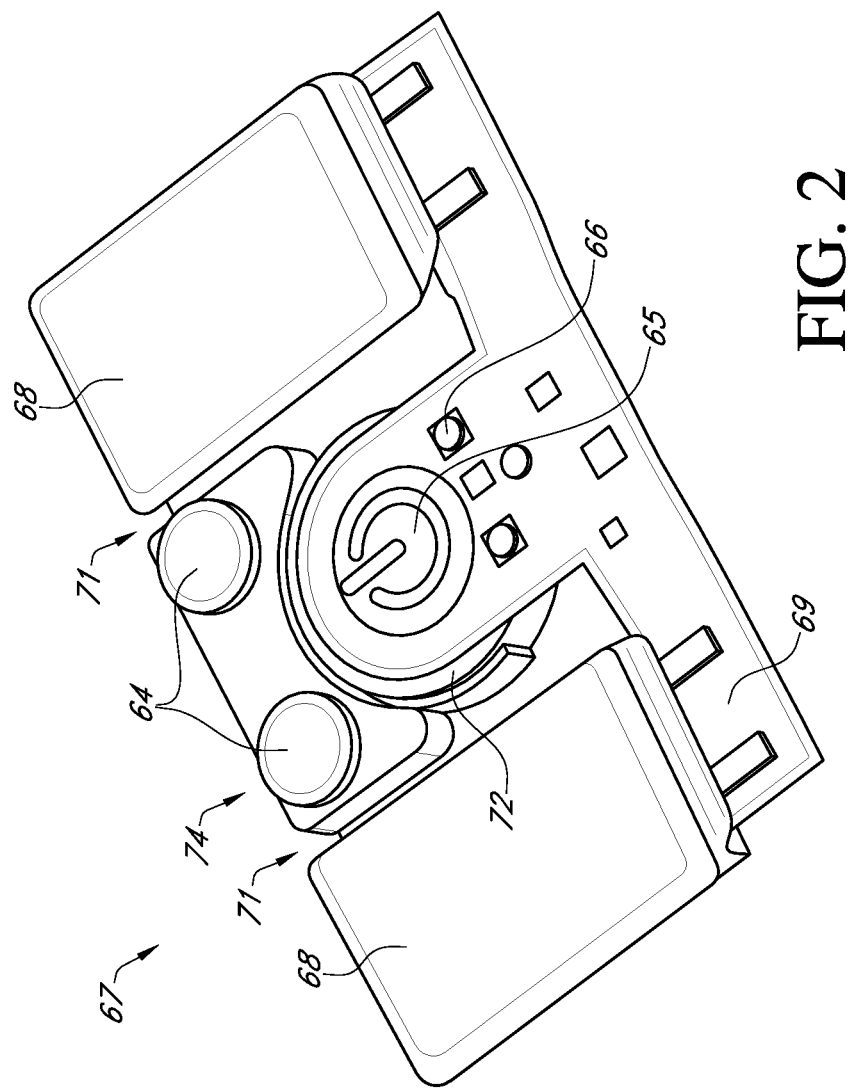
FIGS. 2, 3A-3D, and 4A-4B illustrate embodiments of the electronics unit 67 that can be incorporated into a wound dressing.
Figure 3B:
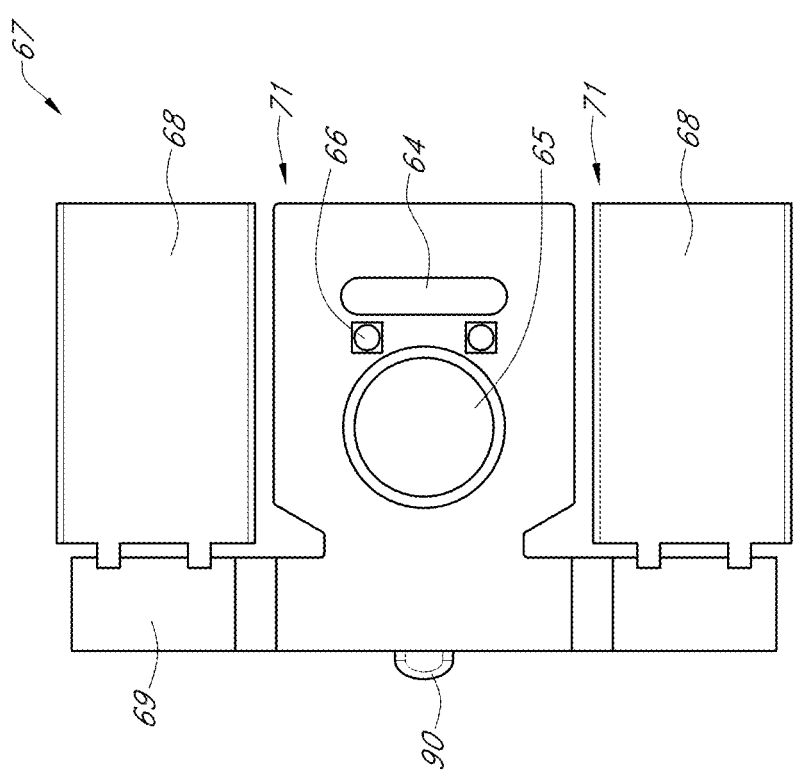
Figure 3A:
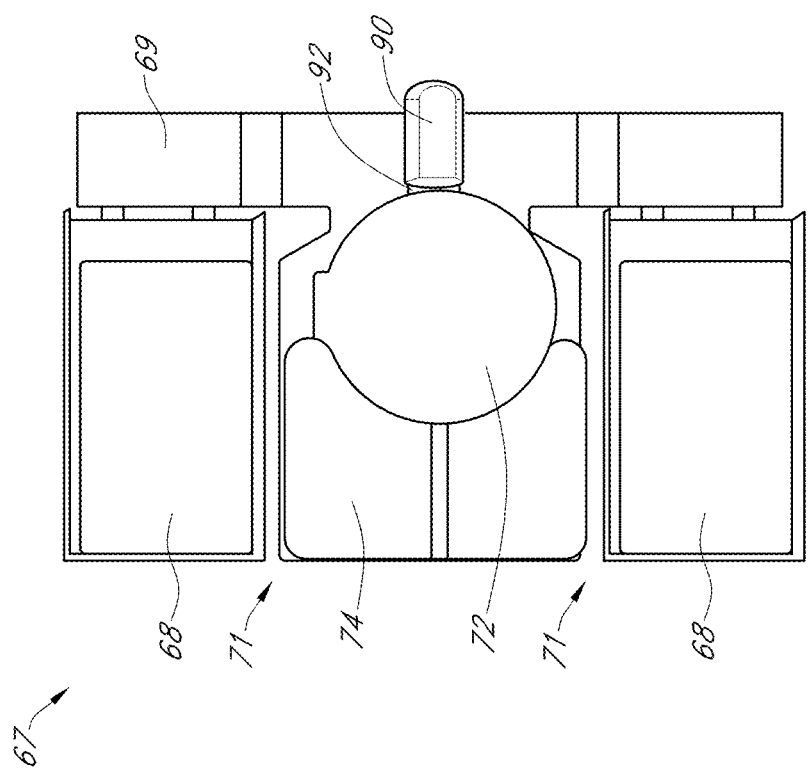
Figure 3D:
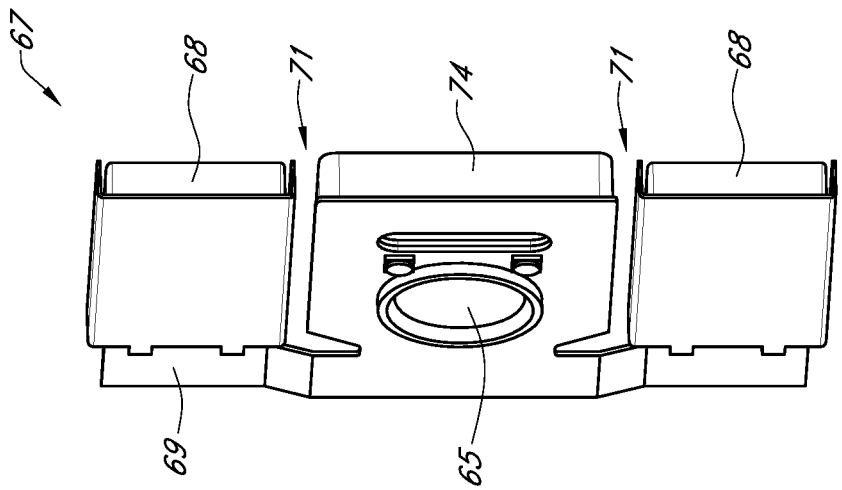
Figure 3C:
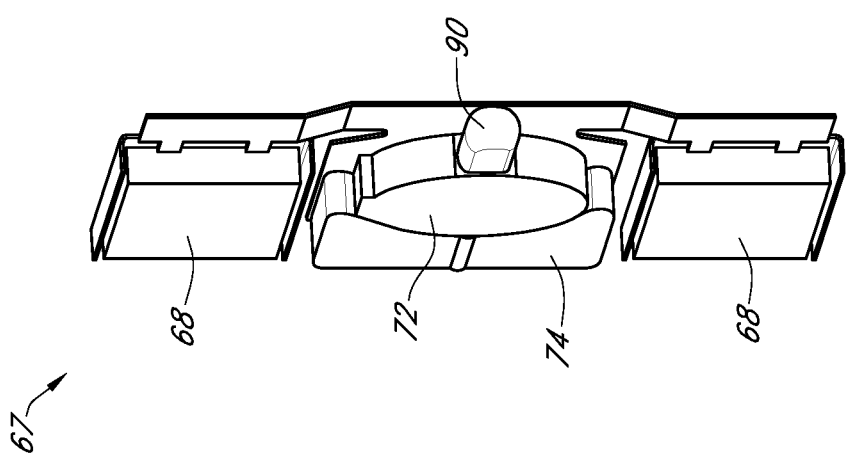
Figure 4B:
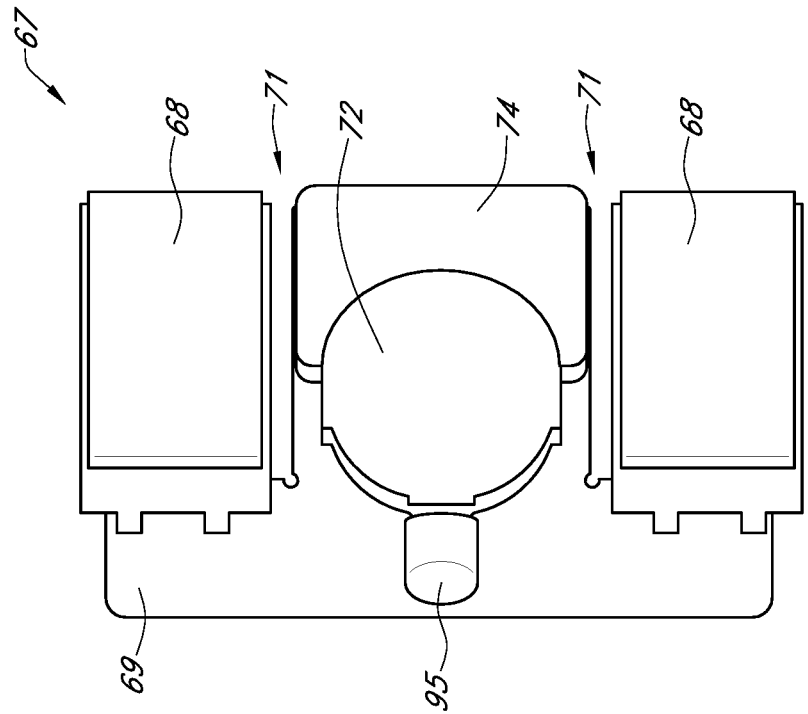
Figure 4A:
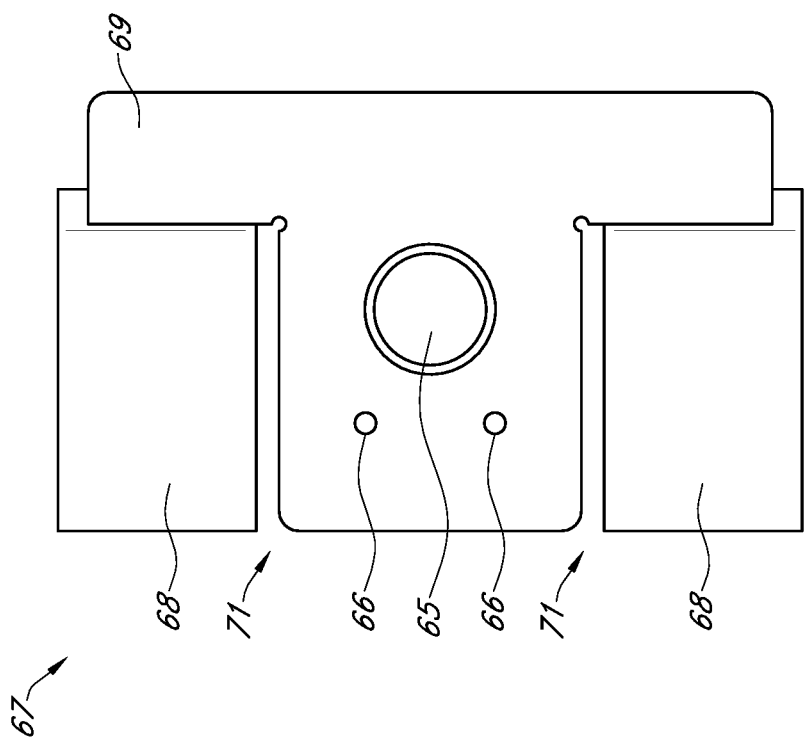

FIGS. 2, 3A-3D, and 4A-4B illustrate embodiments of an electronics unit 67 that can be incorporated into a wound dressing. The electronics unit 67 of FIGS. 2, 3A-3D, and 4A-4B illustrate multiple views of embodiments of the electronics unit 67 without an electronics casing or other dressing material. FIGS. 2, 3B, and 4A illustrate a top view of embodiments of the electronics unit 67. FIGS. 4A and 5B illustrates a bottom or wound facing surface of the electronics unit 67.

FIGS. 2, 3A-3D, and 4A-4B illustrates an embodiment of an electronics unit 67 including a pump 72 and one or more batteries 68 or other power source to power the pump 72 and other electronics. The pump can operate at about 27 volts or about 30 volts. The two batteries can allow for a more efficient voltage increase (6 volts to 30 volts) than would be possible with a single battery.

The batteries 68 can be in electrical communication with a flexible circuit board 69. In some embodiments, one or more battery connections are connected to the top surface of the flexible circuit board 69. In some embodiments, the flexible circuit board can have other electronics incorporated within. For example, the flexible circuit board may have various sensors including, but not limited to, one or more pressure sensors, temperature sensors, optic sensors and/or cameras, and/or saturation indicators. The flexible circuit board 69 illustrated in FIG. 2 communicates with a power switch 65 and the pump 72 and is folded or stepped down around the sides of a pump inlet protection (not shown) to contact the bottom surface of the battery contacts with the top surface of the flexible circuit board 69. In some embodiments, the flexible circuit board can have other electronics incorporated within. For example, the flexible circuit board may have various sensors including, but not limited to, one or more pressure sensors, temperature sensors, optic sensors and/or cameras, and/or saturation indicators.

As illustrated in FIGS. 2, 3A-3D, and 4A-4B, the electronics unit 67 can include single button 65 on the upper surface of the unit. The single button 65 can be used as an on/off button or switch to stop and start operation of the pump and/or electronic components. In some embodiments, the switch 65 can be positioned on a top surface of the flexible circuit board 64. The switch 65 can be a dome type switch configured to sit on the top of the pump 72. Because the switch is situated within the dressing the cover layer can be easily sealed around or over the wound. In some embodiments, the cover layer can have an opening or hole positioned above the switch. The cover layer can be sealed to the outer perimeter of the switch 65 to maintain negative pressure under the wound cover. The switch can be placed on any surface of the electronics unit and can be in electrical connection with the pump.

In some embodiments, the upper surface of the electronics unit 67 can include one or more indicators 66 for indicating a condition of the pump and/or level of pressure within the dressing. In some embodiments, the indicators can be provided on the flexible circuit board 69. The indicators can be small LED lights or other light source that are visible through the dressing material or through holes in the dressing material above the indicators. The indicators can be green, yellow, red, orange, or any other color. For example, there can be two lights, one green light and one orange light. The green light can indicate the device is working properly and the orange light can indicate that there is some issue with the pump (e.g. dressing leak, saturation level of the dressing, and/or low battery).

The electronics unit 67 can also include one or more vents or exhausts 64 in communication with the pump outlet. The vent or exhaust 64 can be positioned on a pump outlet or exhaust mechanism 74. The pump outlet or exhaust mechanism 74 can be positioned at the outlet of the pump and extending to the upper surface of the electronics unit. As shown in FIGS. 2, 3A-3D, and 4A-4B, the pump outlet exhaust mechanism 74 is attached to the outlet of the pump and provides communication with the top surface of the dressing. In some embodiments, the exhaust mechanism 74 can be attached to the back surface of the pump and can extend out of the pump at a 90-degree angle from the pump orientation to communicate with the top surface of the dressing. The exhaust mechanism 74 can include an antibacterial membrane and/or a non-return valve. The exhausted air from the pump can pass through the pump outlet and exhaust mechanism 74. In some embodiments, the cover layer 63 (shown in FIG. 1A-1B) can include apertures or holes positioned above the exhaust vents 64 and/or membrane. The cover layer 63 can be sealed to the outer perimeter of the exhaust 64 to maintain negative pressure under the wound cover 63. In some embodiments, the exhausted air can be exhausted through the gas permeable material or moisture vapor permeable material of the cover layer. In some embodiments, the cover layer does not need to contain apertures or holes over the exhaust and the exhausted air is expelled through the cover layer. In some embodiments, the pump outlet mechanism 74 can be a custom part formed to fit around the pump as shown in FIG. 2.

The electronic unit 67 can include a pump inlet protection mechanism (shown in FIGS. 3A-4B as 90 and 95) positioned on the portion of the electronics unit closest to the absorbent area and aligned with the inlet of the pump. The pump inlet protection mechanism can be positioned between the pump inlet and the absorbent area or absorbent layer of the dressing. The pump inlet protection mechanism can be formed of a hydrophobic material to prevent fluid from entering the pump.

The electronic unit 67 can include a pump inlet protection mechanism 90 or 95 shown in FIGS. 3A-3D and 4A-4B positioned on the portion of the electronics unit closest to the absorbent area and aligned with the inlet of the pump. The pump inlet protection mechanism 90 or 95 is positioned between the pump inlet 92 and the absorbent area or absorbent layer of the dressing. The pump inlet protection mechanism 90 or 95 can be formed of a hydrophobic material to prevent fluid from entering the pump. In some embodiments, the pump inlet protection mechanism can be positioned on the pump inlet. In some embodiments, the pump inlet protection mechanism can be formed to fit around or over the pump inlet. The pump inlet protection mechanism 90 or 95 as shown in FIGS. 3A-3D and 4A-4B can be dome shaped, rectangular, curved, or can be any other shape to provide support to the flexible circuit board 69 and protect the pump inlet from fluid within the dressing. The pump inlet protection mechanism 90 or 95 can be a preformed sintered piece of material custom designed to fit the pump outlet and/or shape the flexible circuit board. In some embodiments, the pump 72, pump inlet protection mechanism 90 or 95, and pump outlet or exhaust mechanism 74 can be combined to formed a pump assembly as used herein.

In some embodiments, the components of the electronics unit 67 may include a protective coating to protect the electronics from the fluid within the dressing. The coating can provide a means of fluid separation between the electronics unit 67 and the absorbent materials of the dressing. The coating can be a hydrophobic coating including, but not limited to, a silicone coating or polyurethane coating. The pump inlet component (90 and 95 shown in FIGS. 3A-3D and 4A-4B) can be used to protect the pump from fluid on the inlet and the pump outlet mechanism 74 can include a non-return valve that protects fluid from entering the outlet as described herein.

The electronics unit 67 includes one or more slits, grooves or recesses 71 in the unit between the pump and the two batteries. The slits, grooves or recesses 71 can allow for the electronics unit 67 to be flexible and conform to the shape of the wound. The unit 67 can have two parallel slits, grooves or recesses 71 forming three segments of the electronics unit 67. The slits, grooves or recesses 71 of the unit 67 create hinge points or gaps that allows for flexibility of the electronics unit at that hinge point. The pump exhaust 64, switch 65, and indicators 66 are shown on the top surface surrounded by the electronics unit 67. As illustrated, one embodiment of the electronics unit 67 has two hinge points to separate the unit into three regions or panels, for example one to contain one battery, one to contain the pump and one to contain another battery. In some embodiments, the slits, grooves or recesses may extend parallel with a longitudinal axis of the dressing.

Electronics Cassette

Figure 5A:
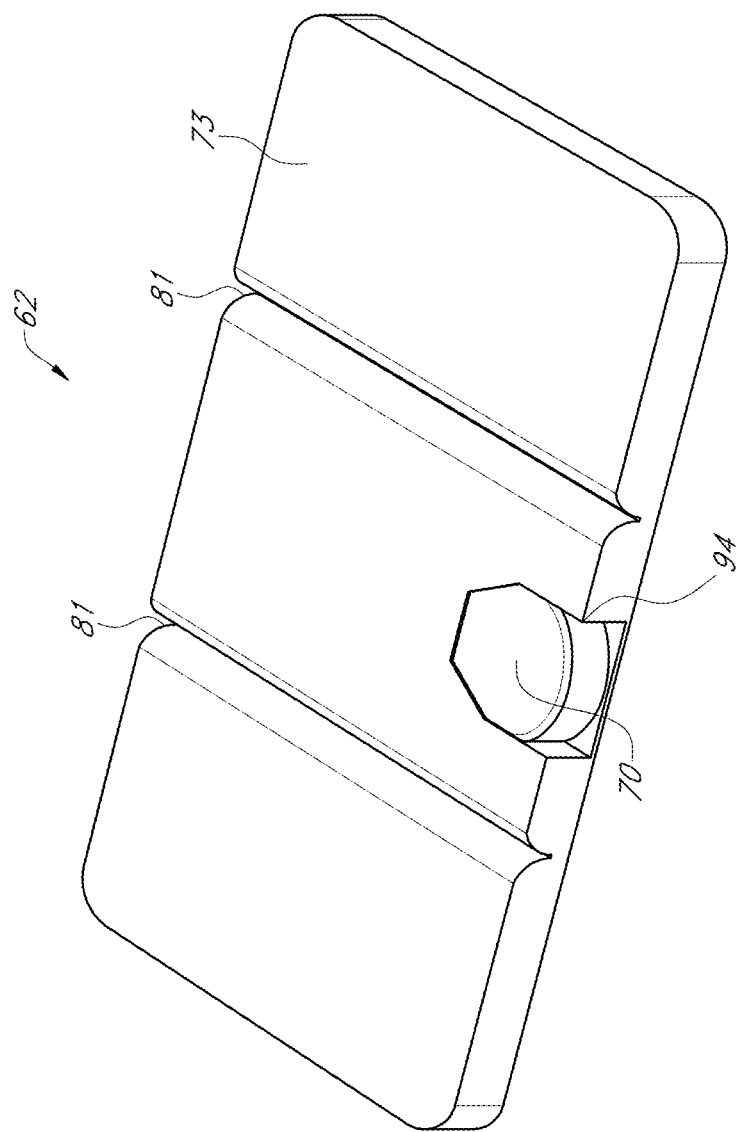
FIGS. 5A-5E illustrate embodiments of components of the electronics cassette.
Figure 5B:
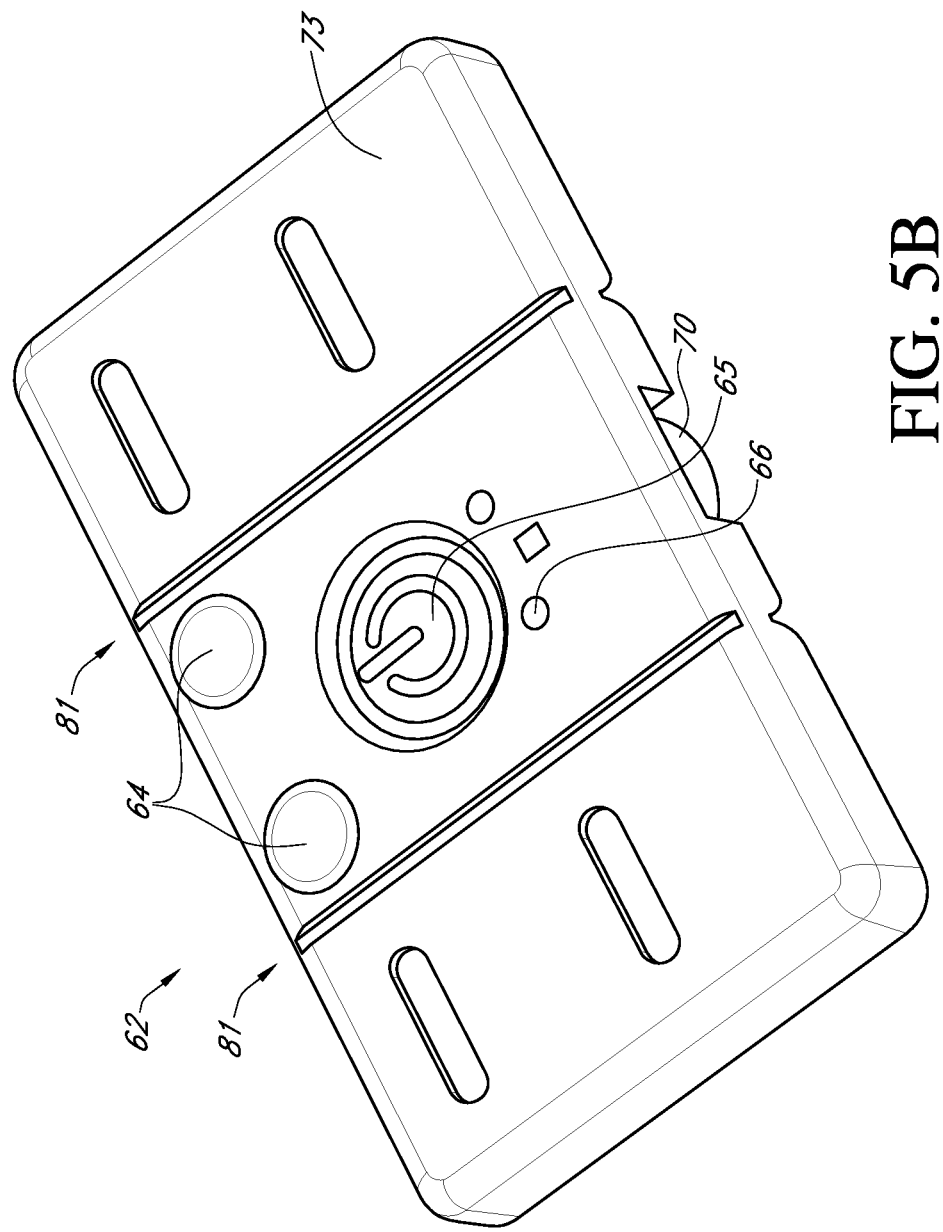

FIGS. 5A-5E illustrate embodiments of components of the electronics cassette 62. FIGS. 5A-5B illustrates an embodiment of an electronic cassette 62 with a rounded pump inlet 70. FIG. 5A illustrates a bottom view of an embodiment of the electronics cassette 62 showing the wound facing side of the electronics cassette 62. FIG. 5B illustrates a top view of an embodiment of the electronics cassette 62 showing the upper surface of the cassette.

FIGS. 5A-5B illustrate the electronics cassette 62 including a casing 73 as shown in FIGS. 5A-5B surrounding the electronics unit 67 described with reference to FIG. 2. In some embodiments, the casing 73 can be used to support and encapsulate the electronics unit 67. In some embodiments, the casing can be made from a plastic material. In some embodiments, the casing 73 may be formed of a foam, an absorbent material, and/or a wicking material and may be in fluid communication with the absorbent area of the dressing. The encapsulation with a foam, an absorbent material, and/or a wicking material can protect against the pooling of the liquid around the electronics area. The casing 73 can be covered on the top surface by a top film or cover layer when incorporated into a dressing. The top film or cover layer can cover the top surface of casing 73 as well as the layers of the absorbent area. The cover layer can have a hole for the exhaust and/or the switch area as described herein. The encapsulation of the electronics unit 67 with the casing 73 can provide support for the flexible printed circuit board (PCB) 69 and other components of the electronics unit 67. The casing 73 can provide support to the electronics unit 67, remain comfortable for the patient, and offer a means of continuous surface and height profile for the electronics unit.

Figure 5C:
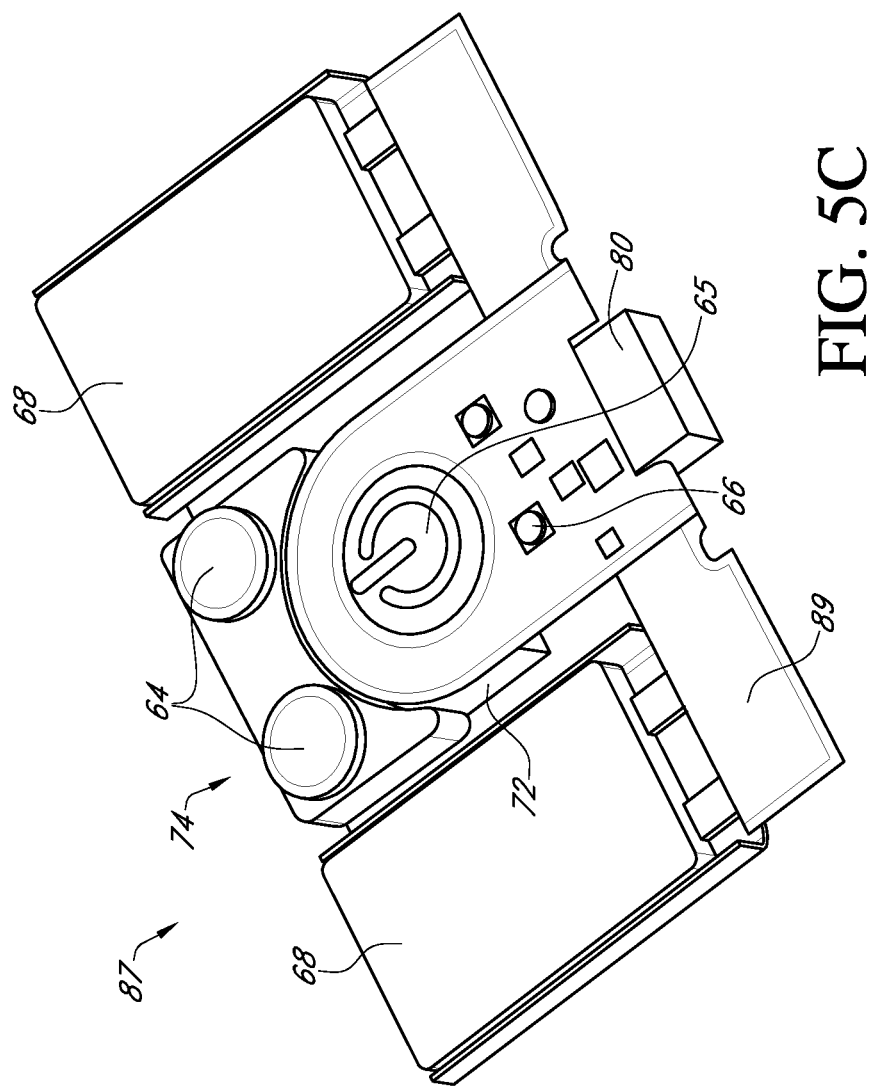
Figure 5D:
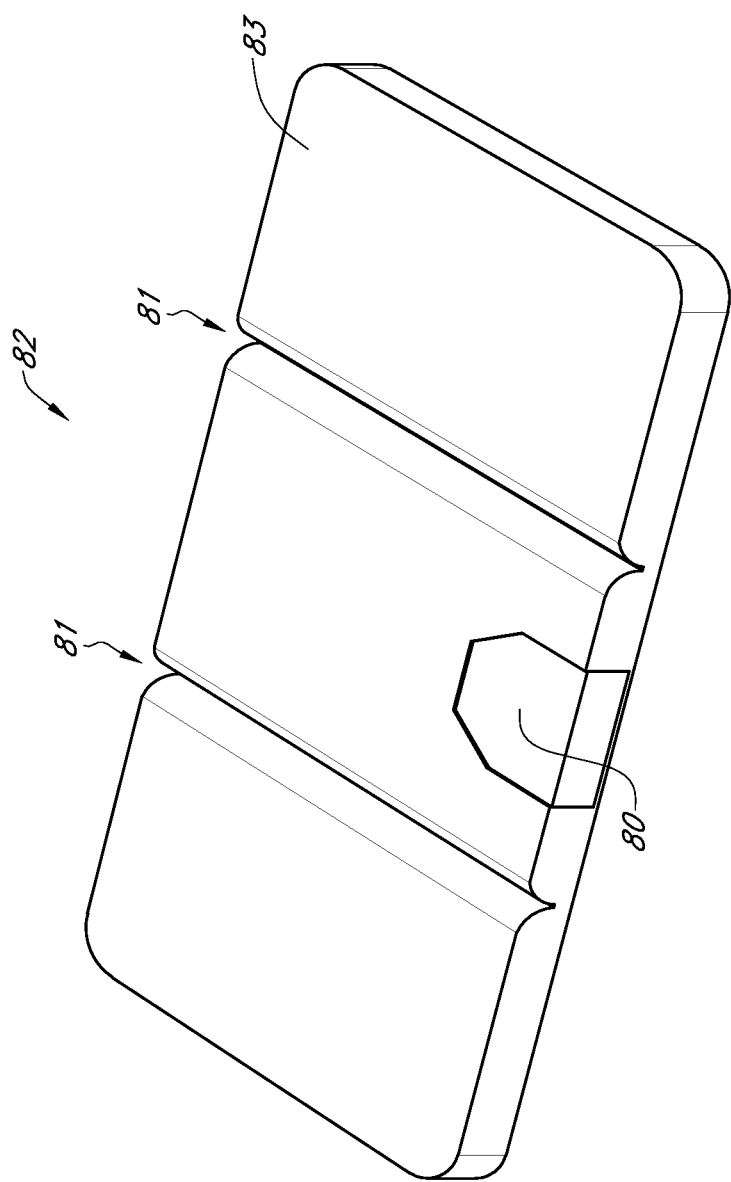
Figure 5E:
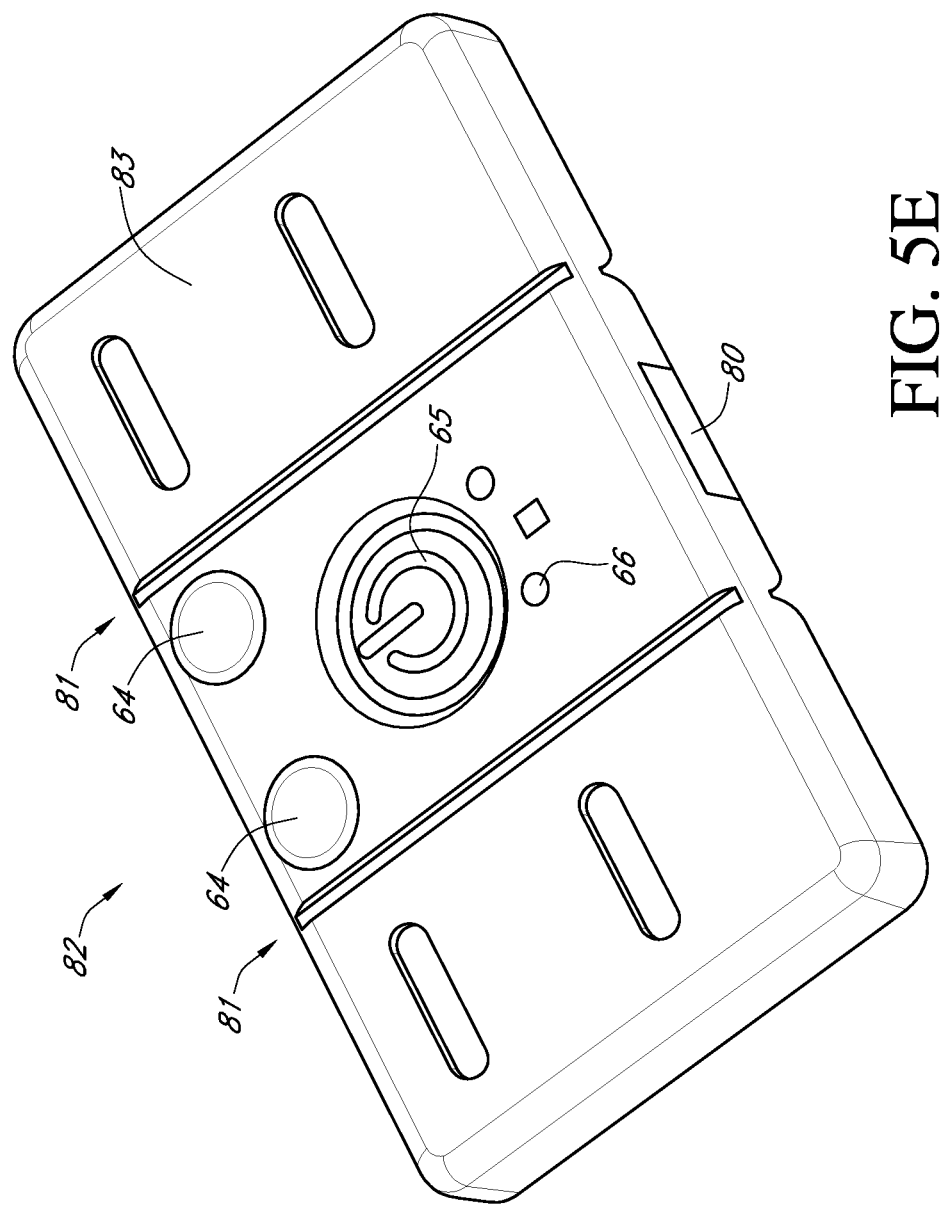

FIG. 5C illustrates an embodiment of a pump and electronics unit 87 without showing an electronics casing 83 surrounding the electronics unit thereby exposing the electronics unit 67 with the various electronics. FIGS. 5D-5E illustrated the electronics unit 87 enclosed in an electronic casing 83 forming the electronic cassette 87.

FIG. 5C illustrates an embodiment of an electronics unit 87 with a rectangular pump inlet protection mechanism 80. FIGS. 5D-5E illustrate an embodiment of an electronic cassette 82 with a casing 83 enclosing the electronic unit 87 shown in FIG. 5C. FIG. 5D illustrates the bottom surface or wound facing surface of the electronics cassette 82. FIG. 5E illustrates the top surface of the electronics cassette 82.

As illustrated in FIGS. 5B-5C and 5E, the electronics cassette 62 or 82 can allow the button 65 to be visible on the upper or top surface of the cassette. In some embodiments, the electronics casing 73 or 83 can have a hole aligned over the button 65 of the electronics unit. In other embodiments, the electronics casing 73 or 83 can be positioned over at least a portion of the switch 65 of the electronics unit but can still allow for the switch to be depressed and/or activated through the material. The switch or button 65 can be placed on any surface of the electronics cassette as long as it is in an electrical connection with the pump. In some embodiments, the switch or button 65 can be placed over the battery. In some embodiments, the battery profile is not as high as the pump and can provide room to place the switch over the battery.

The one or more vents 64 are shown on the top surface of the electronics cassette 62 or 82 as illustrated in FIGS. 5B-5C and 5E. In some embodiments, the electronics casing 73 or 83 can have holes where the vents 64 of the electronics unit align with. In other embodiments, the electronics casing 73 or 83 can have a gas permeable material positioned over at least a portion of the vents 64 of the electronics unit.

In some embodiments, the one or more indicators 66 can be visible on the upper surface of the electronics cassette 62 or 82 for indicating a condition of the pump and/or level of pressure within the dressing. In some embodiments, the electronics casing 73 or 83 can have holes that align with the indicators 66 of the electronics unit. In other embodiments, the electronics casing 73 or 83 can have a transparent material positioned over at least a portion of the indicators 66 of the electronics unit.

The batteries 68 can be in electrical communication with a flexible circuit board 69. In some embodiments, the flexible circuit board can have other electronics incorporated within. For example, the flexible circuit board may have various sensors including, but not limited to, one or more pressure sensors, temperature sensors, optic sensors and/or cameras, and/or saturation indicators.

In such embodiments, the components of the electronics unit 67 or 87 may include a protective coating as described herein to protect the electronics from the fluid within the dressing. The coating can be provided between the electronics and the casing 73 and 83.

The electronic cassette 62 or 82 can have an opening or aperture 94 for the pump inlet protection mechanism 70 or 80 positioned on the inlet of the pump 72 of the electronics unit 67 or 87 and the portion of the electronics cassette closest to the absorbent area. The pump inlet protection mechanism 70, 80, 90, or 95 as shown in FIGS. 2, 3A-3D, 4A-4B, and 5A-5E can be dome shaped, rectangular, curved, or can be any other shape to provide support to the flexible circuit board 69, 89 and protect the pump inlet from fluid within the dressing. The pump inlet protection mechanism can be a preformed sintered piece of material custom designed to fit the pump outlet and/or shape the flexible circuit board.

As illustrated in FIGS. 5A and 5D, the electronics cassette 62 includes one or more slits, grooves or recesses 81 in the casing 73 or 83. The slits, grooves or recesses 81 can allow for the electronics cassette 62 to be flexible and conform to the shape of the wound. The slits, grooves or recesses 81 of the electronics cassette can align with the slits, grooves or recesses 71 of the electronics unit 67 or 87. The casing can have two parallel slits, grooves or recesses 81 forming three segments in the electronics cassette 62. The slits, grooves or recesses 81 of the casing 73 create hinge points or gaps that allows for flexibility of the casing at that hinge point.

FIGS. 5B and 5E illustrates embodiments of a top view of the electronics cassette 62 or 82. The pump exhaust 64, switch 65, and indicators 66 are shown on the top surface surrounded by the casing 73 or 83. As illustrated, one embodiment of the electronics cassette 62 or 82 has two hinge points, slits, grooves or recesses 81 on the top or upper surface of the cassette to separate the cassette into three regions or panels, for example one to contain one battery, one to contain the pump and one to contain another battery. In some embodiments, the hinge points, slits, grooves or recesses can be on the top surface, bottom surface, or on both the top and bottom surfaces of the cassette. In some embodiments, the slits, grooves or recesses may extend parallel with a longitudinal axis of the dressing.

The electronics unit 87 and electronics cassettes for FIGS. 5C-5E are similar to the electronics unit and cassette described with reference to FIG. 5A-5B. However, the electronics unit 67 and pump inlet protection mechanism 70 of FIG. 5A-5B is similar to the electronics unit 67 and pump inlet protection mechanism 70 described with reference to FIG. 2. FIGS. 5D-5E illustrate an embodiment of the electronic cassette 82 with the electronics unit 87 and pump inlet protection mechanism 80 of FIG. 5C. FIG. 5C illustrates an embodiment of a pump and electronics unit 87 without showing the electronics casing 73 surrounding the electronics unit. The flexible circuit board 89 and pump inlet protection 80 have a different configuration than the electronic unit 67 shown in FIG. 2. In some embodiments, the portions of the flexible circuit board 89 that attaches to the batteries 68 is folded under the portion of the flexible circuit that contains the on/off switch 65. Since the flexible circuit board is folded under itself, the surface of the flexible circuit board that connects the batteries contacts can be facing the wound surface as shown in FIG. 5C. Due to this configuration, the battery contacts are not visible from the top view of the electronics unit as shown in FIG. 5C. FIGS. 5C-5E illustrate the pump inlet protection device 80 that fits to the opening in the electronics cassette.

Figure 6C:
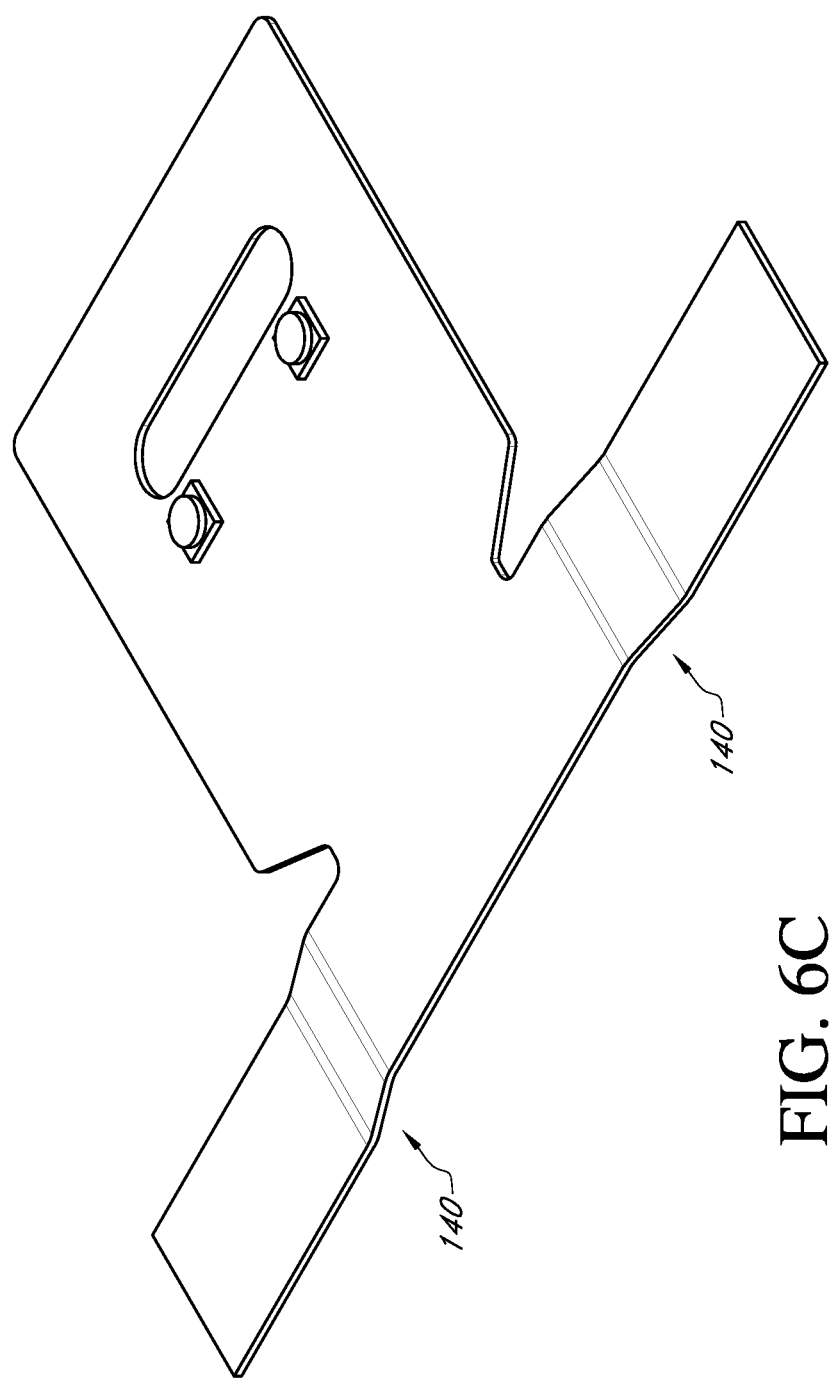
Figure 6D:
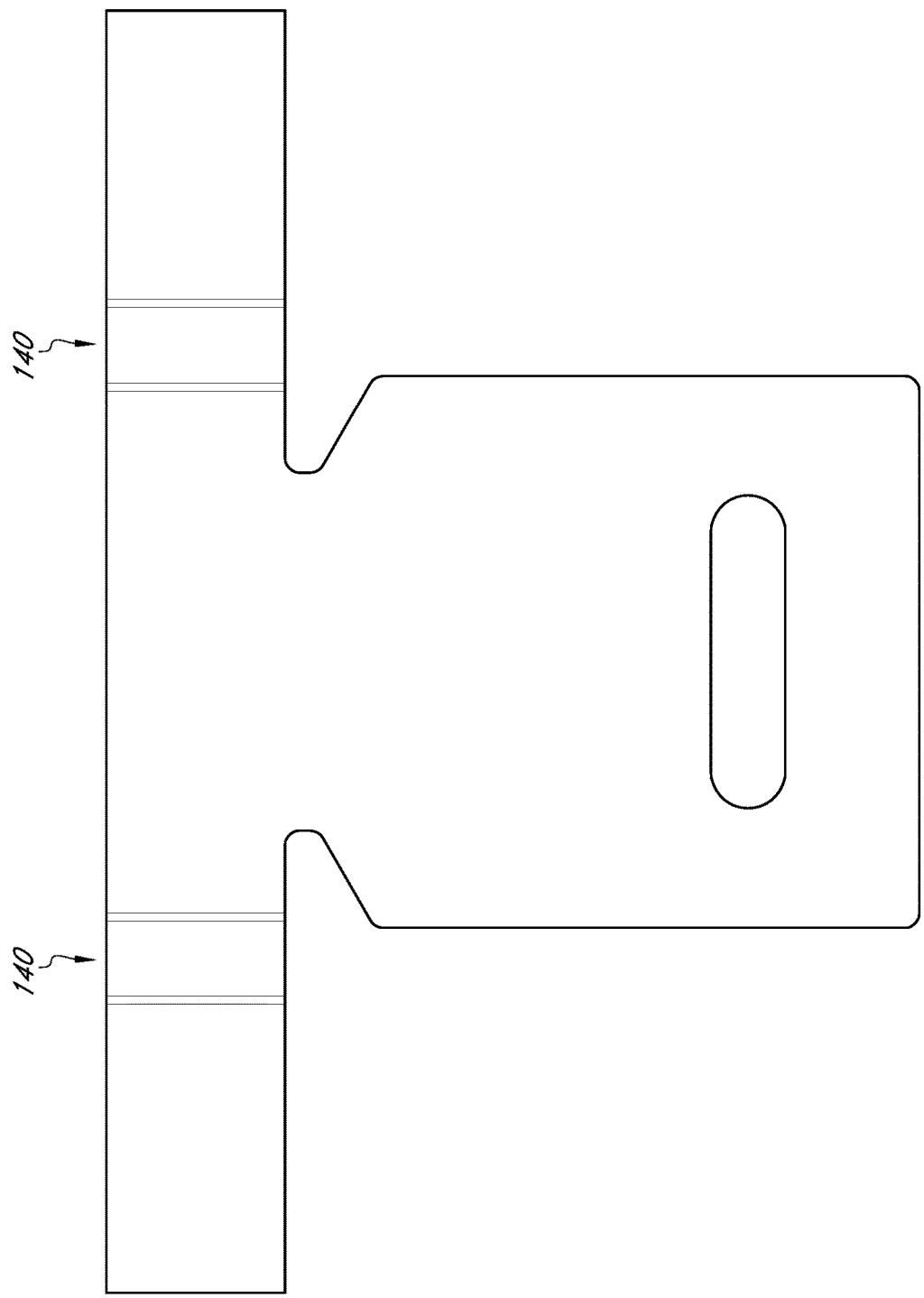
Figure 6E:
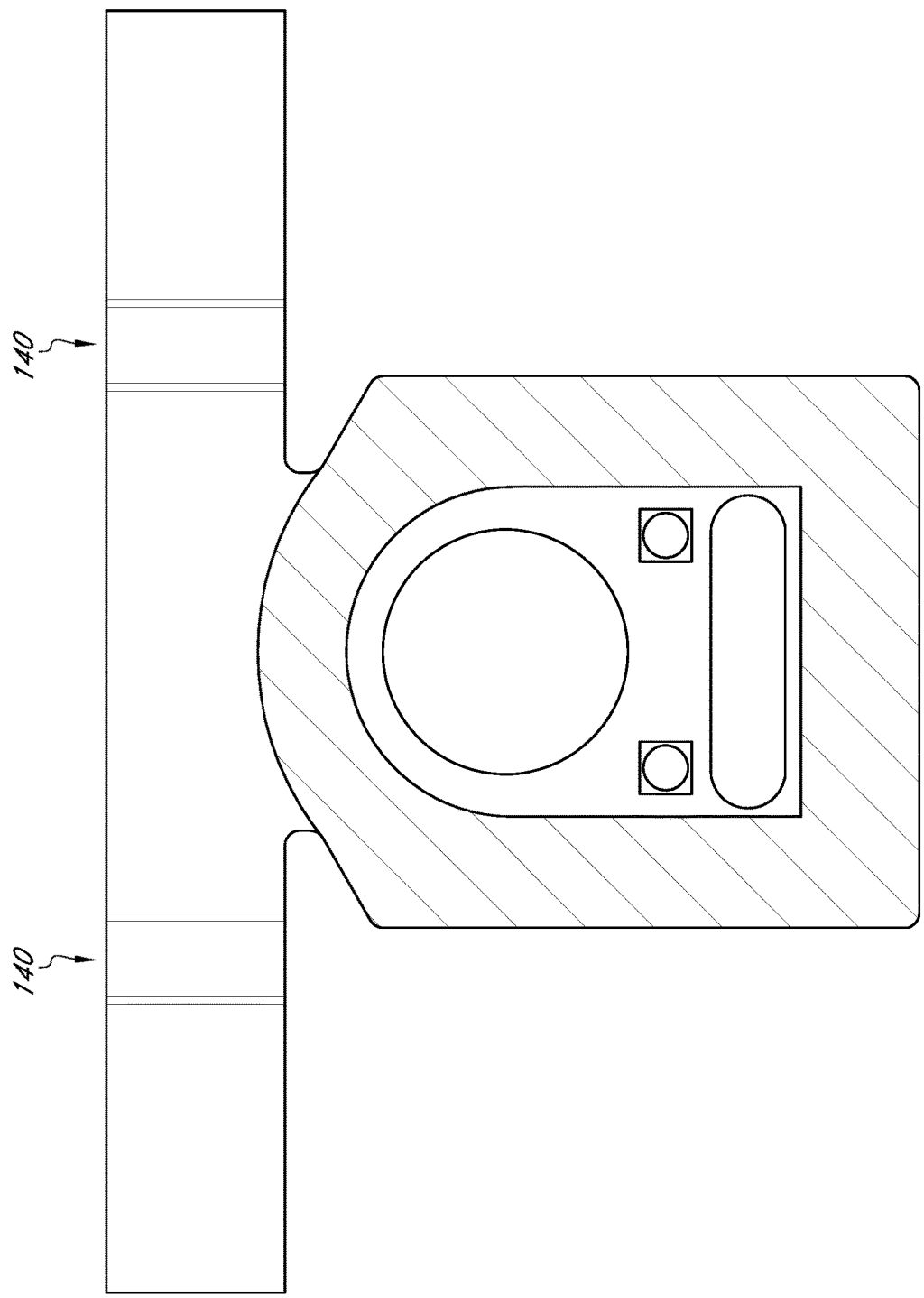

FIGS. 6A-6D illustrate an embodiment of the flexible circuit board for use in the electronics cassette. The flexible circuit board illustrated in FIGS. 6A-6D is similar to the flexible circuit board 69 described with reference to FIG. 2. The flexible circuit board includes a fold 140 to allow the flexible circuit board to be positioned under battery contacts when integrated into the electronics unit as illustrated in FIG. 2. FIG. 6E illustrates the area (hatched) that could be bonded to for sealing between the top film or electronics casing and the flexible printed circuit board.

Figure 7A:
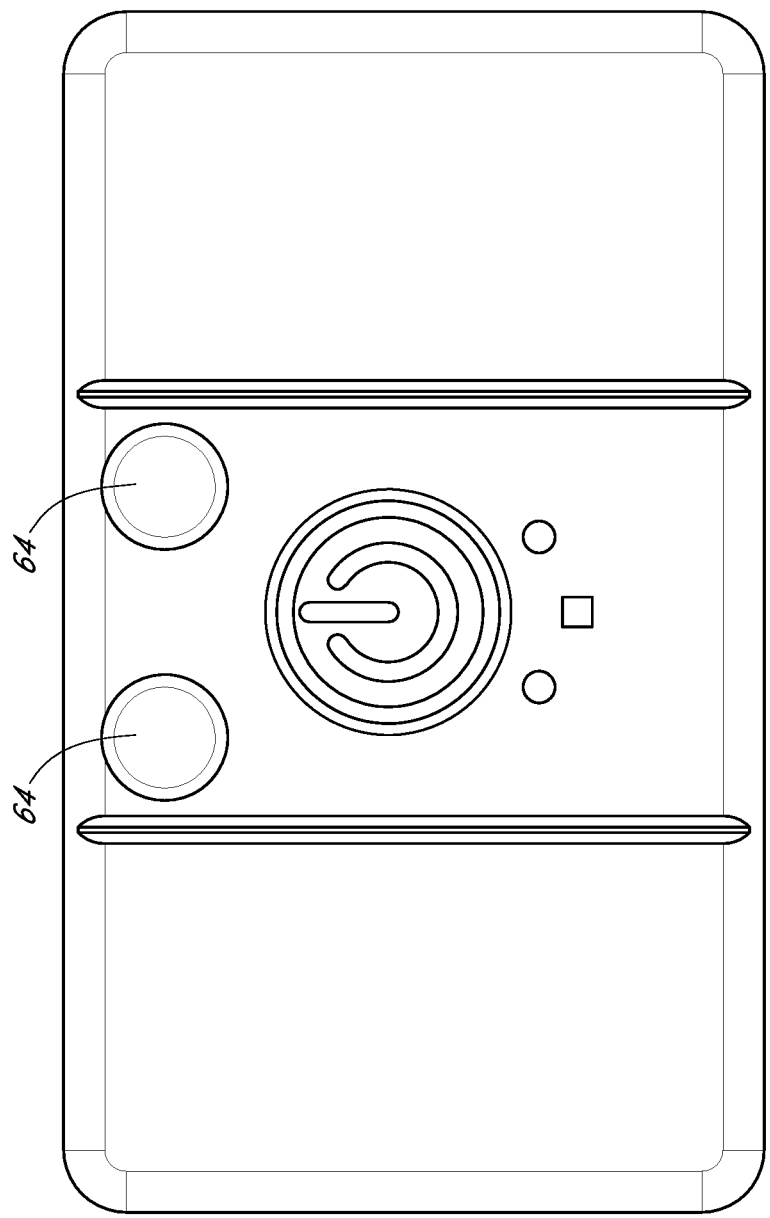
FIGS. 7A-7D illustrate embodiments of electronic cassettes with two pump exhausts in various configurations and shapes.
Figure 7B:
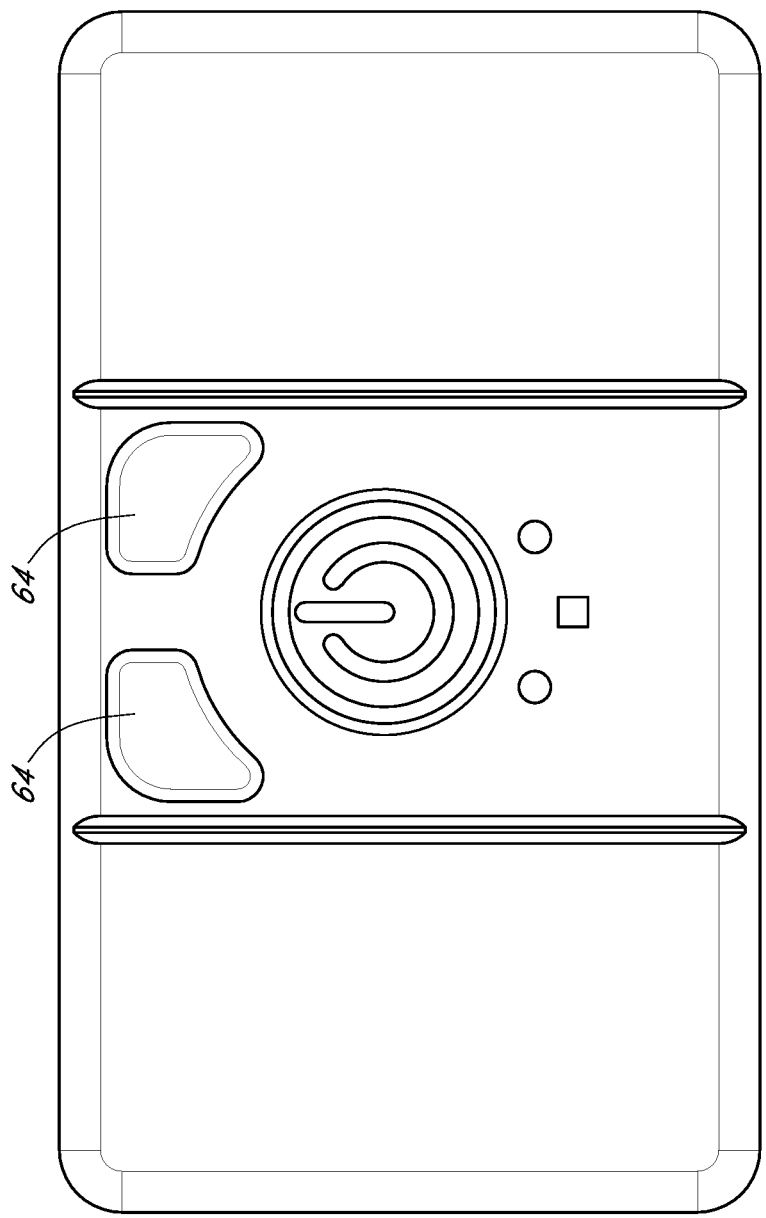
Figure 7C:
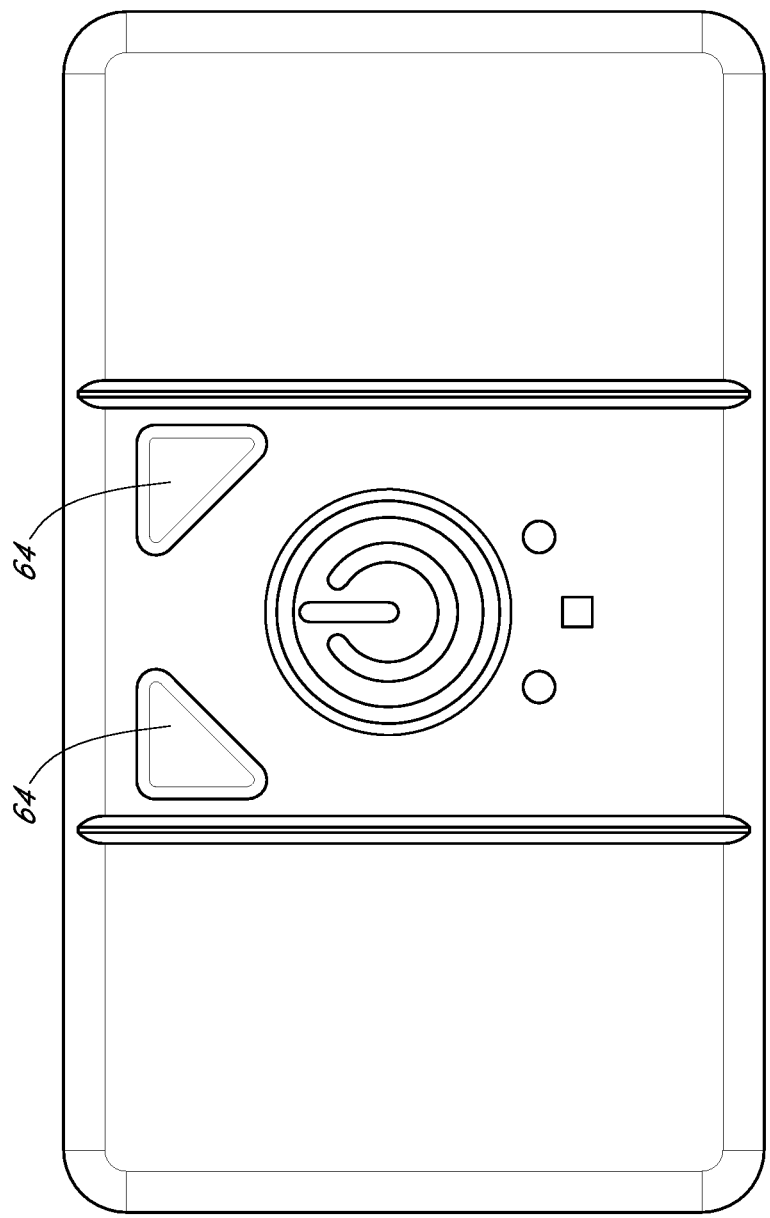
Figure 7D:
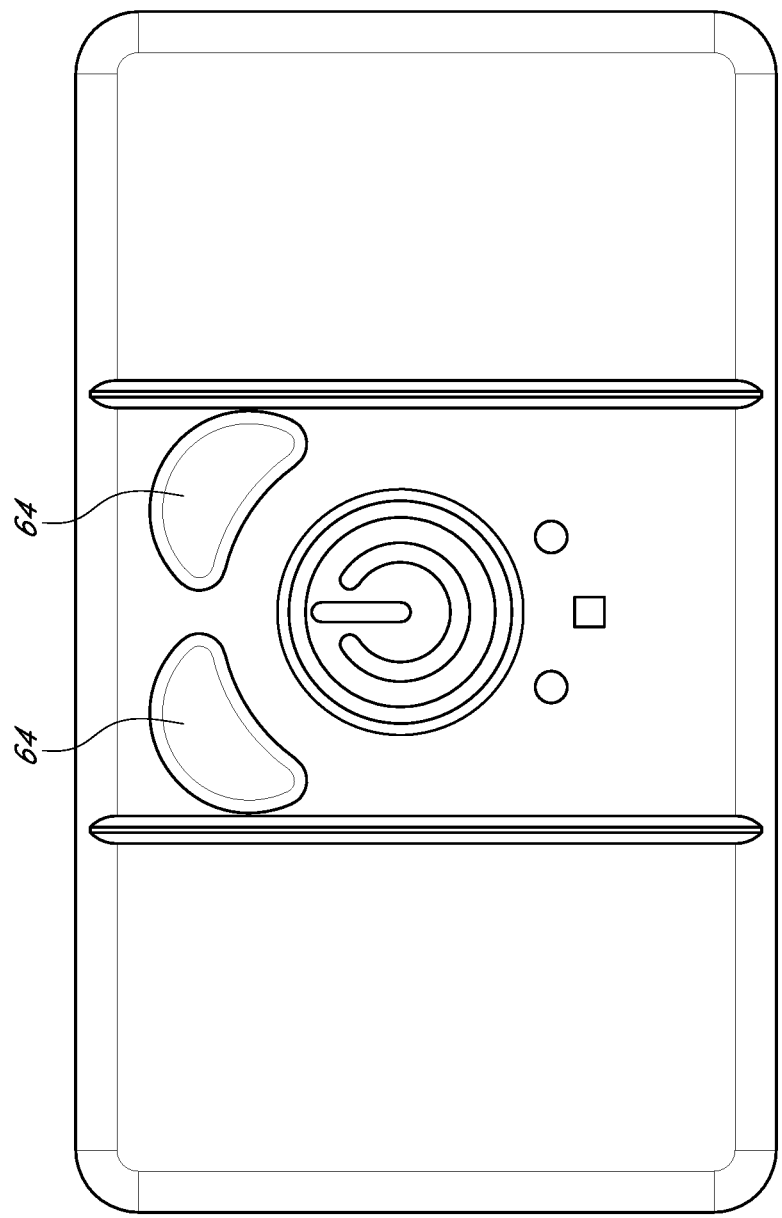

FIGS. 7A-7D illustrate embodiments of electronic cassettes with two pump exhaust vents 64 in various configurations and shapes. In some embodiments, the two pump exhaust vents 64 can be various shapes. The two pump exhaust vents 64 can be circular as shown in FIG. 7A, irregular shaped as shown in FIG. 7B, triangular as shown in FIG. 7C, crescent shaped as shown in FIG. 7D, or any other shape including but not limited to a rectangle, square, rounded rectangle, rounded square, oval, or racetrack oval shaped. The two pump exhausts allow for one exhaust to become blocked, occluded, or inoperable while still allowing the other exhaust to function.

Figure 8A:
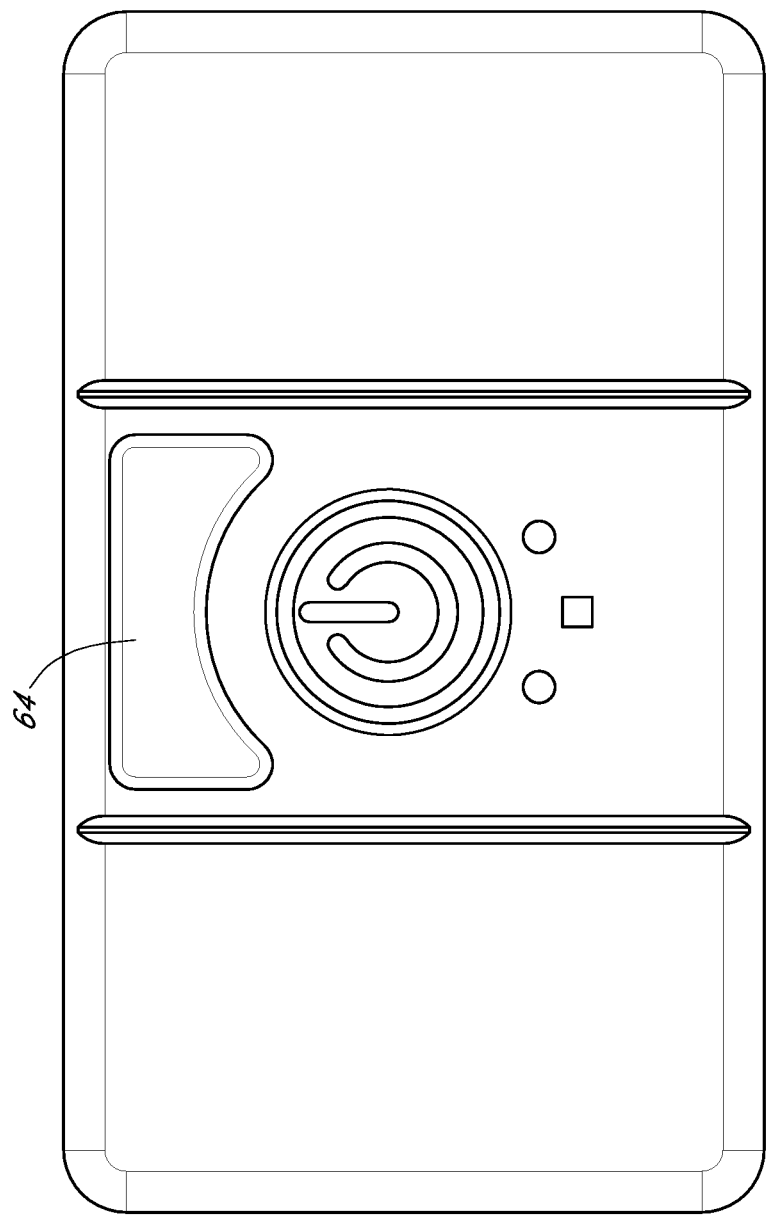
FIGS. 8A-8C illustrates embodiments of electronic cassettes with one pump exhaust in various shapes.
Figure 8B:
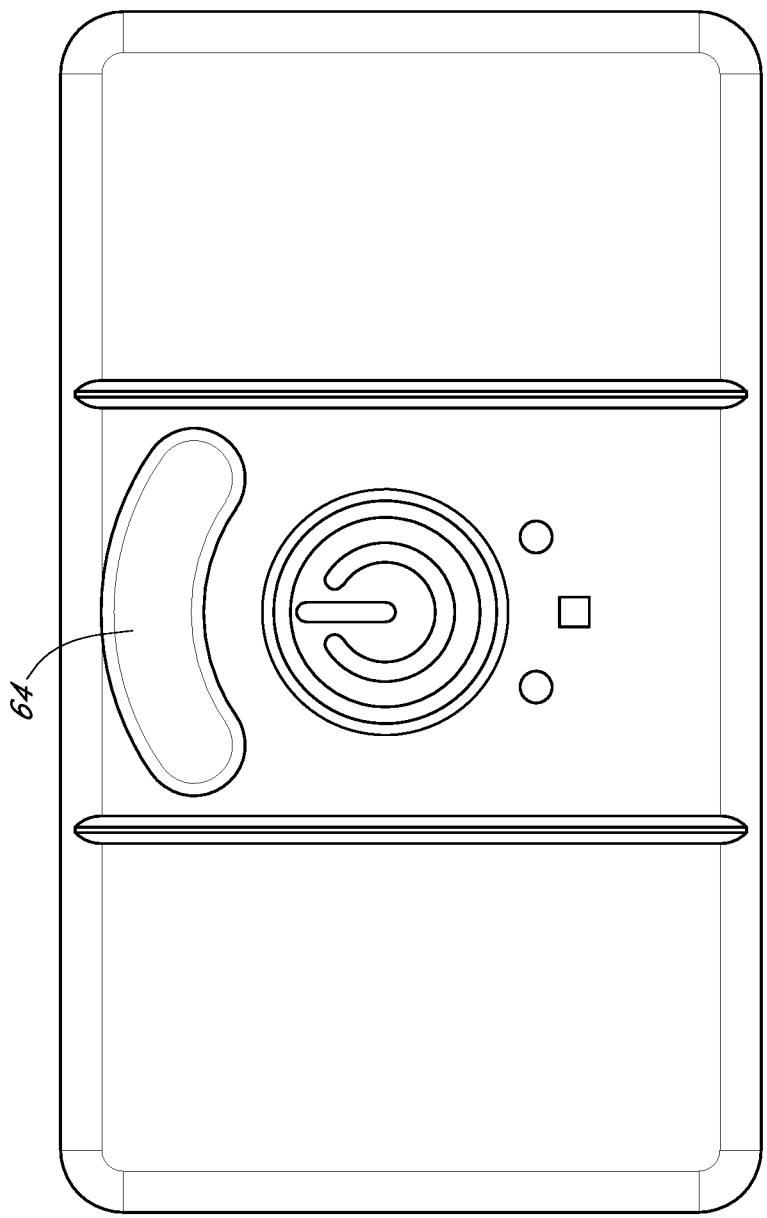
Figure 8C:
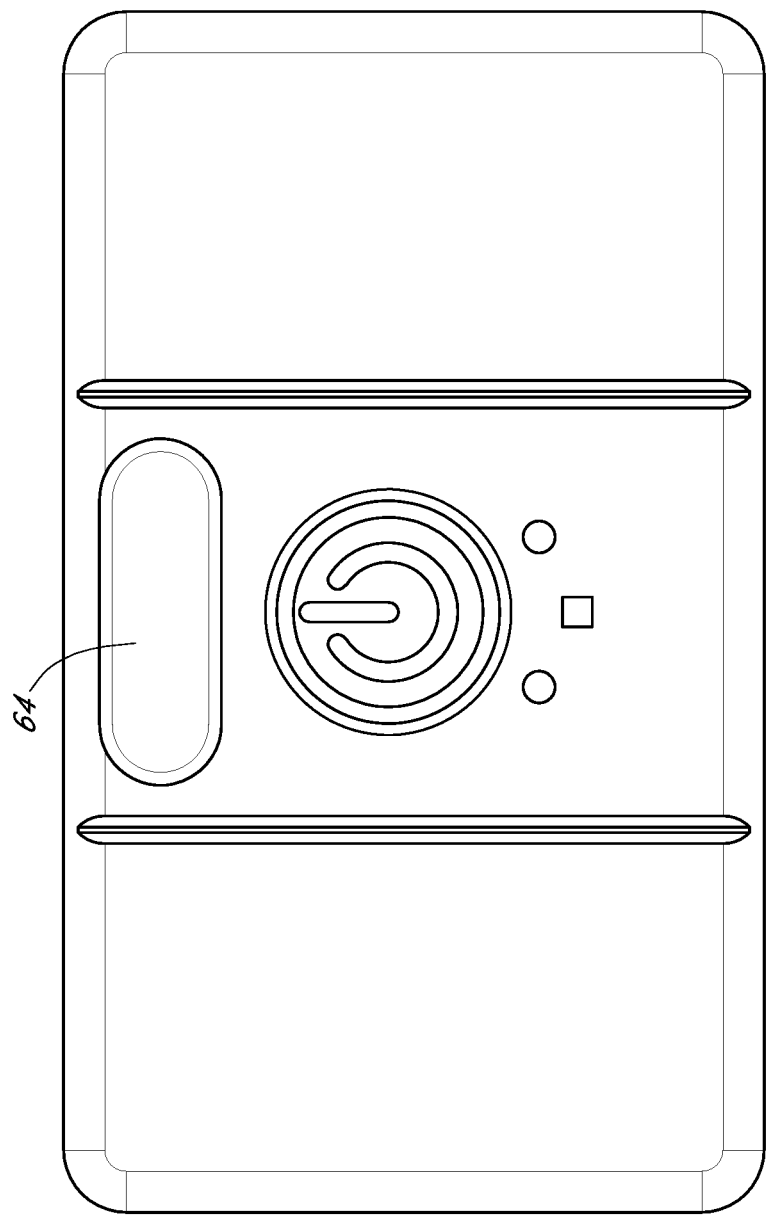

FIGS. 8A-8C illustrates embodiments of electronic cassettes with one pump exhaust vent 64 in various shapes. The pump exhaust vents 64 can be irregular shaped as shown in FIG. 8A, crescent shaped as shown in FIG. 8B, racetrack oval shaped as shown in FIG. 8C, or any other shape including, but not limited to, a circle, rectangle, square, rounded rectangle, rounded square, oval, or triangle shaped.

Figure 9A:
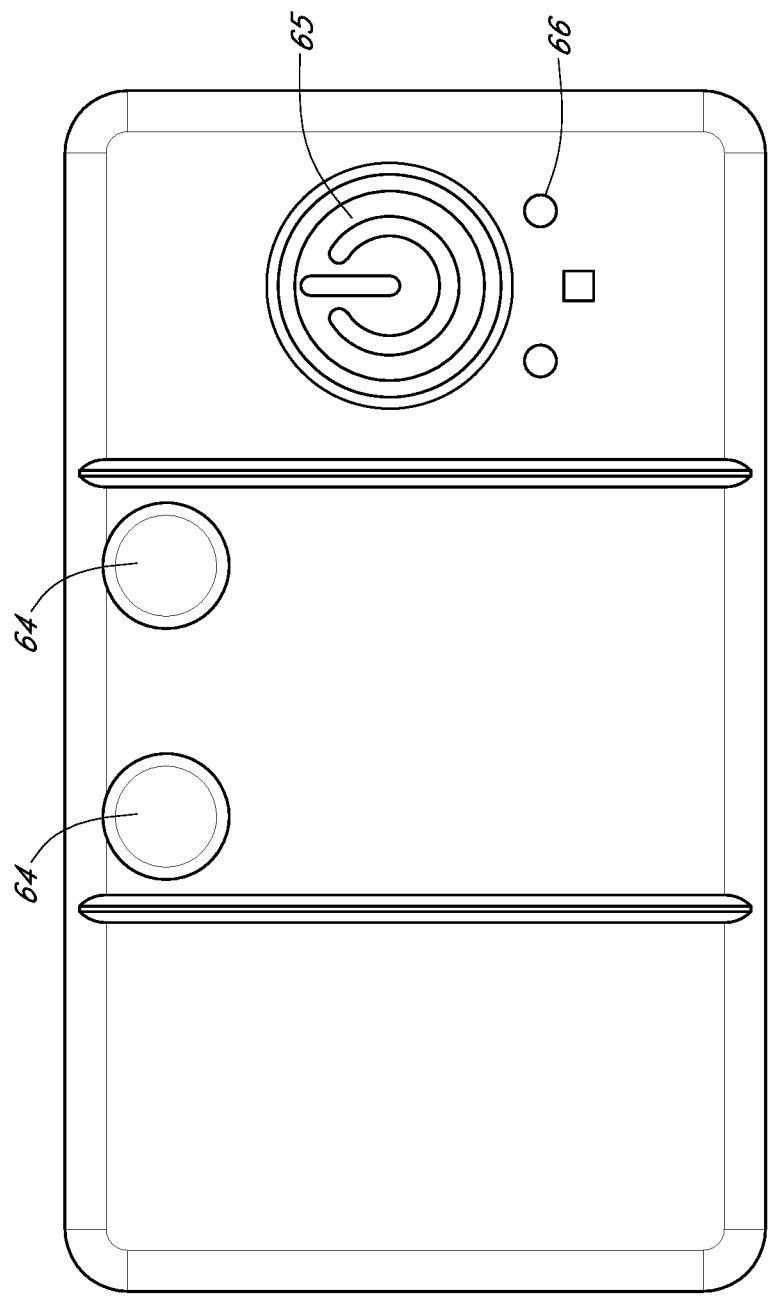
FIGS. 9A-9D illustrate various embodiments of the electronic cassette with various configurations for components on the electronic cassettes.
Figure 9B:
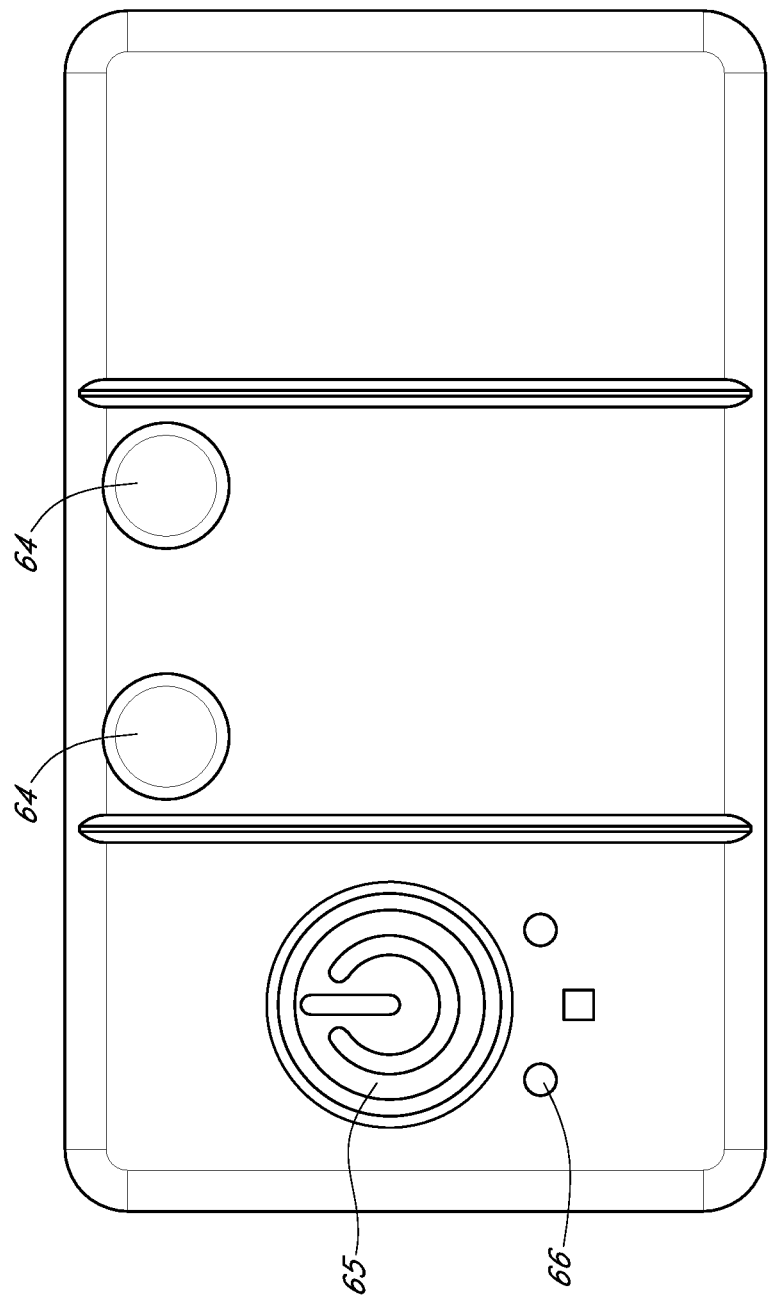
Figure 9C:
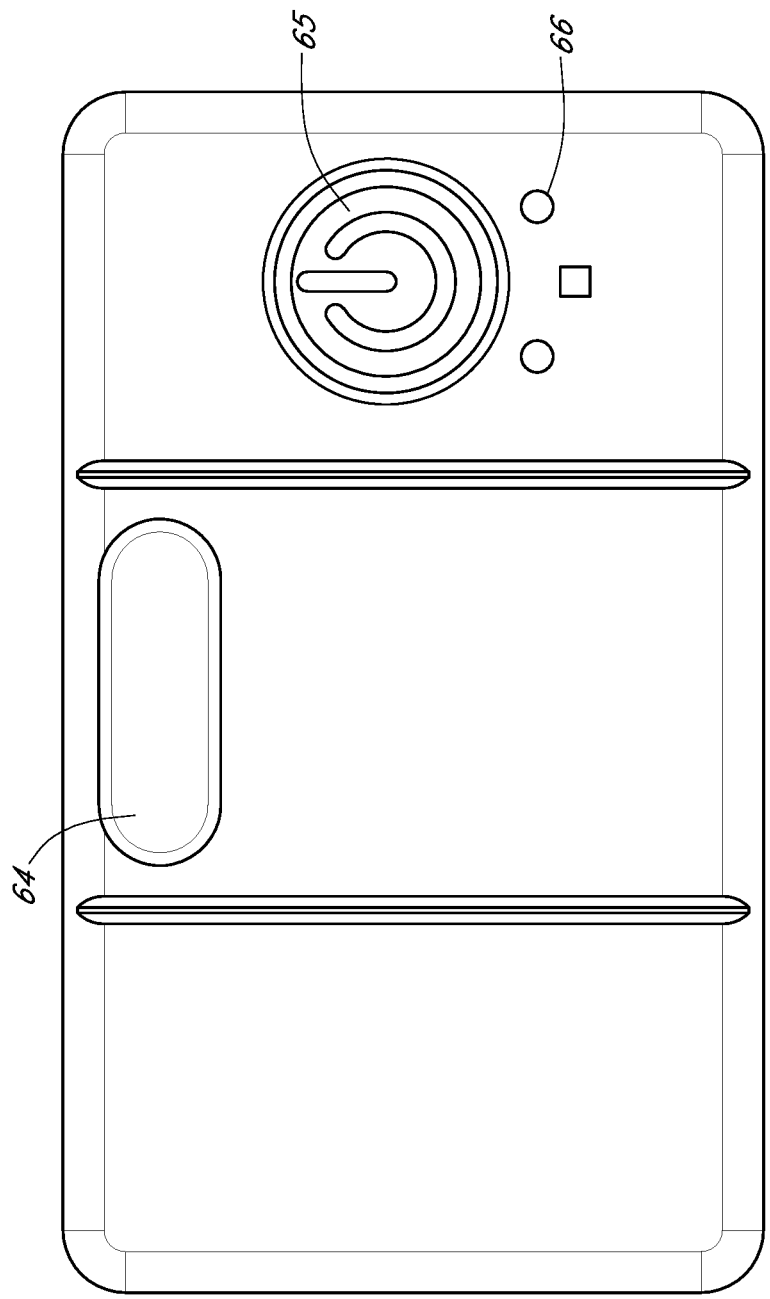
Figure 9D:
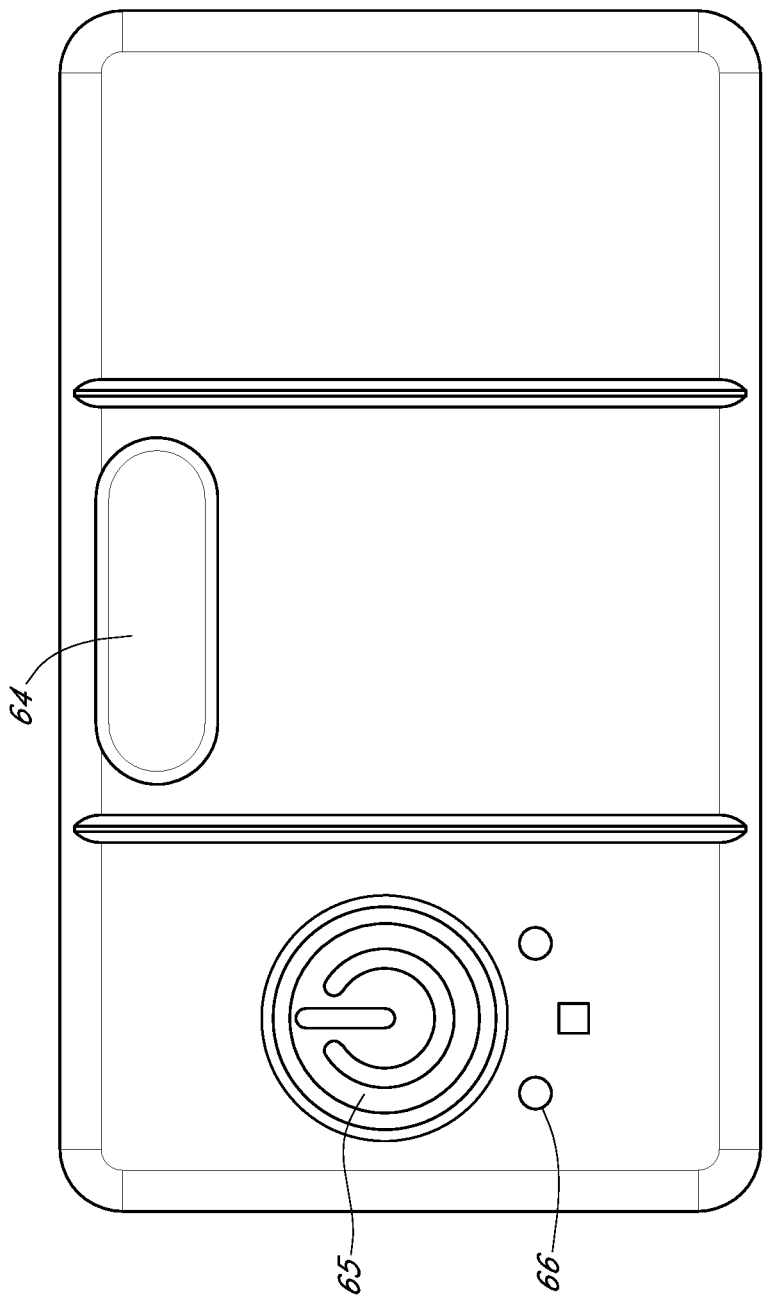

FIGS. 9A-9D illustrate various embodiments of the electronic cassette with various configurations for components on the electronic cassettes. In some embodiments, one or more pump exhaust vents 64 can be used as described with reference to FIGS. 7A-7D and 8A-8C. FIGS. 9A-9B illustrates two exhaust vents 64. FIGS. 9C and 9D illustrate an electronics cassette with one exhaust vent 64. In some embodiments, the on/off switch or button 65 and one or more indicators 66 can be positioned on different portions of the electronic cassette. In some embodiments, the on/off switch or button 65 and one or more indicators 66 can be positioned on the right panel of the electronic cassette as shown in FIGS. 9A and 9C. In some embodiments, the on/off switch or button 65 and one or more indicators 66 can be positioned on the left panel of the electronic cassette as shown in FIGS. 9B and 9D.

Figure 10:
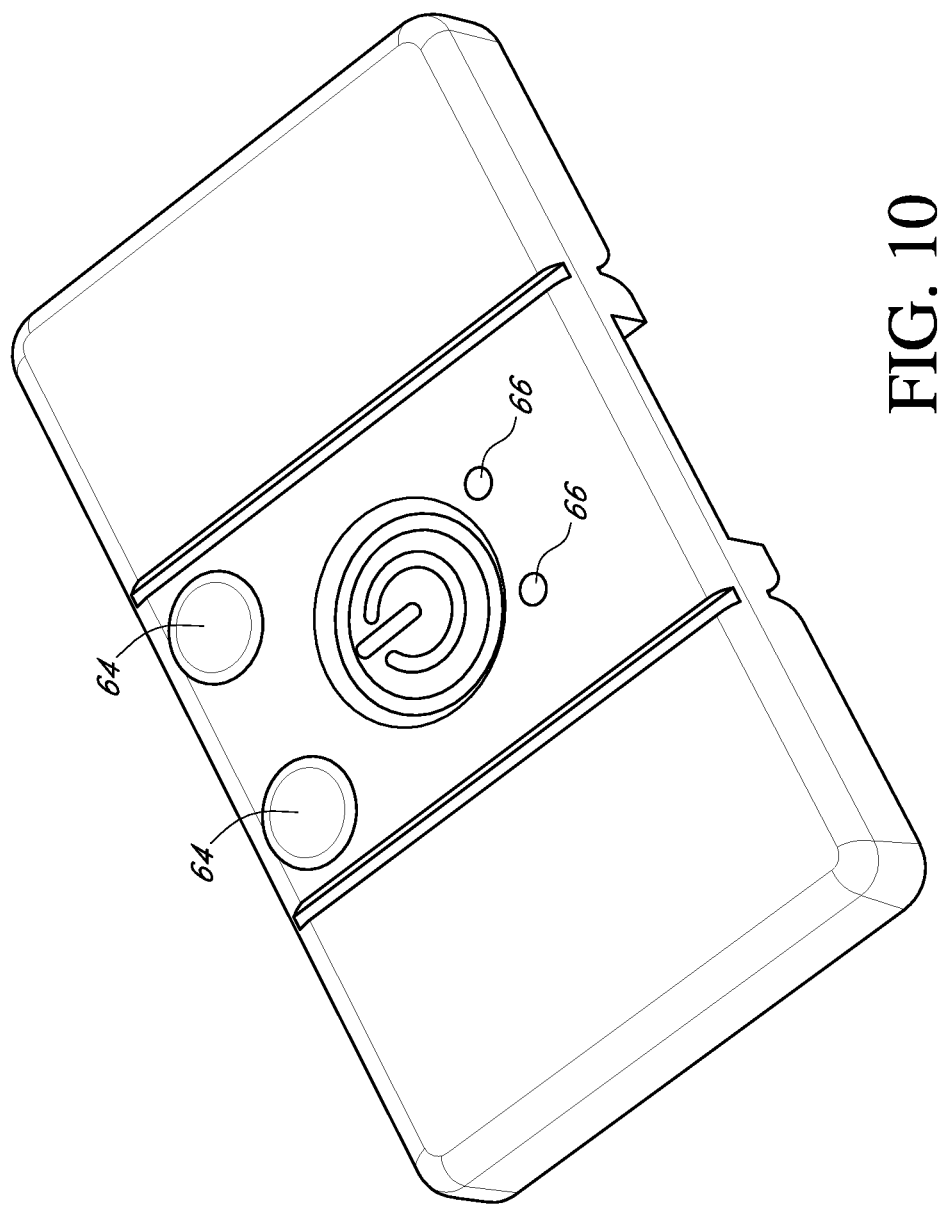
FIG. 10 illustrates an embodiment of the electronics cassette.

FIG. 10 illustrates an embodiment of the electronics cassette similar to the electronics cassette described with reference to FIGS. 5A-5B and 5D-5E. The electronics cassette is shown with two openings in the casing for the indicators 66 on the top surface of the cassette. The electronics cassette as illustrated in FIG. 10 includes a casing that completely covers the battery portion underlying the casing.

In some embodiments, one or more of the exhaust vents 64, switch or button 65, and one or more indicators 66 described with reference to FIGS. 7A-7D, 8A-8C, 9A-9D, and 10 can be the exhaust vents 64, switch or button 65, and/or one or more indicators 66 of the electronics unit described with reference to FIGS. 2, 3A-3D, and 4A-4B visible through holes or apertures in the casing of the electronics cassette. In some embodiments, one or more of the exhaust vents 64, switch or button 65, and/or one or more indicators 66 described with reference to FIGS. 7A-7D, 8A-8C, 9A-9D, and 10 can include material of the casing of the electronics cassette that covers the exhaust vents 64, switch or button 65, and one or more indicators 66 of the electronics unit described with reference to FIGS. 2, 3A-3D, and 4A-4B. In some embodiments, a gas permeable material can be provided as part of the casing of the electronics cassette that covers at least a portion of the exhaust vents 64 described with reference to FIGS. 7A-7D, 8A-8C, 9A-9D. In some embodiments, a transparent material can be provided as part of the casing of the electronics cassette that covers at least a portion of the one or more indicators 66 described with reference to FIGS. 7A-7D, 8A-8C, 9A-9D. In some embodiments, the material of the casing of the cassette covering at least a portion of the switch or button 65 described with reference to FIGS. 7A-7D, 8A-8C, 9A-9D can be flexible or otherwise allow for the switch or button 65 to be depressed or activated.

Figure 11:
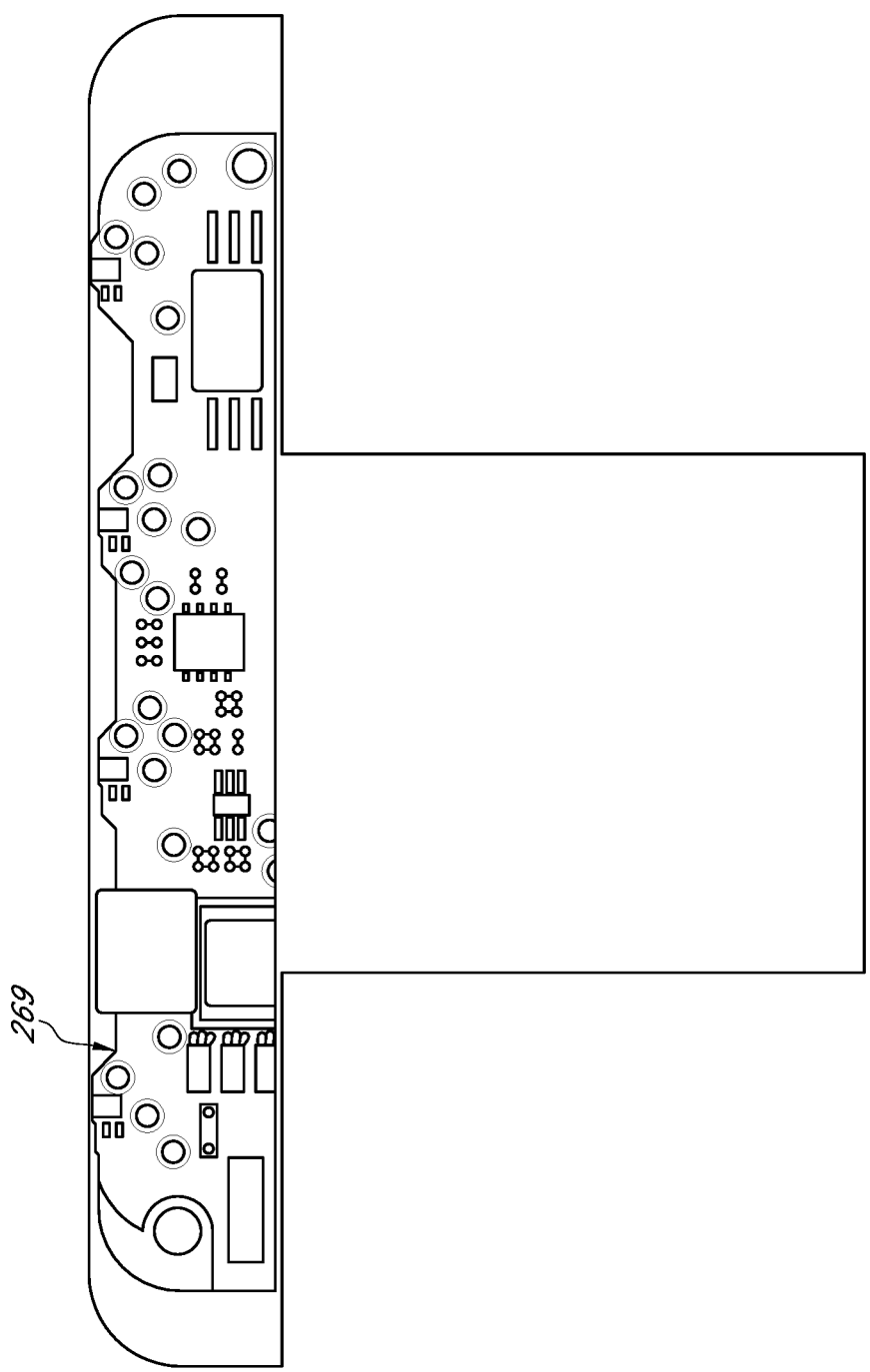
FIGS. 11-16 illustrate an assembly process for the electronics unit of the electronics cassette.
Figure 12:
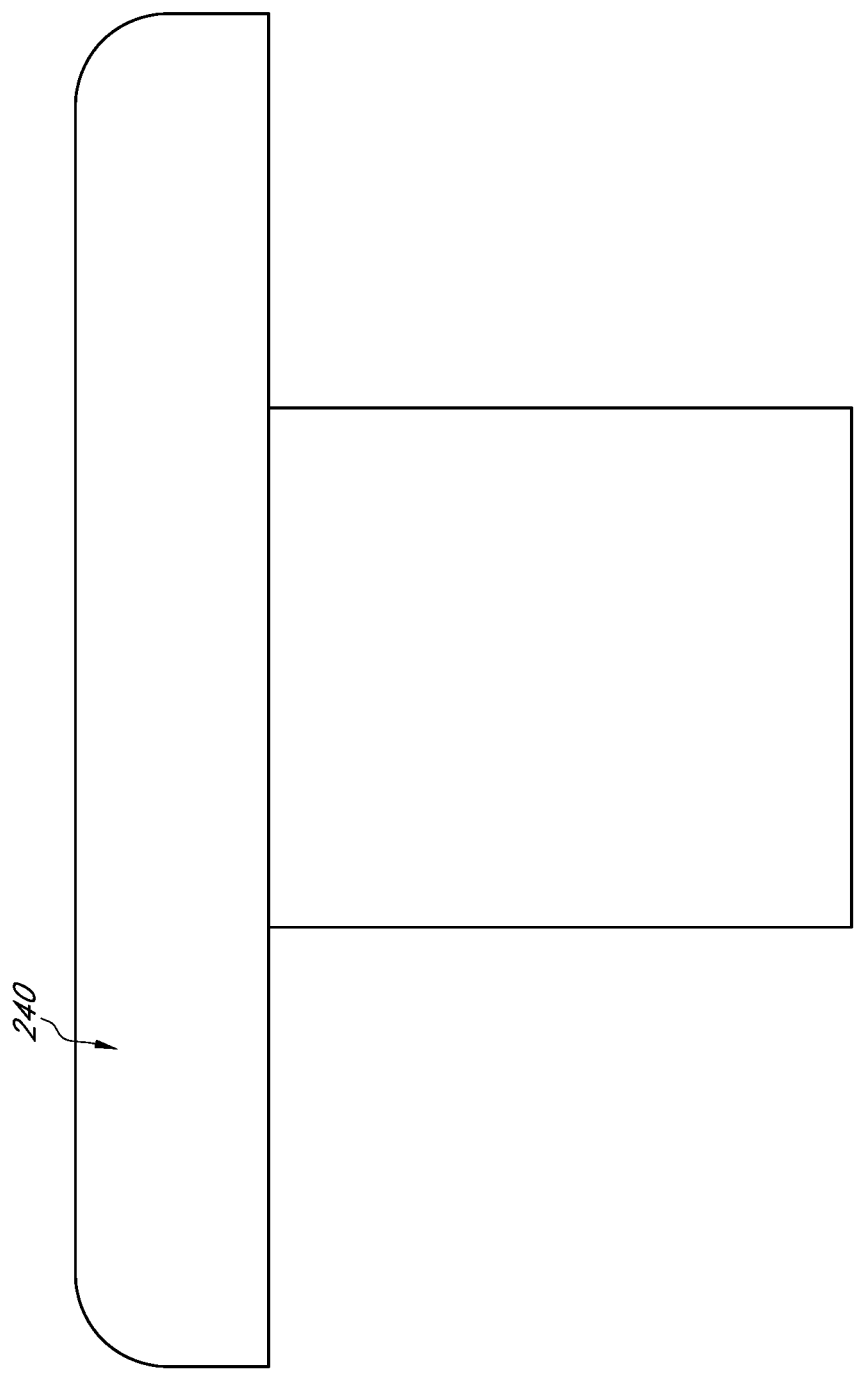

FIGS. 11-16 illustrate an assembly process for the electronics unit of the electronics cassette. FIG. 11 illustrates an embodiment of a flexible printed circuit 269. The flexible printed circuit board 269 can have all components on one side as shown in FIG. 11. In other embodiments, the flexible printed circuit board 269 can have some components on each side of the flexible printed circuit board 269. FIG. 12 illustrates the use of a polyimide tape or other material 240 that can be applied to the underside of the flexible circuit board 269 covering the components of the flexible circuit board 269. The polyimide tape or other insulating or encapsulating material can serve the purpose of encapsulation, electrical isolation, and mechanical strain relief for the batteries. In some embodiments, the electronics can be facing down to help with Electrostatic Discharge (ESD) and/or Electromagnetic Compatibility (EMC) of the device when worn.

In some embodiments, the electronics unit or assembly can be fit into a jig. The flexible circuit 269 can be fit in a jig. The batteries 268 can be fit into a jig as shown with reference to FIG. 13. In some embodiments, the batteries can include battery contacts 230 that can be spot welded to the flexible circuit board 269. A top layer of polyimide tape or other insulating or encapsulating material 241 can be applied over the assembled battery contacts as shown in FIG. 14. This material can serve the purpose of encapsulation, electrical isolation, and mechanical strain relief for the batteries.

Figure 15:
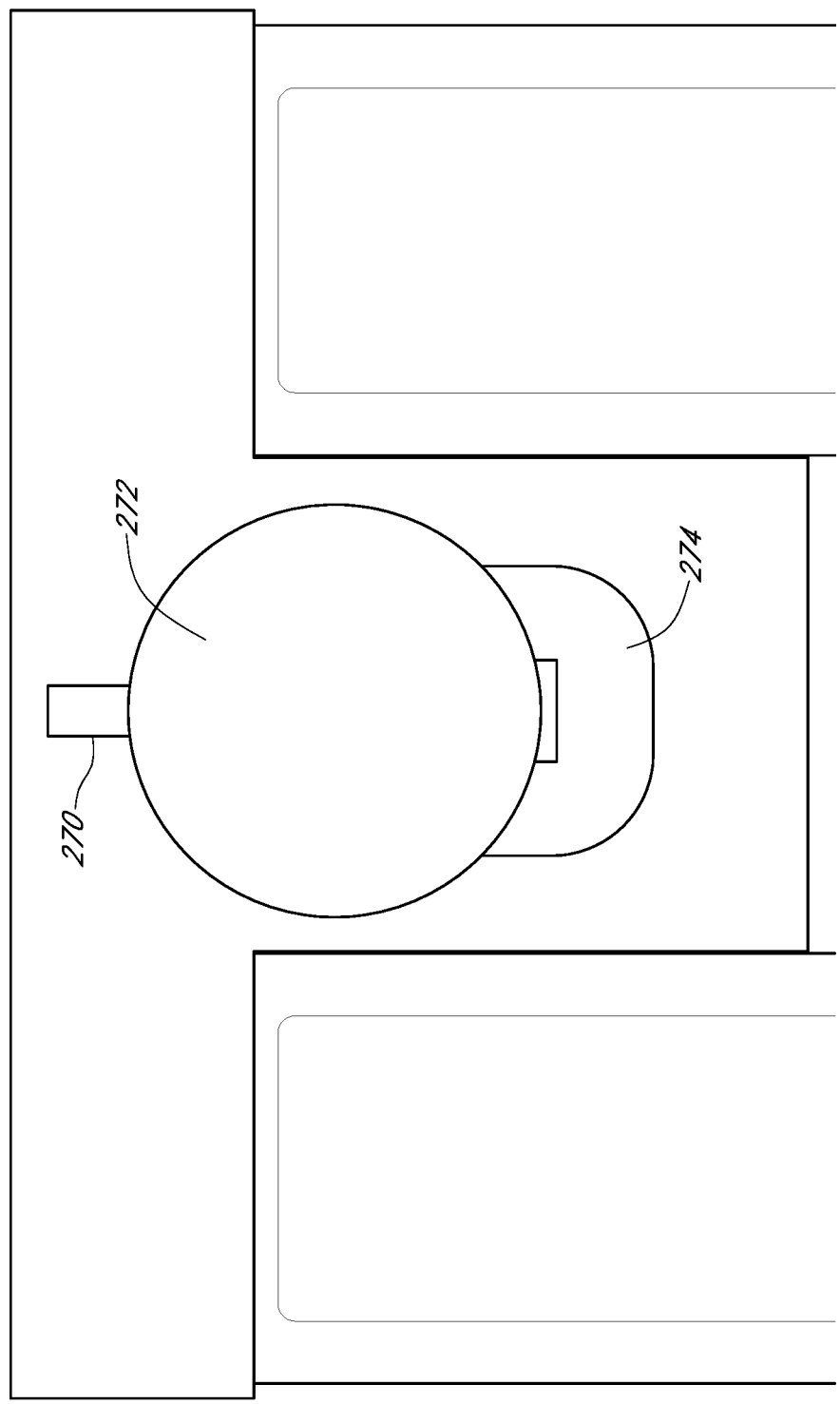

In some embodiments, a pump 272 can be pre-assembled with the custom inlet mechanism 270 and outlet mechanism 274 to form a pump assembly. As illustrated in FIG. 15, the pump assembly can be jigged into position. The pump 272 can have solder connections, so the pump assembly can be soldered onto the flexible printed circuit. The pump 272 can be encapsulated with a sealant that can be applied over these solder joints.

Figure 16:
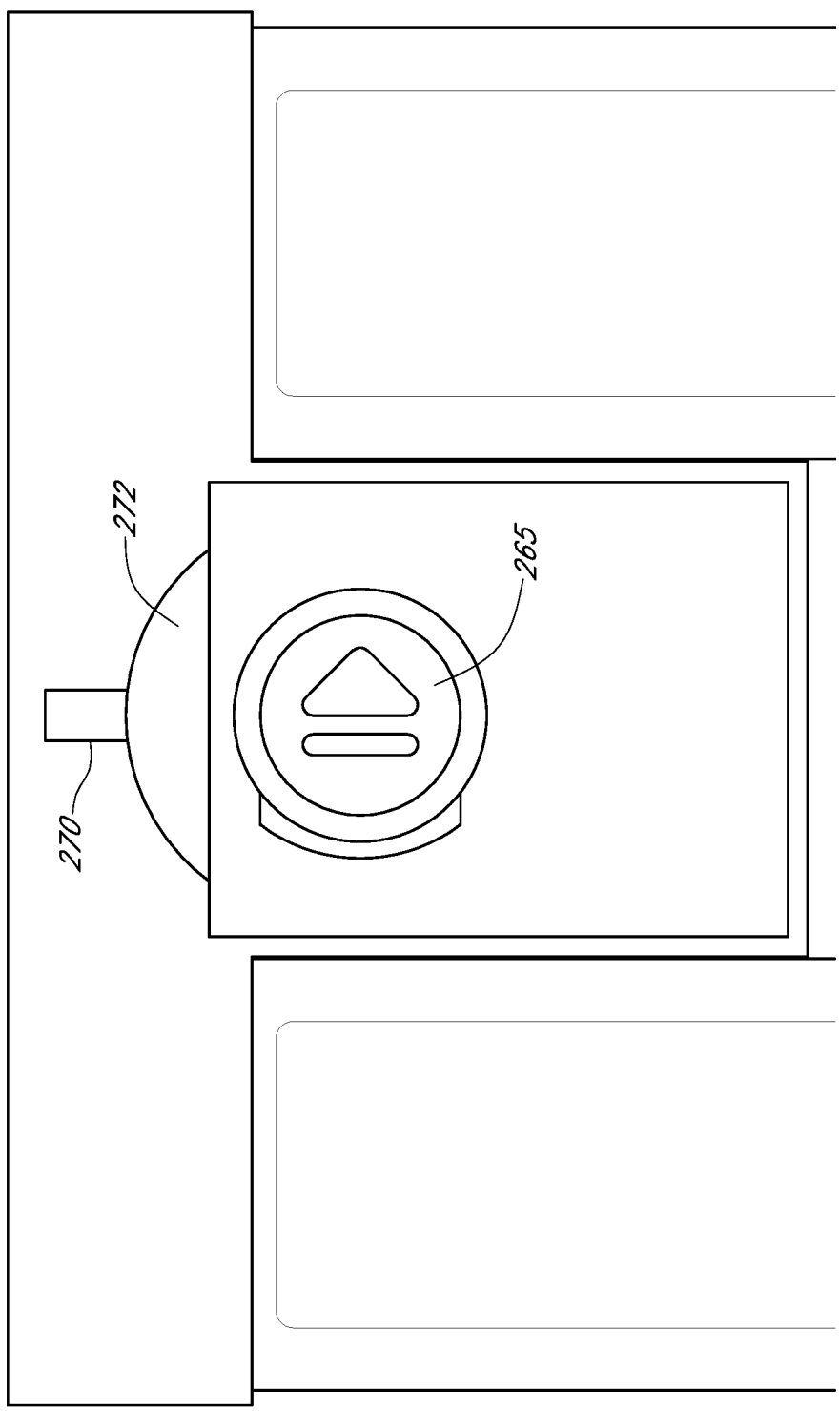

In some embodiments, the switch area 265 can be positioned on the top side of the flexible PCB 269 and over the top surface of the pump as shown in FIG. 16. In some embodiments, the portion of the PCB with the switch area 265 can be folded over onto the pump or pump assembly. In some embodiments, a spacer material can be placed over the assembly to fill the gaps between the components of the electronics and casing of the cassette.

Figure 17:
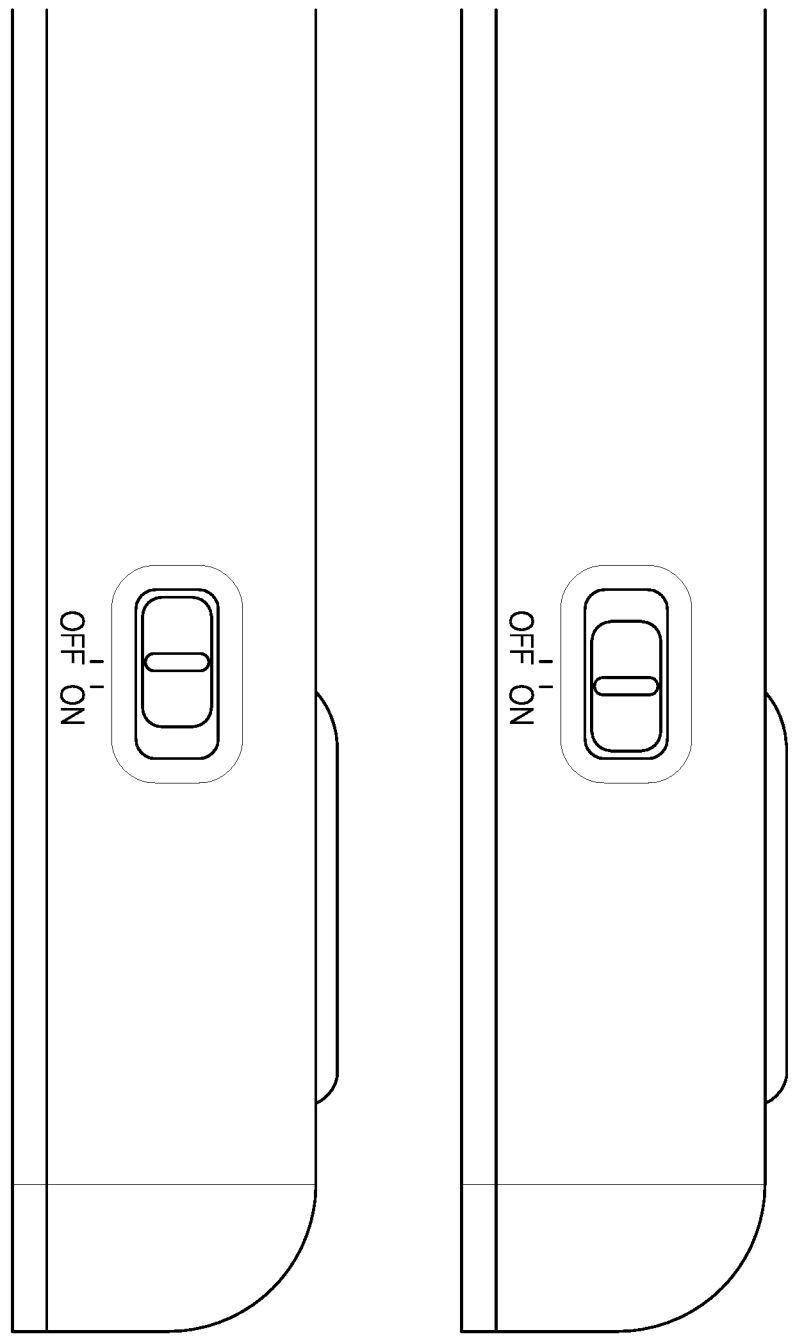
FIG. 17 illustrates an embodiment of on/off switch for use with a wound dressing with integrated electronics.

FIG. 17 illustrates an embodiment of on/off switch that can be used with a wound dressing with integrated electronics and with electronic units and cassettes described herein.

The dressings described herein incorporate electronic components in a portion of the dressing offset from the portion of the dressing placed over the wound. Components can be incorporated into the dressing to provide a bather that stops liquid from entering into the area near the electronics or encapsulates the electronics to protect the electronic components from fluid within the dressing. In some embodiments, the electronics can be encapsulated in a hydrophobic coating to protect the electronics from fluid within the dressing. A casing can be wrapped around the encapsulated electronics unit forming the electronics cassette. The casing can be a soft or patient compatible material to minimize the discomfort of a patient when the wound dressing with integrated electronics are in contact with the wound or skin. In some embodiments, the casing can include an absorbent or wicking material that allows the flow of fluid through the casing.

Electronics Cradle

Figure 18:
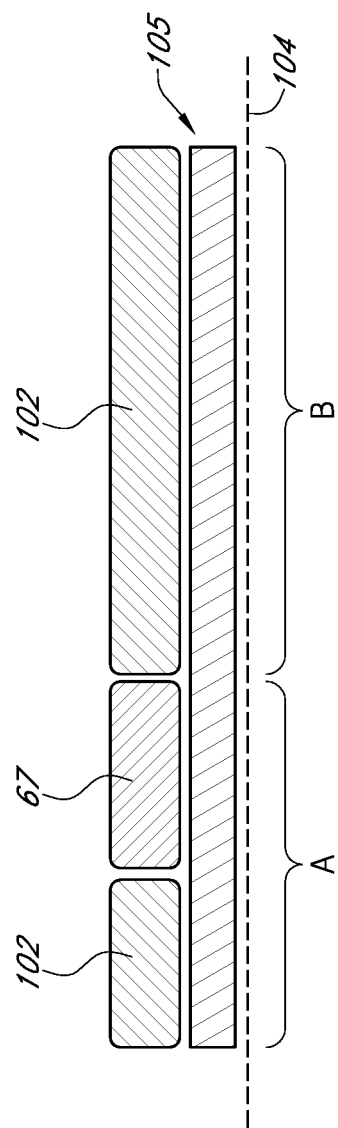
FIG. 18 illustrates an embodiment of a wound dressing incorporating an electronics unit within the dressing.

FIG. 18 illustrates an embodiment of a wound dressing incorporating an electronics unit 67 within the dressing. In some embodiments, the wound dressing can include a wound contact layer 104. The dressing can also include a spacer layer 105 which may be made of a 3D material above the wound contact layer. In some embodiments, the electronics sub assembly or electronics unit 67 can be embedded in an absorbent pad 102 towards one end of the dressing, as depicted in FIG. 18. FIG. 18 illustrates dressing layers with an electronics area A and an absorbent area B. In some embodiments, the electronics area A can include the electronics unit 67. In some embodiments, the absorbent area B can include the absorbent material 102 and can be positioned over the wound area to absorb fluid from the wound within the absorbent material or pad 102. The electronics unit 67 can be positioned in a hole in the absorbent pad 102 and can be surrounded by the absorbent pad as illustrated in FIG. 18 with the absorbent pad 102 on each side of the electronics unit 67. However, the presence of the electronics unit, since it is entirely non-absorbent, could physically inhibit the migration of wound exudate through the absorbent pad from area A to area B, the main body of the pad, and would thus result in pooling of wound exudate in area A. This can be deleterious to the patient, resulting in maceration of the skin and other potentially harmful effects.

Therefore, it can be useful to devise a dressing to facilitate normal distribution of exudate by which the fluid can be distributed through the entire pad, preventing pooling.

Figure 19A:
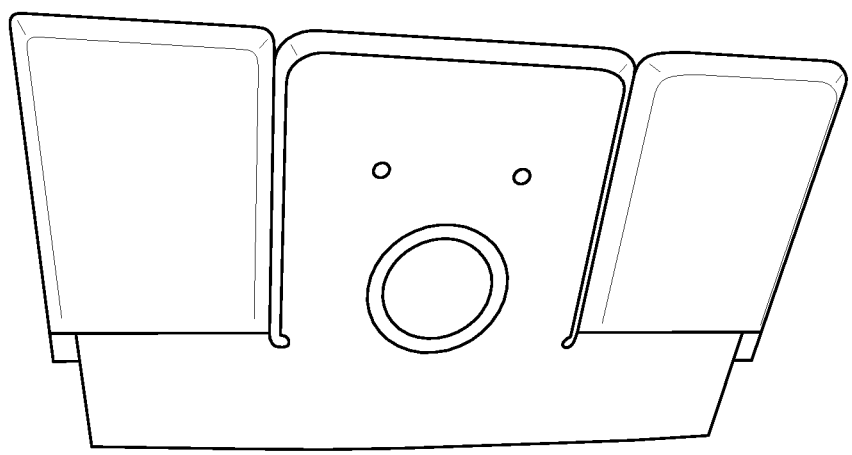
FIG. 19A illustrates an embodiment of the electronics unit.
Figure 19B:
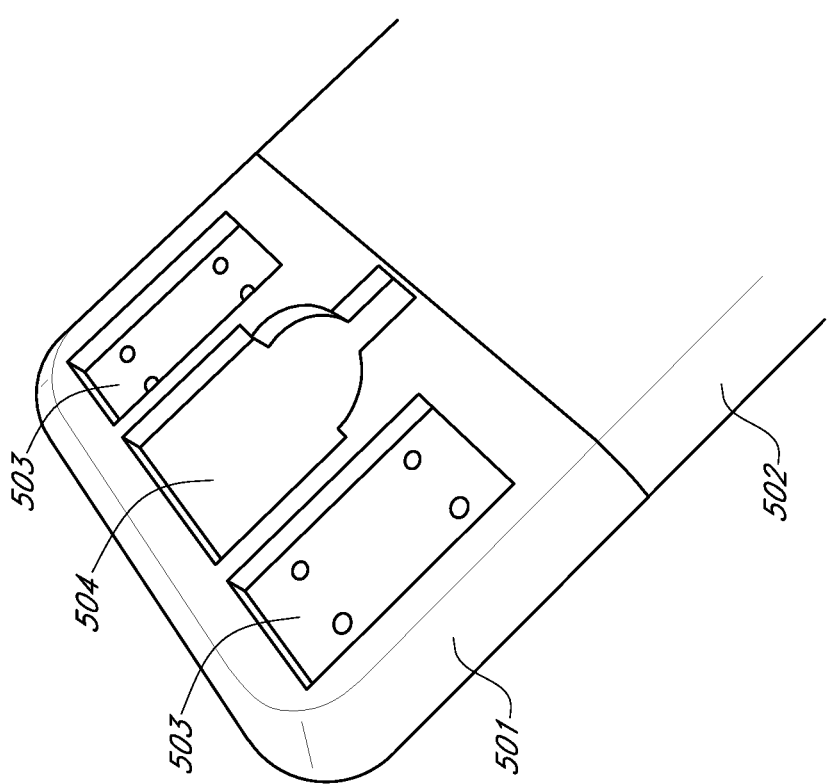
FIG. 19B illustrates an embodiment of the cradle that can be within, adjacent to, and/or above the absorbent dressing material.
Figure 19C:
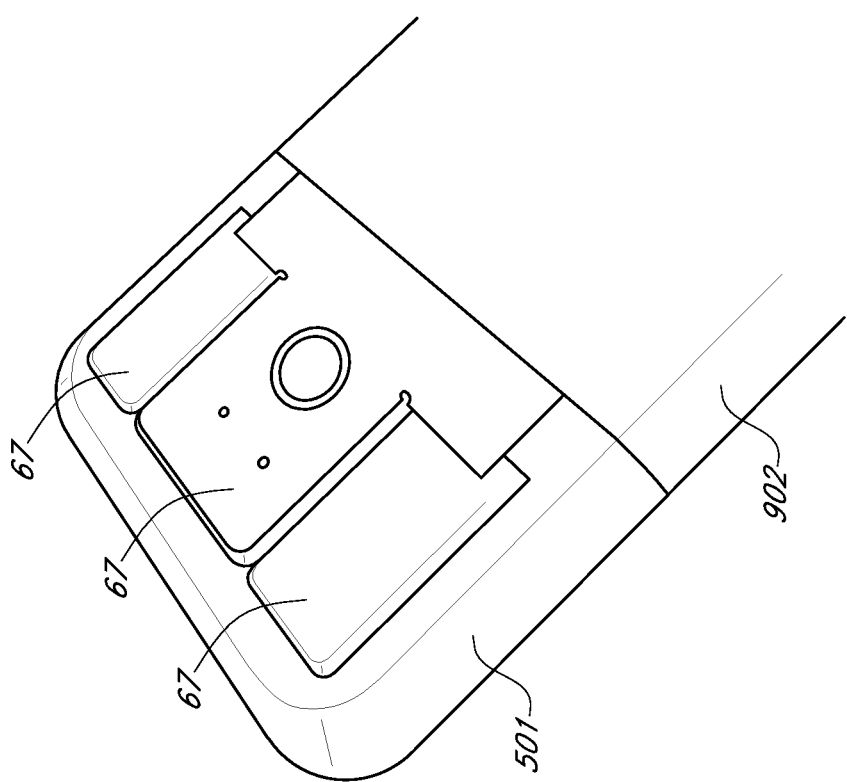
FIG. 19C illustrates an embodiment of the electronics unit incorporated into the cradle.

In some embodiments, a construct can be used that acts like a support mechanism or cradle for the electronics sub assembly. FIG. 19A illustrates an embodiment of the electronics unit 67. The electronics unit 67 can be coated and/or include a pump inlet and outlet protection mechanism to protect the pump from the fluid environment of the dressing as described herein. FIG. 19B illustrates an embodiment of the material of the cradle 501 that can be within, adjacent to, and/or above the absorbent dressing material 502. In some embodiments, the cradle 501 is positioned adjacent to the dressing material 502 as illustrated in FIGS. 19B and 19C. FIG. 19C illustrates an embodiment of the electronics unit 67 incorporated into the cradle 501 and adjacent to an absorbent pad 502. The shape and form of the cradle can be advantageous to production of an ergonomic form for the device. An embodiment of an electronics cradle incorporated within a wound dressing is shown in FIGS. 19B-19C. An embodiment of the electronics assembly to be used with the cradle 501 is shown in FIG. 19A.

The cradle can be constructed from hydrophilic materials (e.g. PU foam, cellulosic fiber). In some embodiments, the cradle 501 can be in intimate contact with the absorbent pad 502 to facilitate fluid distribution, thus preventing pooling, as depicted in FIGS. 19B-19C. In some embodiments, the electronics cradle 501 can be in direct contact with the wound contact layer (not shown).

The cradle can include recesses, cutouts, or slots 503 and 504 within the cradle material 501 for receiving components of the electronics unit 67 as illustrated in FIG. 19B. The electronics unit 67 can be fit into the recesses 503 and 504 of the cradle material 501. In some embodiments, the cradle can include one or more recess 503 shaped to receive the batteries and a recess 504 shaped to receive the pump with the pump inlet and pump outlet mechanisms of the electronics unit as illustrated in FIG. 19B. In some embodiments, once the electronics unit is fit within the cradle, the top of the electronics unit can be flush with or can have a similar height profile as the electronics cradle material. The cradle can be a soft or patient compatible material to minimize the discomfort of a patient when the wound dressing with integrated electronics are in contact with the wound or skin. In some embodiments, the cradle can include an absorbent or wicking material that allows the flow of fluid through the casing.

Figure 20A:
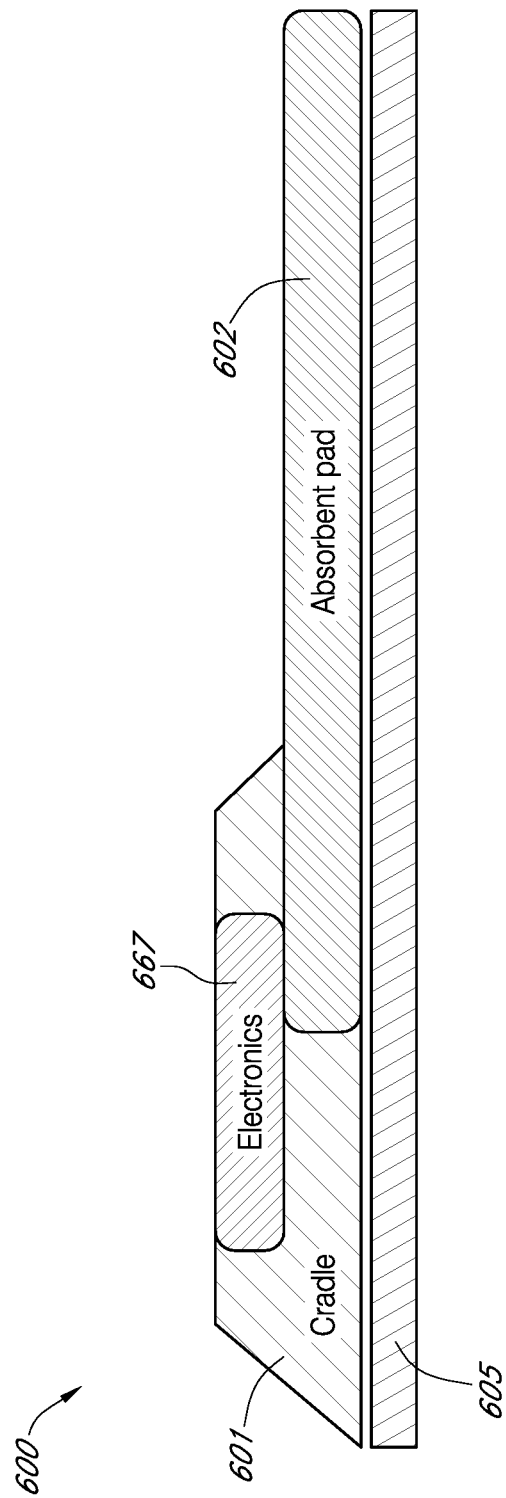
FIGS. 20A-20B illustrate an embodiment of a wound dressing incorporating the electronics unit and electronics cradle adjacent to and at least partially overlapping the absorbent pad.
Figure 20B:
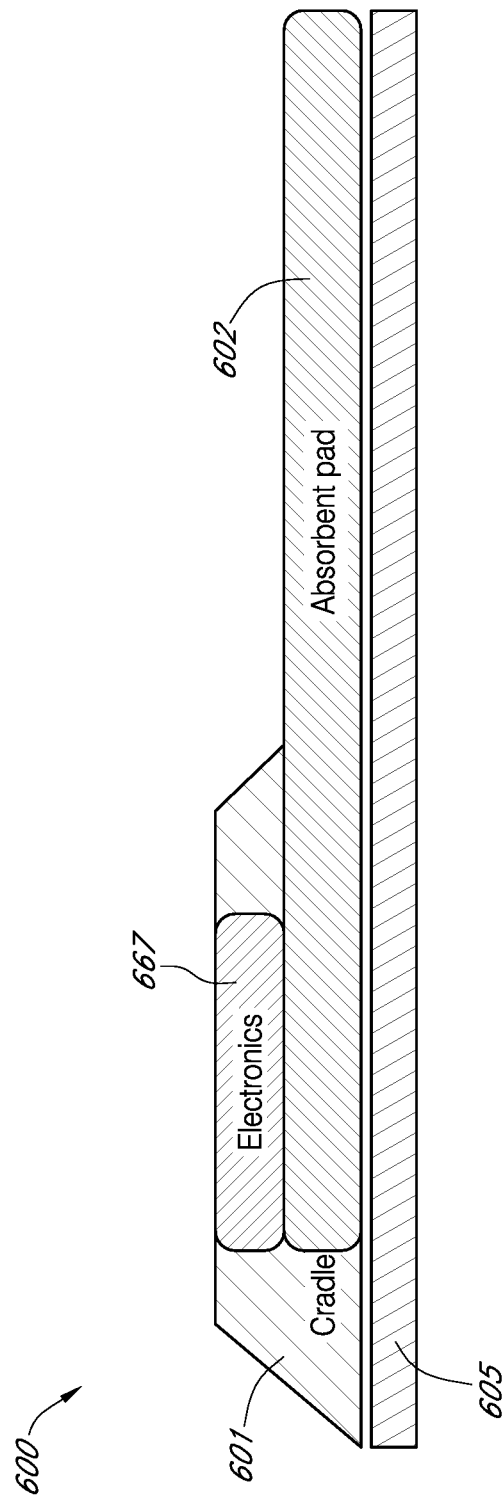

FIGS. 20A-20B illustrate an embodiment of a wound dressing 600 incorporating the electronics unit 667 and electronics cradle 601 adjacent to and at least partially overlapping the absorbent pad 602. In such embodiment, the cradle 601 material is formed to house the electronics unit 667 and a portion of the absorbent pad 602. In some embodiments, this configuration can provide intimate contact between absorbent pad 602 and the cradle 601. In some embodiments, the cradle 601 and absorbent pad 602 can be positioned over a transmission or spacer layer 605. As illustrated in FIGS. 20A-20B, the relative positions of the components can be varied as necessary. In some embodiments, the cradle 601 may be formed of the same material as the absorbent pad 602. In other embodiments, the cradle 601 may also be formed of a dissimilar material than the absorbent pad 602, e.g. absorbent polyurethane foam. In some embodiments, the cradle 601 may be formed using vacuum forming or thermoforming processes.

In some embodiments, the absorbent components and electronics components can be overlapping but offset. For example, a portion of the electronics area can overlap the absorbent area, for example overlapping the superabsorber layer, but the electronics area is not completely over the absorbent area. Therefore, a portion of the electronics area can be offset from the absorbent area and only provided over the cushioning transmission or spacer layers 605. The dressing layer and electronic components can be enclosed in a wound contact layer (not shown) positioned below the lower most layer and a cover layer (not shown) positioned above the absorbent layer and electronics. The wound contact layer and cover layer can be sealed at a perimeter enclosing the dressing components. In some embodiments, the cover layer can be in direct physical contact with the absorbent material, the cradle and/or electronics unit. In some embodiments, the cover layer can be sealed to a portion of the electronics unit and/or cassette, for example, in areas where holes or apertures are used accommodate the electronic components (e.g. a switch and/or exhaust) as described herein with reference to the electronics cassette.

Dressing Assembly with Integrated Electronics

The dressing layers can be assembled with various material layers in several configurations. In some embodiments, the electronics unit can be assembled within the wound dressing adjacent to the absorbent layer as described above. FIGS. 21A-21F illustrate an embodiment of a wound dressing incorporating an electronics unit resting in a cradle. In alternative embodiments, the dressing layers described with reference to FIGS. 21A-21F can incorporate an electronics unit within an electronics cassette as described with reference to FIGS. 5A-5E, 7A-7D, 8A-8C, 9A-9D, and 10 herein. In such embodiments, the electronics cassette can be used instead of the electronics cradle described with reference to FIGS. 21A-21F.

Figure 21A:
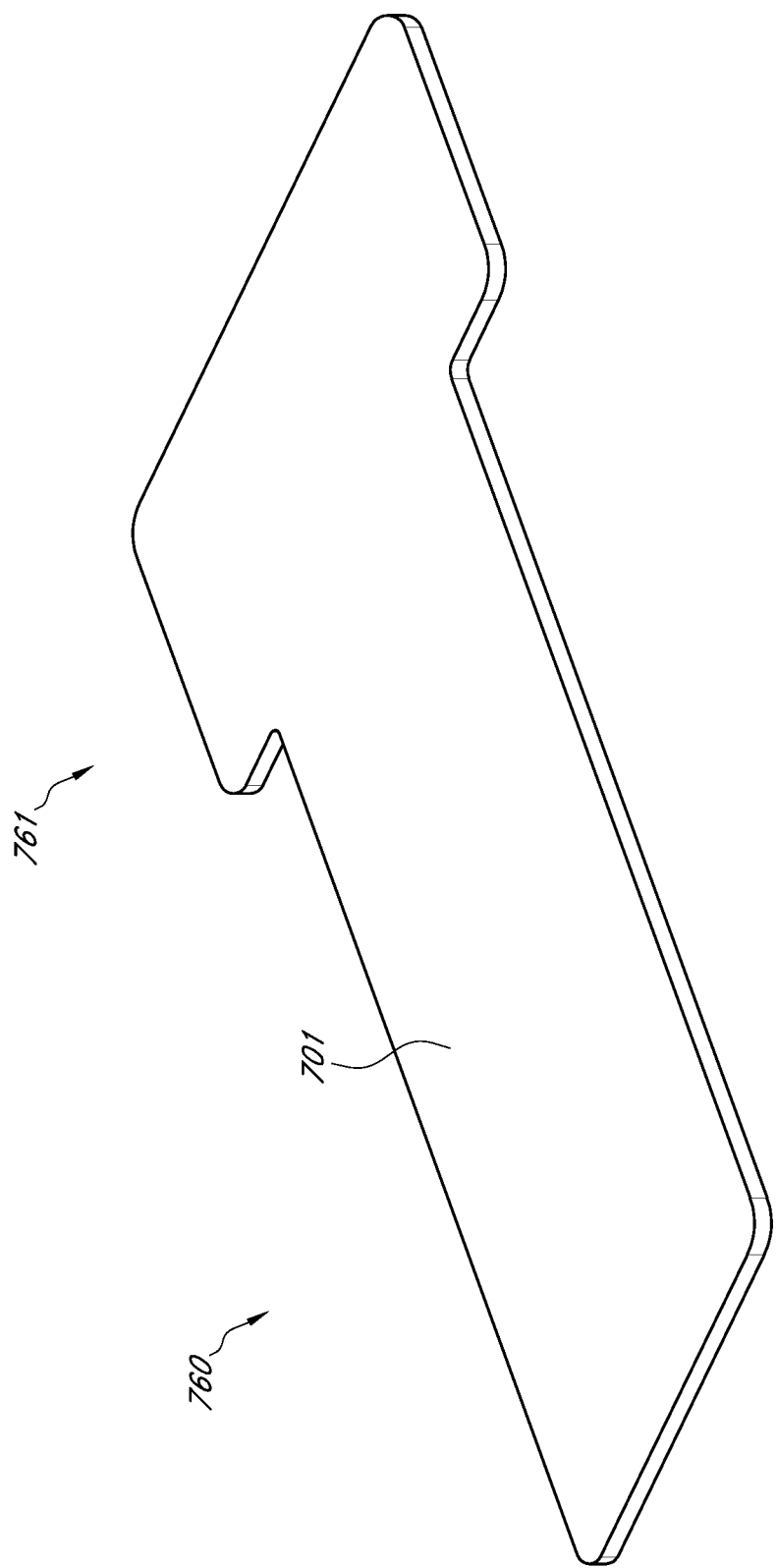
FIGS. 21A-21F illustrate an embodiment of a wound dressing incorporating an electronics unit resting in a cradle.

FIG. 21A illustrates an embodiment of a spacer layer 701. The spacer layer can be provided over a wound contact layer (not shown). The wound contact layer is placed in contact with the wound as described herein.

Figure 21B:
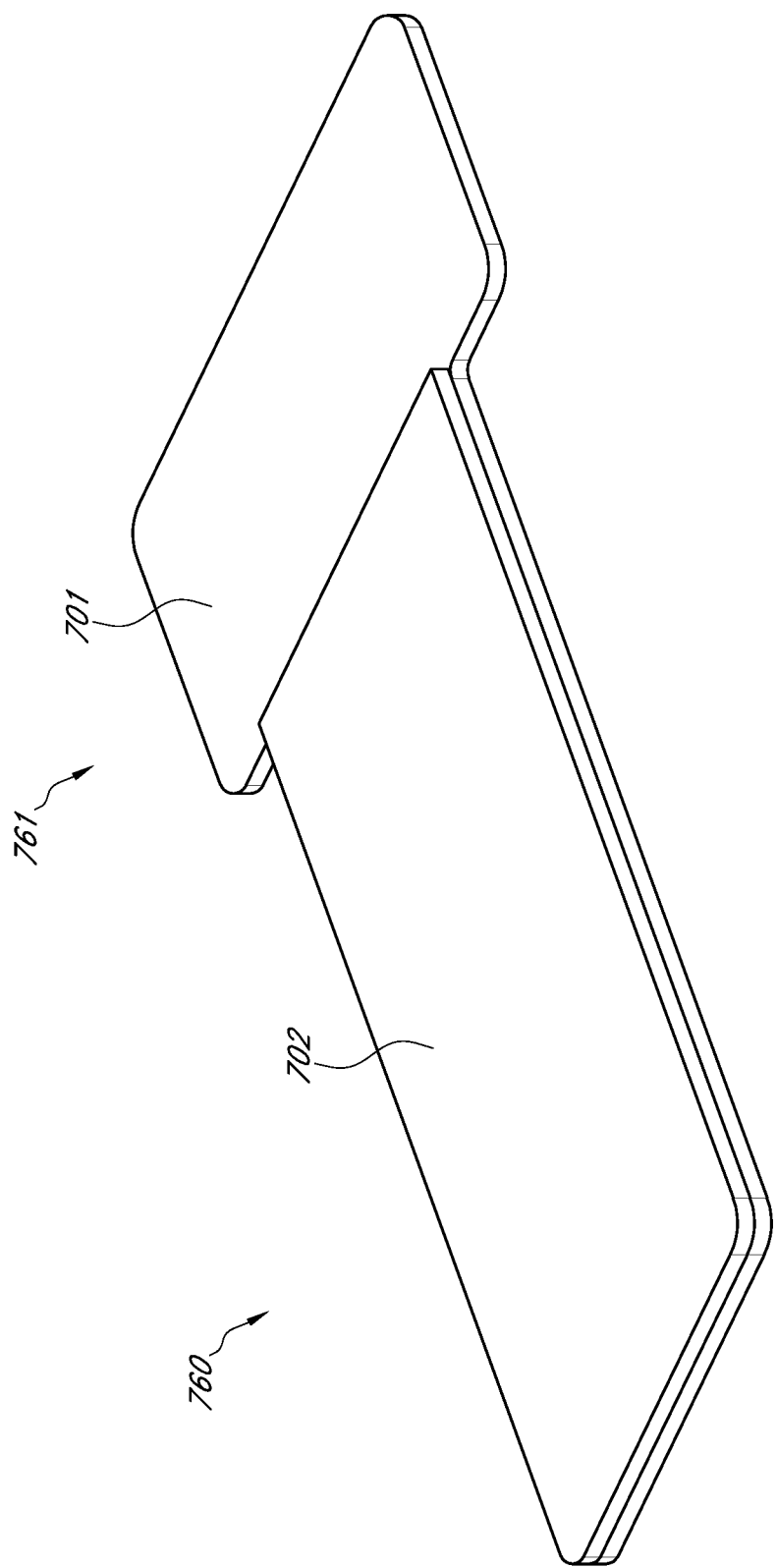
Figure 21C:
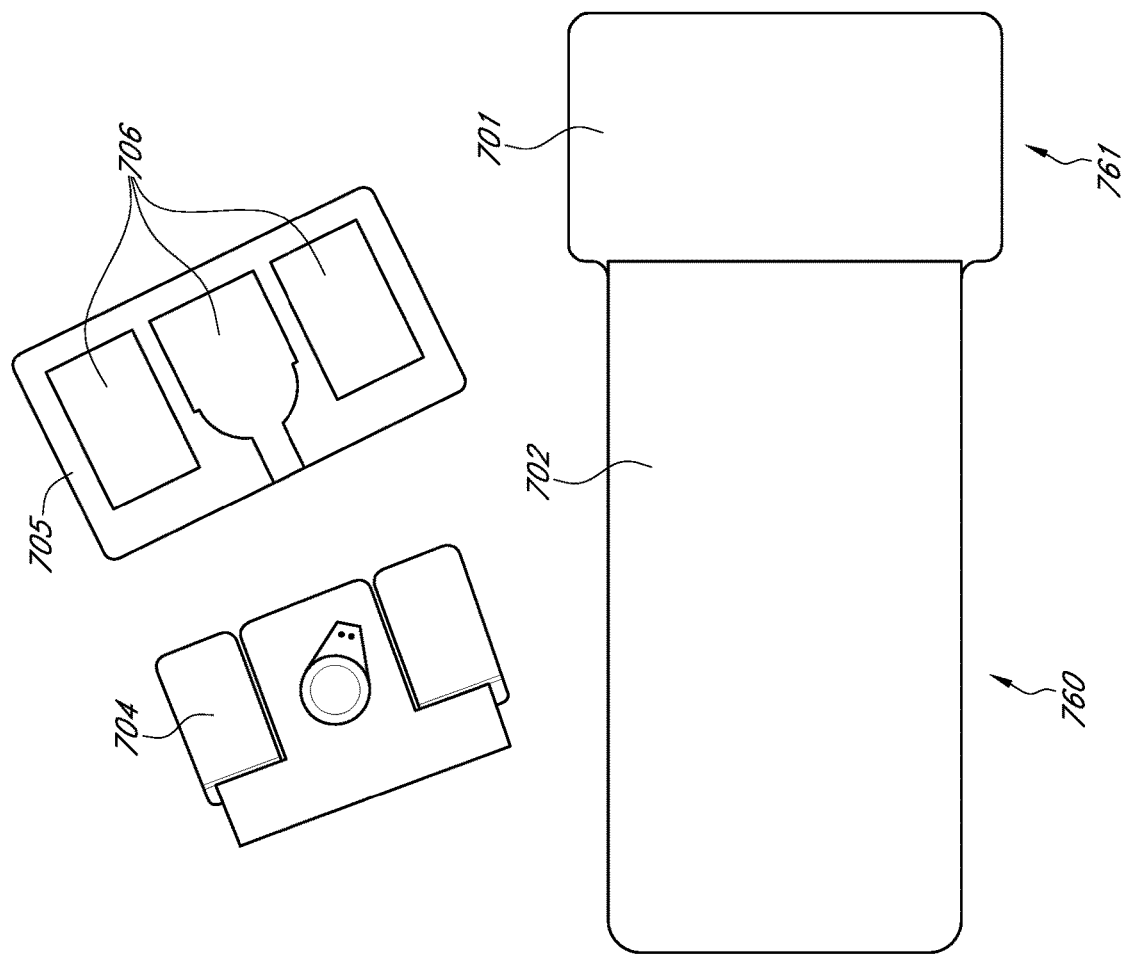

As illustrated in FIGS. 21A-21F, the wound dressing layers can include an absorbent area 760 and an electronics area 761. In some embodiments, the electronics area 761 can include the electronics unit 704. In some embodiments, the absorbent area 760 can include the absorbent material 702 and can be positioned over the wound area to absorb fluid from the wound within the absorbent material or pad 702. FIGS. 21B and 21C illustrates an embodiment of the spacer layer 701 with an absorbent layer 702 provided over the absorbent area 706 of the spacer layer 701. In FIGS. 21B-21C, the spacer layer 701 in the electronics area 761 is visible while the spacer layer 701 in the absorbent area 760 is obscured by the overlying absorbent layer 702.

Figure 21D:
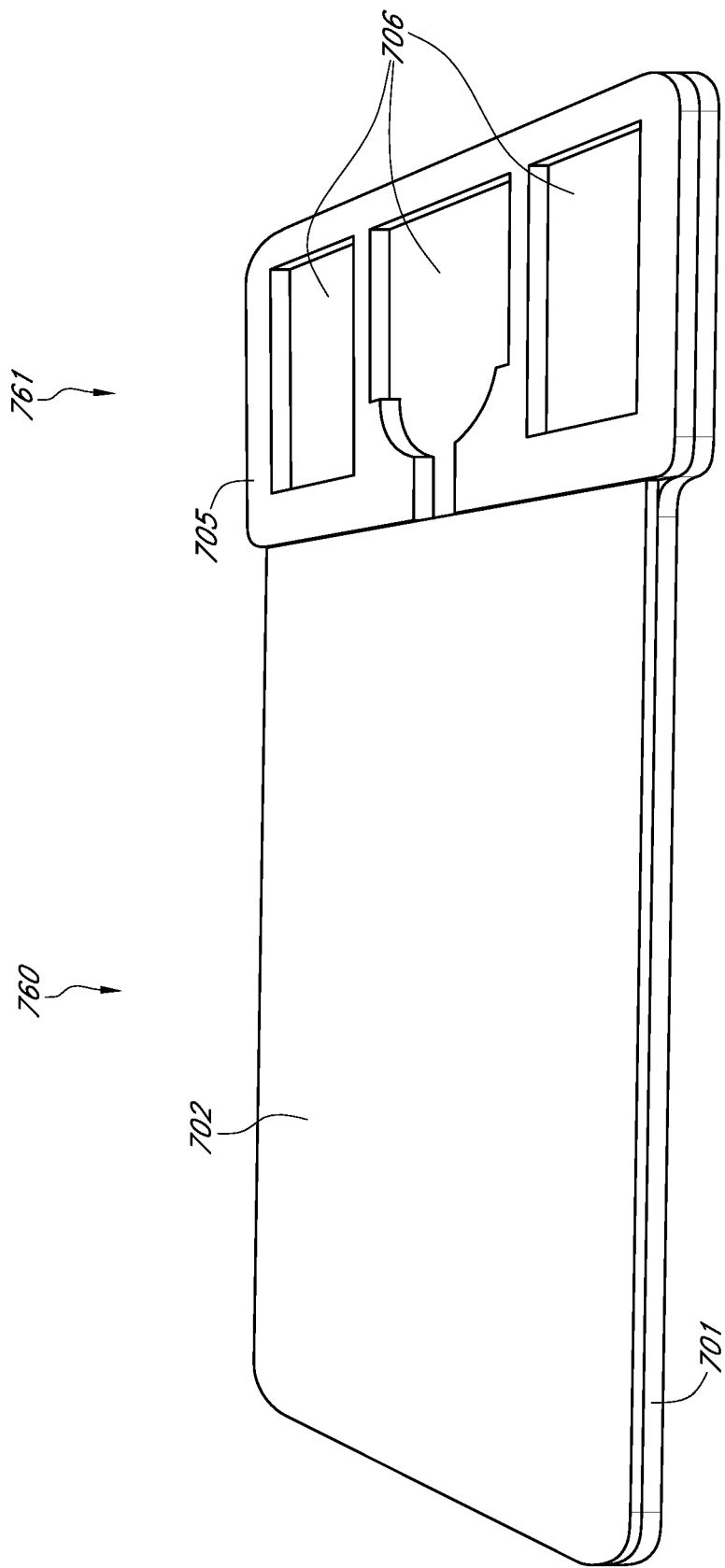
Figure 21E:
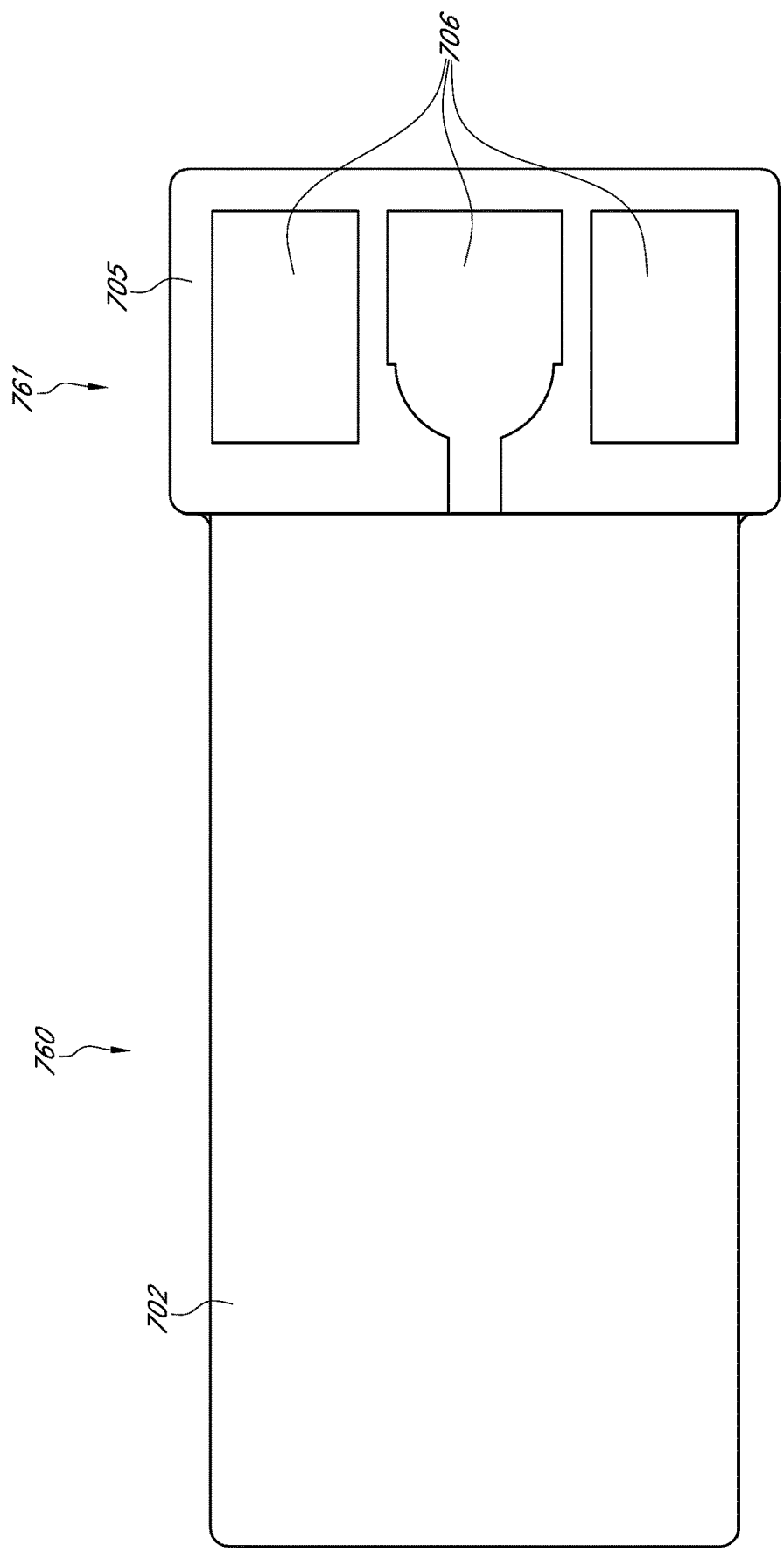
Figure 21F:
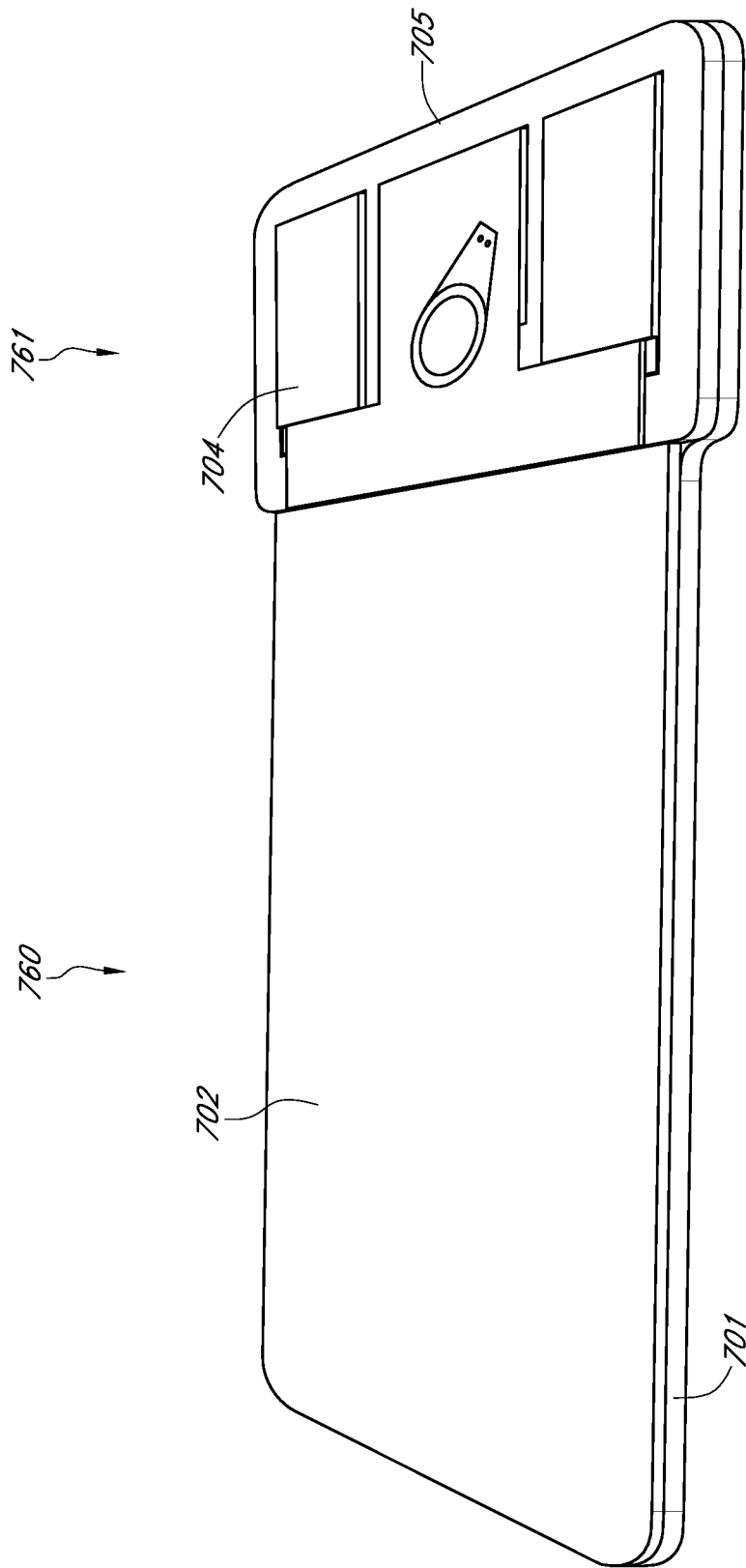

FIG. 21C illustrates an embodiment of an electronics unit 704 and a cradle 705 shown removed from the wound dressing layers. The cradle 705 include recesses, cutout, or slots 706 within the cradle. The recesses 706 are shaped to fit portions of the electronics unit. The recesses 706 can be shaped in a complementary shape that matches the shape of portions of the underside of the electronics unit 704 similar to the electronics unit 67 shown and described with reference to FIGS. 2, 3A-3D, and 4A-4B. For example, the recesses 706 can be the shape of the batteries and pump assembly as shown in FIGS. 21C-21E. FIGS. 21D-21F illustrate an embodiment of a wound dressing with the cradle 705 positioned over the spacer layer 701 of the electronics area 761. The cradle 705 can be positioned adjacent to the absorbent layer 702. FIG. 21F illustrates an embodiment of the wound dressing with the electronics unit 704 within the recess 706 of the electronics cradle 705. The dressing layers and components shown in FIG. 21F can be enclosed in a wound contact layer (not shown) positioned below the spacer layer 701 and a cover layer (not shown) positioned above the absorbent layer 702 and electronics 704 within the cradle 705. The wound contact layer and cover layer can be sealed at a perimeter enclosing the dressing components.

Figure 22A:
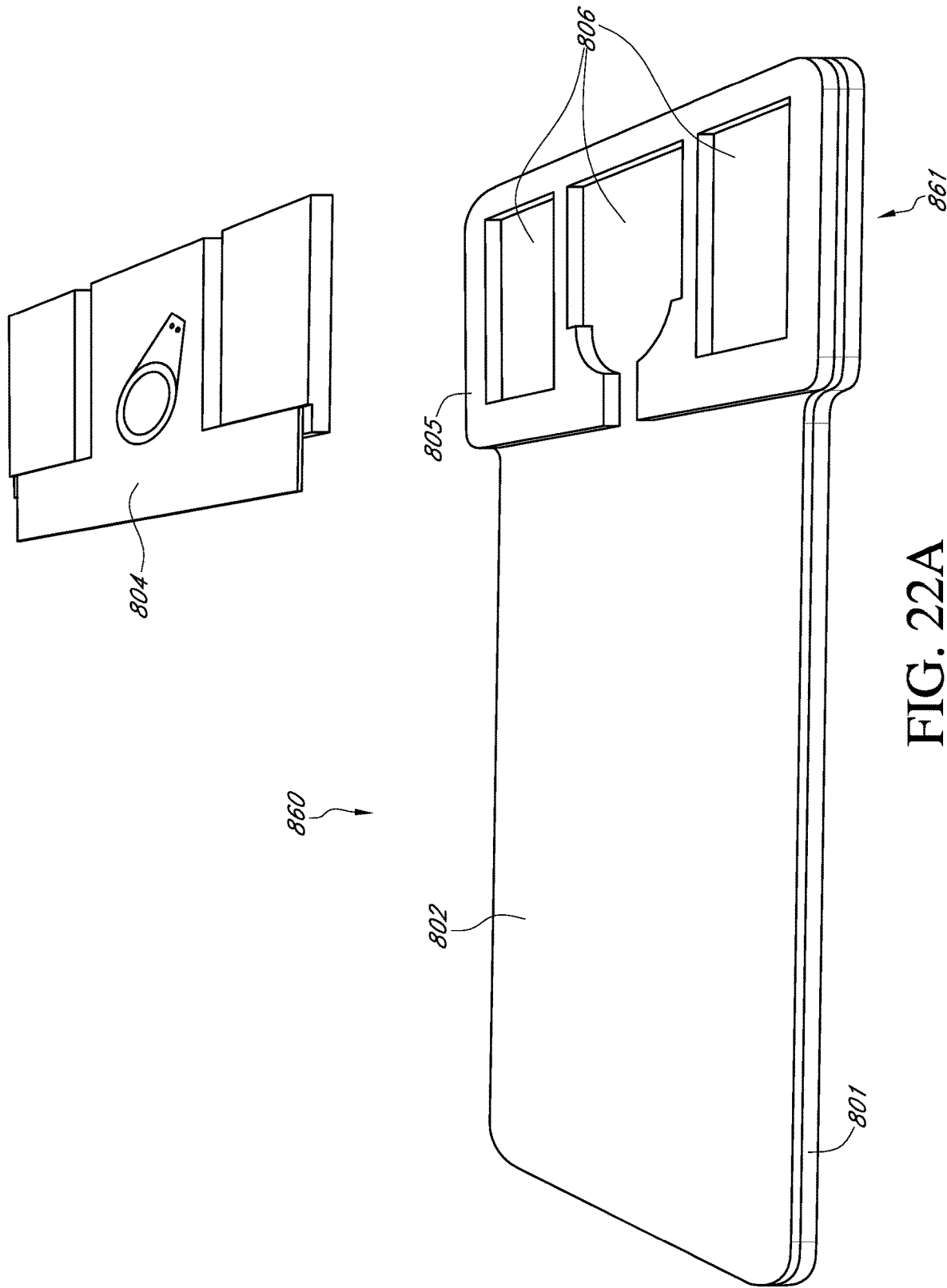
FIGS. 22A-22C illustrate another embodiment of a wound dressing incorporating an electronics unit and cradle in the wound dressing.
Figure 22B:
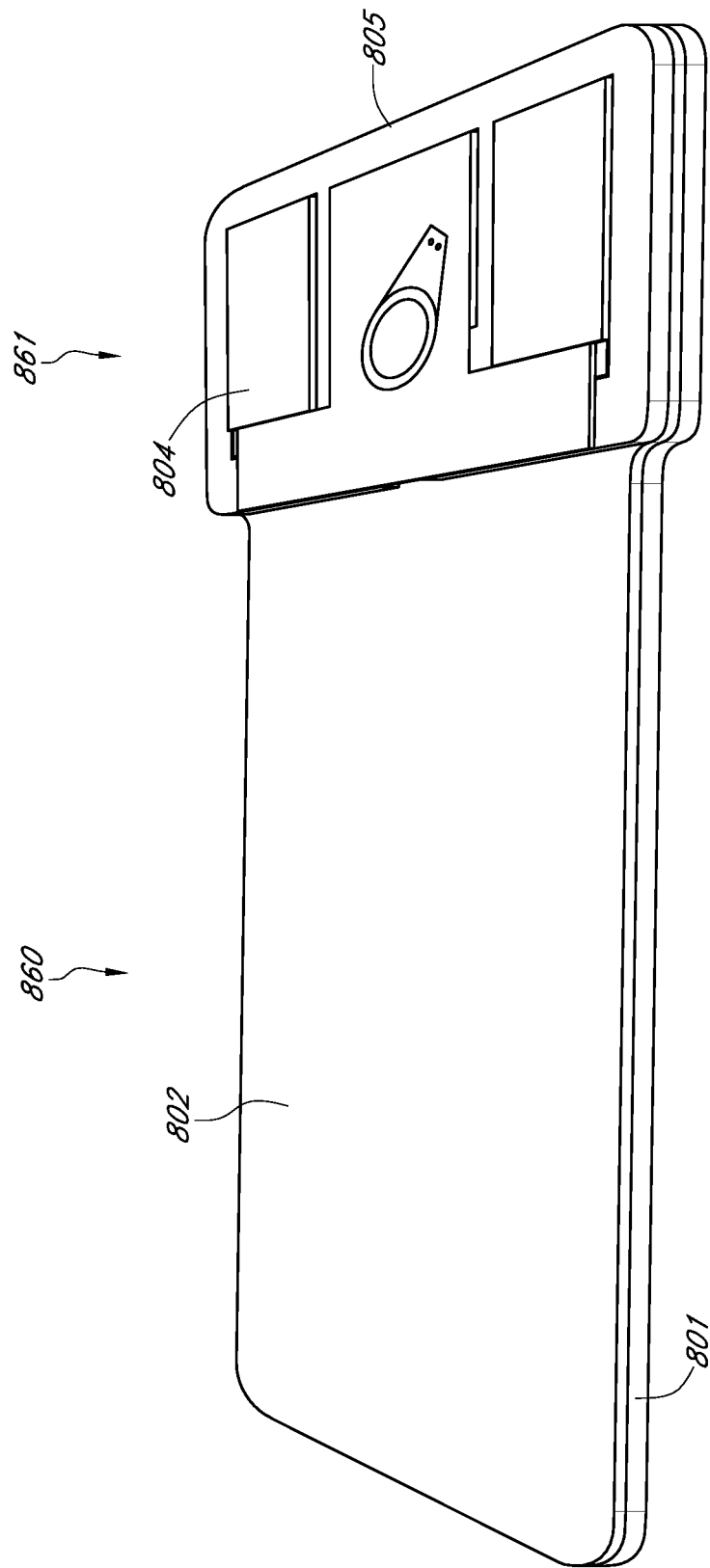
Figure 22C:
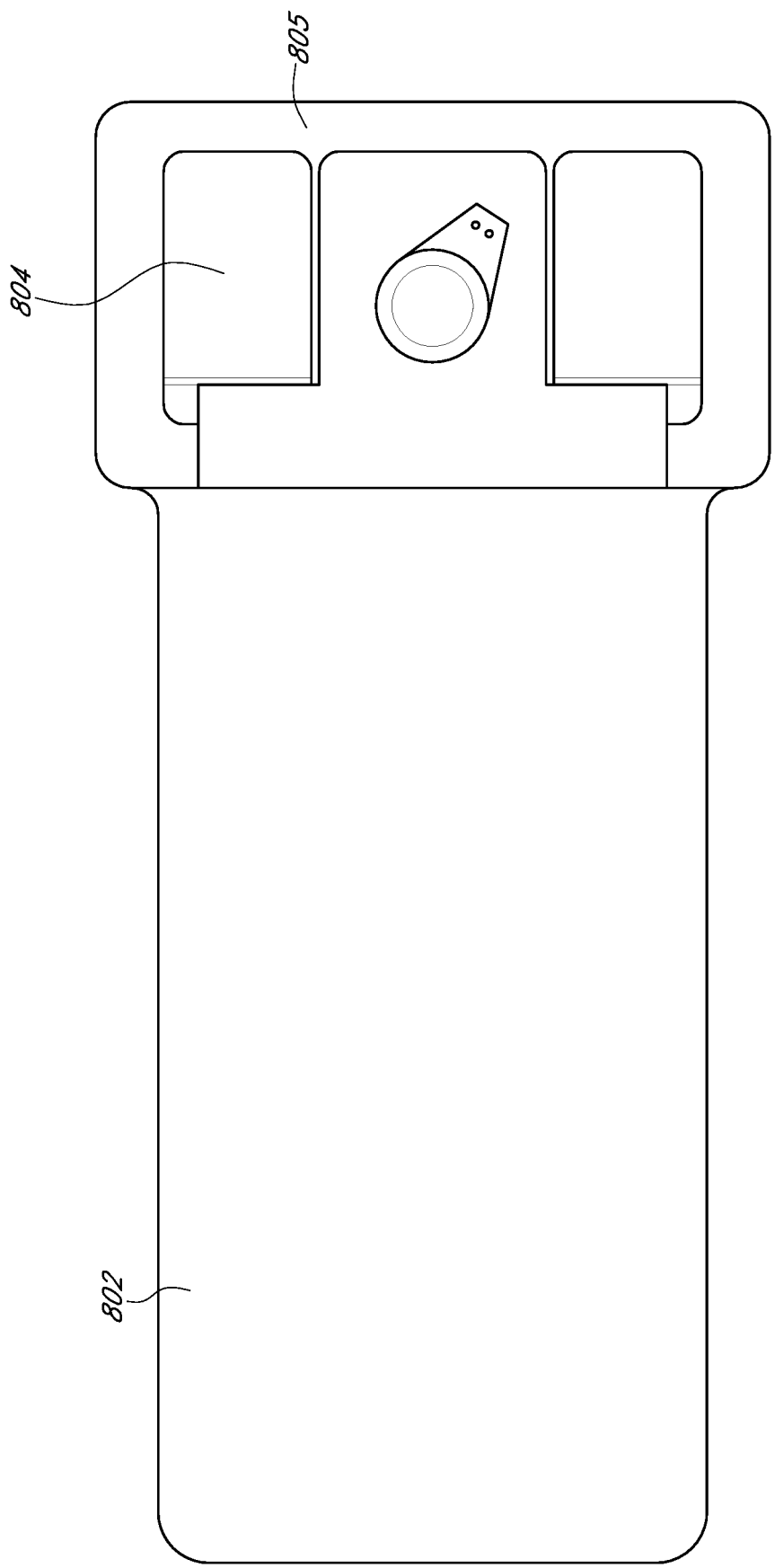

FIGS. 22A-22C illustrate another embodiment of a wound dressing incorporating an electronics unit 804 and cradle 805 in the wound dressing. In alternative embodiments, the dressing layers described with reference to FIGS. 22A-22C can incorporate an electronics unit within an electronics cassette as described with reference to FIGS. 5A-5E, 7A-7D, 8A-8C, 9A-9D, and 10 herein. In such embodiments, the electronics cassette can be used instead of the electronics cradle described with reference to FIGS. 22A-22C.

FIG. 22A illustrates an embodiment of a wound dressing including a spacer layer 801, absorbent layer 802, and cradle 805. As illustrated in FIGS. 22A-22C, the wound dressing layers can include an absorbent area 860 and an electronics area 861. In some embodiments, the electronics area 861 can include the electronics unit 804. In some embodiments, the absorbent area 860 can include the absorbent material 802 and can be positioned over the wound area to absorb fluid from the wound within the absorbent material or pad 802.

The absorbent layer 802 as shown in FIGS. 22A-22C can be positioned above the spacer layer 801 in the absorbent area 860 and the electronics area 861 and spans the length of the dressing. The cradle 805 can be positioned above the absorbent layer 802 in the electronics area 861. FIG. 22A illustrates the recesses 806 in the cradle 805 similar to the recesses described herein with reference to FIGS. 21A-21F. FIGS. 22B and 22C illustrate the electronics unit 804 positioned within the recesses 806 of the cradle. The dressing layers and components shown in FIGS. 22B and 22C can be enclosed in a wound contact layer (not shown) positioned below the spacer layer 801 and a cover layer (not shown) positioned above the absorbent layer 802 and electronics 804 within the cradle 805. The wound contact layer and cover layer can be sealed at a perimeter enclosing the dressing components.

Figure 23:
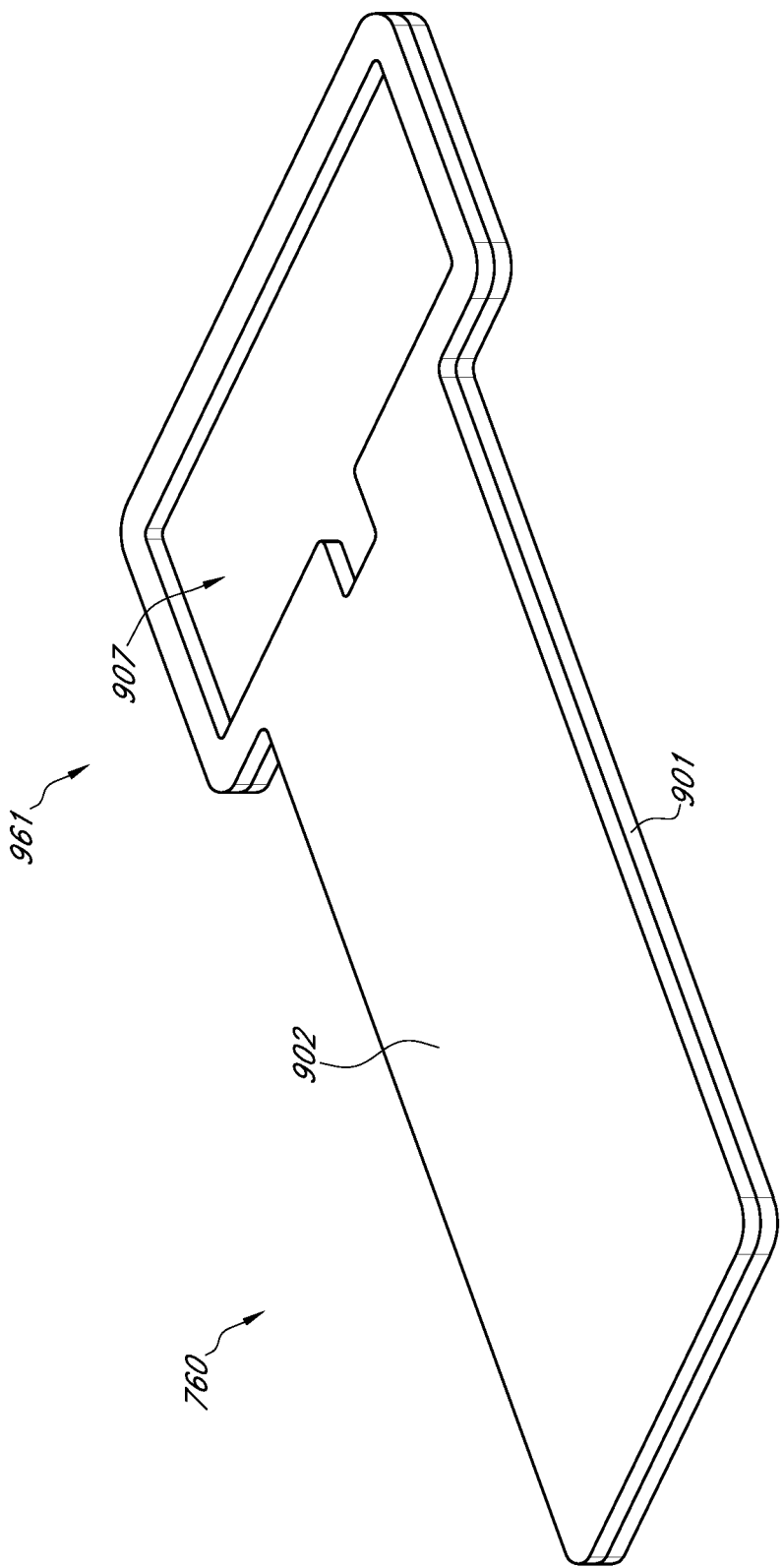
FIG. 23 illustrates an absorbent layer provided over the entire length of the spacer layer.

FIG. 23 illustrates an absorbent layer 902 provided over the entire length of the spacer layer 901. As illustrated in FIG. 23, the wound dressing layers can include an absorbent area 960 and an electronics area 961. In some embodiments, the electronics area 961 can include the electronics unit. In some embodiments, the absorbent area 960 can include the absorbent material 902 and can be positioned over the wound area to absorb fluid from the wound within the absorbent material or pad 902. The absorbent layer has one recess, cutout, or slot 907 in the portion of the absorbent layer 902 located in the electronics area 961. The spacer layer 901 is visible in the recess 907 of the absorbent layer 902. In some embodiments, as shown in FIG. 23 the absorbent material 902 spans the length of the dressing and can include a single aperture 907 in the absorbent material 902. In some embodiments, the electronics cradle or electronics cassette described herein can be positioned within the single aperture 907 in the absorbent material or absorbent layer 902 of the dressing. In such embodiments, an electronic unit can be positioned within the electronics cradle or electronics cassette as described herein. The dressing layers and components shown in FIG. 23 can be enclosed in a wound contact layer (not shown) positioned below the spacer layer 901 and a cover layer (not shown) positioned above the absorbent layer 902 and electronics cradle or cassette. The wound contact layer and cover layer can be sealed at a perimeter enclosing the dressing components.

Figure 24:
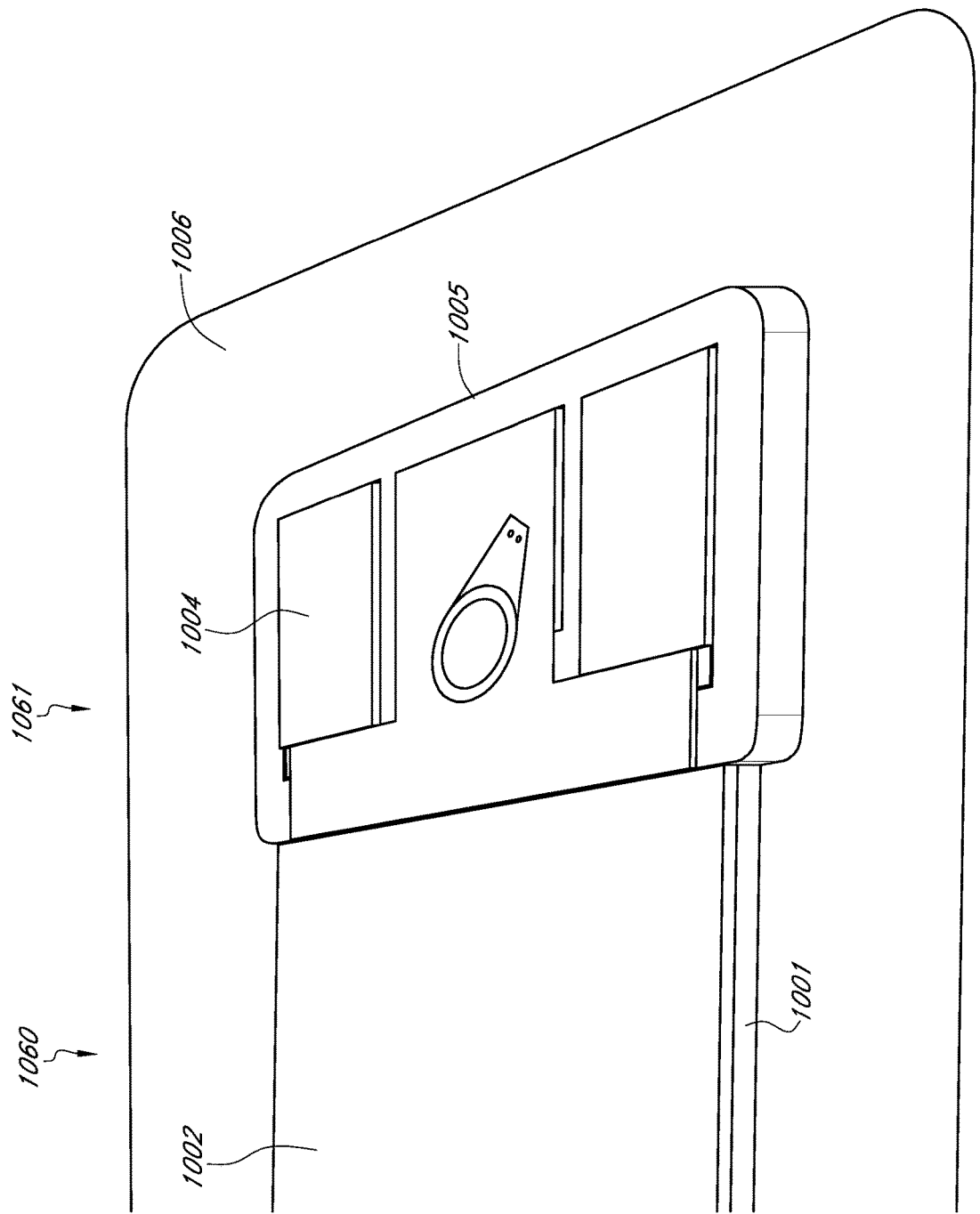
FIG. 24 illustrates an embodiment of a wound dressing incorporating an electronics unit resting in a cradle.

FIG. 24 illustrates an embodiment of a wound dressing incorporating an electronics unit resting in a cradle 1005. In alternative embodiments, the dressing layers described with reference to FIG. 24 can incorporate an electronics unit within an electronics cassette as described with reference to FIGS. 5A-5E, 7A-7D, 8A-8C, 9A-9D, and 10 herein. In such embodiments, the electronics cassette can be used instead of the electronics cradle described with reference to FIG. 24. As illustrated in FIG. 24, the wound dressing layers can include an absorbent area 1060 and an electronics area 1061. In some embodiments, the electronics area 1061 can include the electronics unit 1004 and electronics cradle 1005. In some embodiments, the absorbent area 1060 can include the absorbent material 1002 and can be positioned over the wound area to absorb fluid from the wound within the absorbent material or pad 1002. FIG. 24 illustrates a spacer layer 1001 and an absorbent layer 1002 positioned adjacent to a cradle 1005 and electronics unit 1004. The dressing configuration illustrated in FIG. 24 is similar to the dressing described with reference to FIGS. 21A-21F. However, the spacer layer 1001 as shown in FIG. 24 does not extend the entire length of the dressing. Instead, the spacer layer 1001 only extends to an edge of the cradle 1005 and the cradle is positioned to be in direct contact with an underlying wound contact layer 1006. As illustrated in FIG. 24, the spacer layer 1001 and absorbent layer 1002 are positioned in the absorbent area 1060 and do not extend to the electronics area 1061. The cradle 1005 and electronics unit 1004 are positioned in the electronics area 1061. FIG. 24 illustrates the layers of a wound dressing and electronics area shown with the wound contact layer 1006 and without the cover layer. The dressing layers and components shown in FIG. 24 can be enclosed in a wound contact layer 1006 positioned below the spacer layer and cradle and a cover layer (not shown) positioned above the absorbent layer and electronics unit 1004 within the cradle 1005. The wound contact layer 1006 and cover layer can be sealed at a perimeter enclosing the dressing components.

Figure 25A:
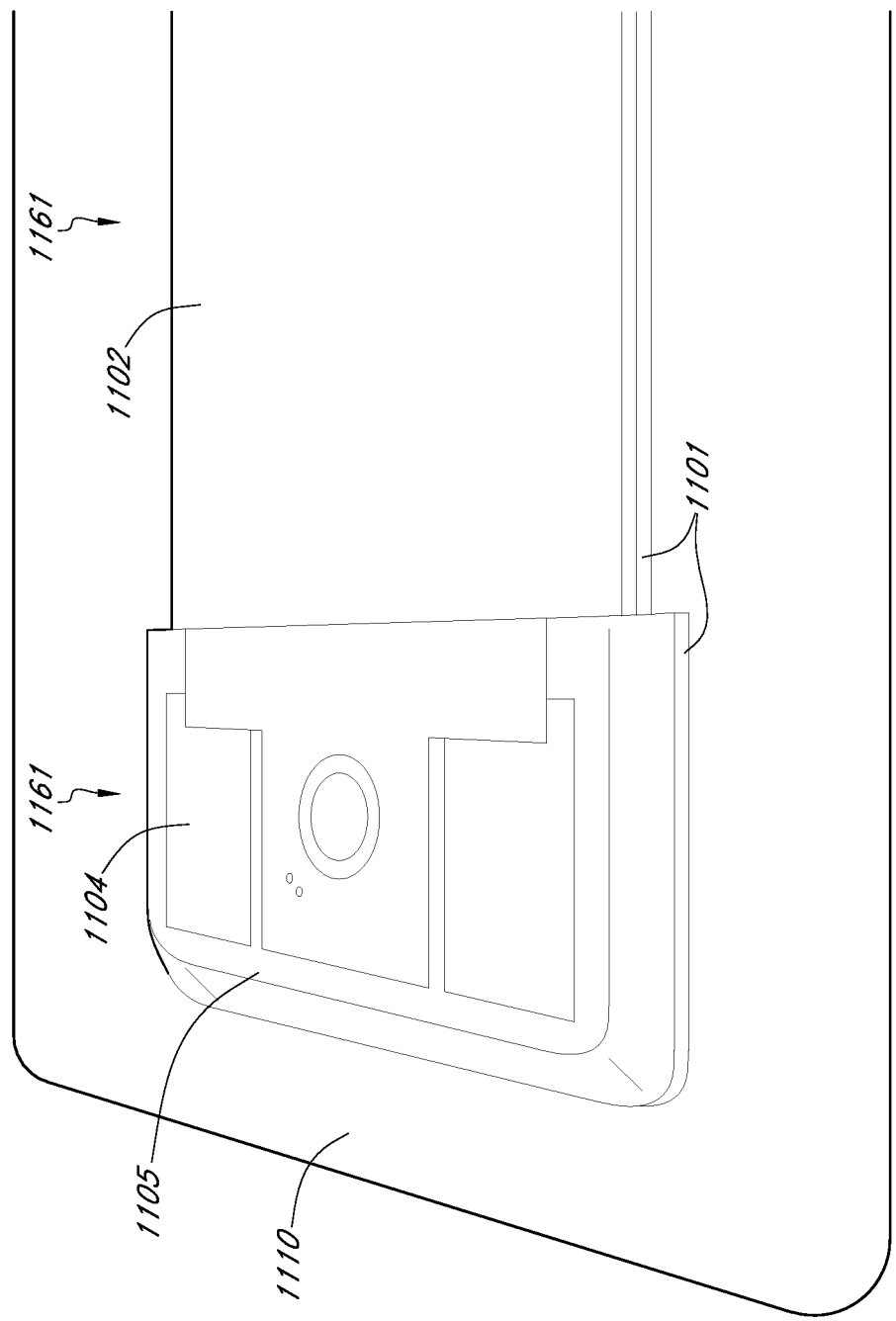
FIGS. 25A-25B illustrate embodiments of an assembled wound dressing with the dressing layers enclosed between a wound contact layer and a cover layer.
Figure 25B:
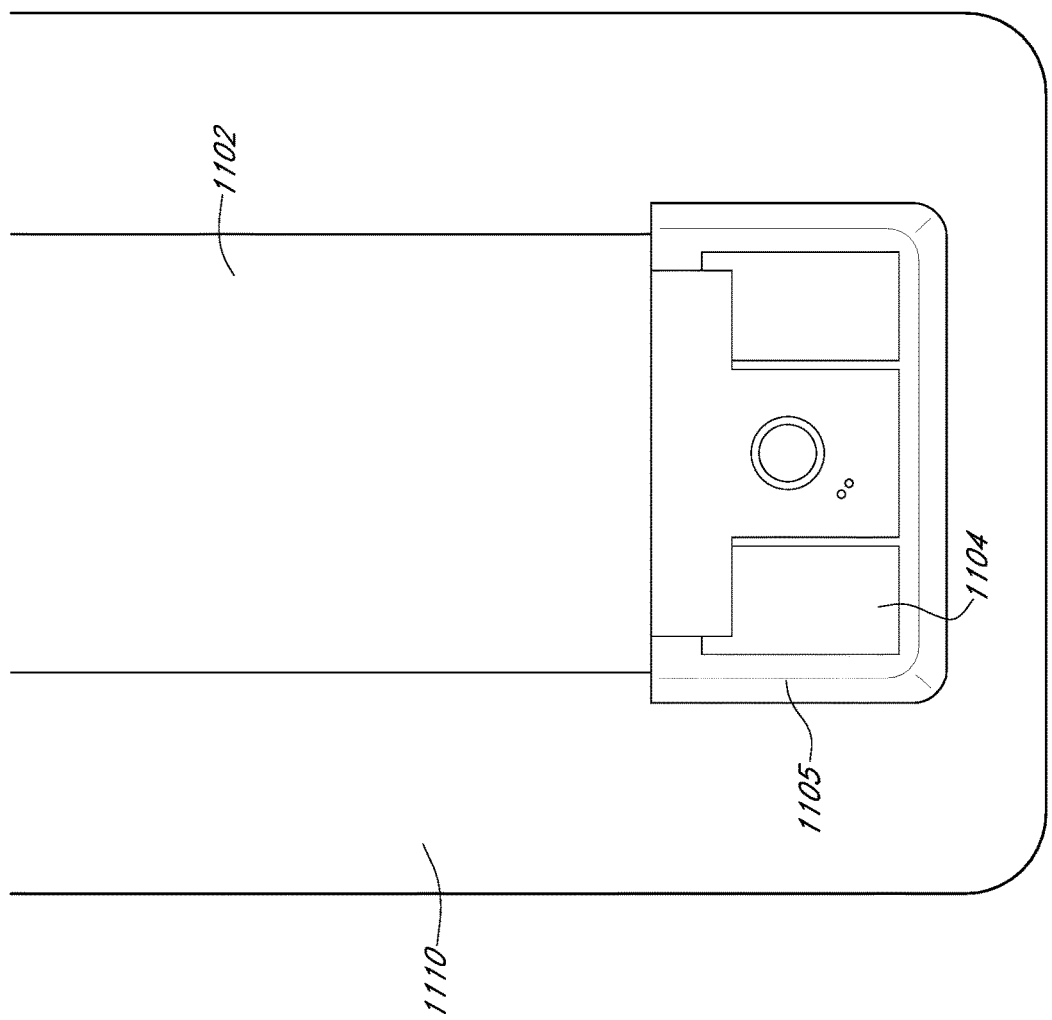

FIGS. 25A-25B illustrate embodiments of an assembled wound dressing with the dressing layers enclosed between a wound contact layer (not shown) and a cover layer 1110. As illustrated in FIGS. 25A-25B, the wound dressing layers can include an absorbent area 1160 and an electronics area 1161. In some embodiments, the electronics area 1161 can include the electronics unit 1104 and electronics cradle 1105. In some embodiments, the absorbent area 1160 can include the absorbent material 1102 and can be positioned over the wound area to absorb fluid from the wound within the absorbent material or pad 1102. The wound dressing can include a spacer layer 1101 as illustrated in FIG. 25A. The dressing layers and components shown in FIGS. 25A-25B can be enclosed in a wound contact layer (not shown) positioned below the spacer layer 1101 and a cover layer 1110 positioned above the absorbent layer 1102 and electronics unit 1104 within the cradle 1105. The wound contact layer and cover layer 1110 can be sealed at a perimeter enclosing the dressing components.

Figure 26:
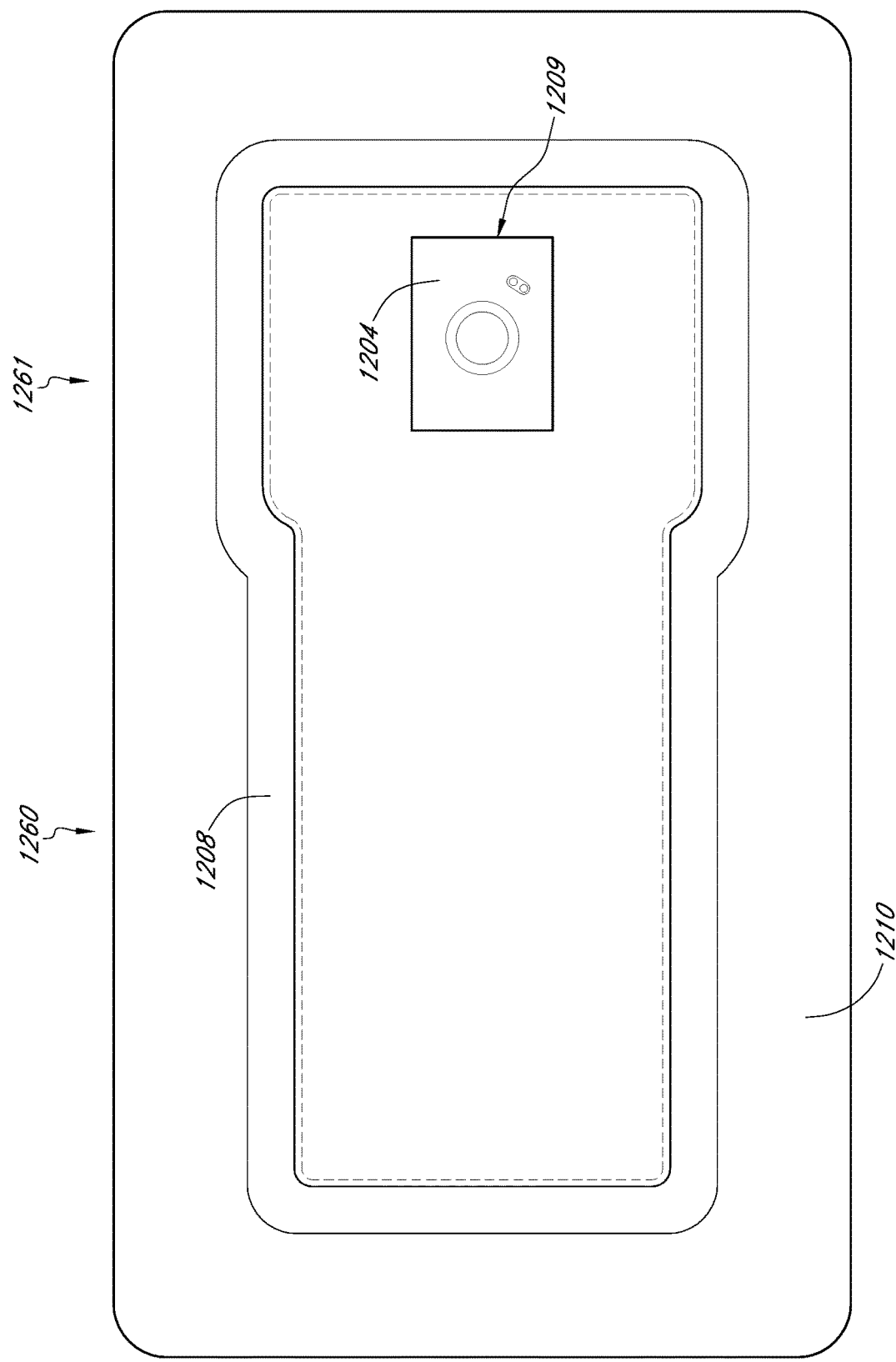
FIG. 26 illustrates an embodiment of an assembled wound dressing.

FIG. 26 illustrates an embodiment of an assembled wound dressing similar to the dressing shown in FIGS. 25A-25B. However, the wound dressing of FIG. 26 includes an additional masking or obscuring layer 1208 positioned above the dressing layers and below the cover layer 1210. As illustrated in FIG. 26, the wound dressing layers can include an absorbent area 1260 and an electronics area 1261. In some embodiments, the electronics area 1261 can include the electronics unit 1204. In some embodiments, the absorbent area 1260 can include the absorbent material and can be positioned over the wound area to absorb fluid from the wound within the absorbent material or pad. In some embodiments, the masking or obscuring layer 1208 can be positioned above the absorbent layer and electronics 1204 and below the cover layer 1210. In some embodiments, the masking or obscuring layer 1208 can include an aperture 1209 that allows the electronics 1204 below the masking or obscuring layer 1208 to be visible as shown in FIG. 26. In some embodiments, the masking or obscuring layer 1208 can be an opaque material that does not allow the wound exudate or other fluid to be visible from a top view of the wound dressing. In some embodiments, the masking or obscuring layer can span the entire length of the absorbent area 1260 and electronics area 1261. In some embodiments, the masking or obscuring layer can have a larger perimeter than the spacer layer, absorbent layer, and electronics unit, cradle, or cassette and can overborder the absorbent material and electronics unit, cradle, or cassette as shown in FIG. 26.

In some embodiments, the absorbent components and electronics components can be overlapping but offset. For example, a portion of the electronics area can overlap the absorbent area, for example overlapping the superabsorber layer, but the electronics area is not completely over the absorbent area. Therefore, a portion of the electronics area can be offset from the absorbent area and only provided over the cushioning spacer layers.

All of the features disclosed in this specification (including any accompanying exhibits, claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the principles and features disclosed herein. Certain embodiments of the disclosure are encompassed in the claim set listed below or presented in the future.

What is claimed is:

1. A wound dressing apparatus comprising:
   a wound contact layer configured to be positioned in contact with a wound;
   a first area over the wound contact layer comprising:
      a spacer layer; and
      an absorbent layer over the spacer layer;
   a second area over the wound contact layer comprising a cassette, the cassette comprising:
      a negative pressure source surrounded by a casing, wherein the negative pressure source comprises a negative pressure source outlet and a negative pressure source inlet comprising an opening configured to communicate negative pressure to the first area;
      an inlet protection mechanism is formed to fit around and surround the opening of the negative pressure source inlet and configured to prevent wound exudate from the wound dressing from passing through the opening of the negative pressure source inlet and to prevent wound exudate from entering the inlet of the negative pressure source;
      wherein the casing is configured to allow fluid communication between the first area and second area;
      wherein the casing comprises:
         a first wound facing surface and an opposite second surface;
         wherein the second surface comprises a vent aperture configured to align with the negative pressure source outlet and a user communication interface comprising a power button and a visual indicator for indicating a condition of the negative pressure source and/or a level of pressure within the wound dressing;
         wherein the first surface comprises an opening for the inlet protection mechanism in fluid communication with the absorbent layer; and
      wherein the first area is positioned adjacent to the second area; and
   a cover layer configured to cover and form a seal over the wound contact layer, the first area, and the second area.

2. The wound dressing apparatus of claim 1, wherein the casing further comprises electronic components, wherein the electronic components comprise one or more of a power source, a flexible circuit board, a sensor, a switch, and/or a light or LED indicator.

3. The wound dressing apparatus of claim 2, wherein the light or LED indicator are configured to be visible on the second surface of the casing for indicating a condition of the negative pressure source.

4. The wound dressing apparatus of claim 3, wherein the visual indicator comprise a hole in the casing configured to align with the light or LED indicator of the electronic components.

5. The wound dressing apparatus of claim 3, wherein the visual indicator comprise a transparent material in the casing positioned over at least a portion of the light or LED indicator of the electronic components.

6. The wound dressing apparatus of claim 2, wherein the casing comprises a material on the second surface of the casing configured to cover at least a portion of the switch.

7. The wound dressing apparatus of claim 1, further comprising an exhaust mechanism configured to be positioned at the negative pressure source outlet, the exhaust mechanism comprising an antibacterial membrane and/or a non-return valve.

8. The wound dressing apparatus of claim 7, wherein the cover layer comprises an aperture over the exhaust mechanism.

9. The wound dressing apparatus of claim 1, wherein the negative pressure source inlet protection mechanism comprises a hydrophobic material configured to prevent fluid from entering the negative pressure source.

10. The wound dressing apparatus of claim 1, wherein the cassette comprises one or more slits, grooves or recesses in the casing, wherein the one or more slits, grooves or recesses are configured to provide one or more hinge points in the casing and increase flexibility of the cassette.

11. The wound dressing apparatus of claim 1, wherein the spacer layer extends within both the first area and the second area and the cassette is provided over the spacer layer.

12. The wound dressing apparatus of claim 1, wherein the negative pressure source is encapsulated in a hydrophobic coating.

\* \* \* \* \*